(12) United States Patent
Cote et al.

(10) Patent No.: US 9,075,216 B2
(45) Date of Patent: Jul. 7, 2015

(54) FIBER OPTIC HOUSINGS CONFIGURED TO ACCOMMODATE FIBER OPTIC MODULES/CASSETTES AND FIBER OPTIC PANELS, AND RELATED COMPONENTS AND METHODS

(75) Inventors: Monique L. Cote, Fort Worth, TX (US); Brent M. Frazier, Haslet, TX (US); William J. Giraud, Azle, TX (US); Raymond G. Jay, Mansfield, TX (US); Diana Rodriguez, Fort Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 826 days.

(21) Appl. No.: 12/940,585

(22) Filed: Nov. 5, 2010

(65) Prior Publication Data

US 2011/0268404 A1  Nov. 3, 2011

Related U.S. Application Data

(60) Provisional application No. 61/329,925, filed on Apr. 30, 2010, provisional application No. 61/329,948, filed on Apr. 30, 2010, provisional application No. 61/329,898, filed on Apr. 30, 2010, provisional (Continued)

(51) Int. Cl.
  *G02B 6/00* (2006.01)
  *G02B 6/44* (2006.01)
(52) U.S. Cl.
  CPC .................... *G02B 6/4452* (2013.01)
(58) Field of Classification Search
  USPC ........................................................ 385/135
  See application file for complete search history.

(56) References Cited

U.S. PATENT DOCUMENTS

| 620,013 A | 2/1899 | Barnes |
| 2,614,685 A | 10/1952 | Miller |
| 3,175,873 A | 3/1965 | Blomquist et al. |

(Continued)

FOREIGN PATENT DOCUMENTS

| CA | 2029592 A1 | 5/1992 |
| CA | 2186314 A1 | 4/1997 |

(Continued)

OTHER PUBLICATIONS

Non-Final Office Action for U.S. Appl. No. 12/953,039 mailed Jan. 11, 2013, 6 pages.

(Continued)

*Primary Examiner* — Uyen Chau N Le
*Assistant Examiner* — Hoang Tran
(74) *Attorney, Agent, or Firm* — Brad Christopher Rametta

(57) ABSTRACT

Fiber optic housings configured to accommodate fiber optic modules/cassettes and fiber optic panels are disclosed. In one embodiment, a fiber optic apparatus is provided and comprised of a fiber optic housing and one or more removable panel clips. Each of the one or more removable panel clips includes at least one receptacle configured to receive an insert of a fiber optic panel to support the fiber optic panel in the fiber optic housing. In another embodiment, a fiber optic shelf configured to be supported in a fiber optic housing is provided. The fiber optic shelf comprises a mounting surface and one or more removable panel clips attached to the mounting surface that each includes at least one receptacle configured to receive an insert of a fiber optic panel to support the fiber optic panel in the mounting surface. Related components and methods are also disclosed.

49 Claims, 63 Drawing Sheets

Related U.S. Application Data application No. 61/332,572, filed on May 7, 2010, provisional application No. 61/332,548, filed on May 7, 2010, provisional application No. 61/332,529, filed on May 7, 2010, provisional application No. 61/332,508, filed on May 7, 2010, provisional application No. 61/180,331, filed on May 21, 2009.

(56) References Cited

U.S. PATENT DOCUMENTS

| | | |
|---|---|---|
| 3,212,192 A | 10/1965 | Bachmann et al. |
| 3,433,886 A | 3/1969 | Myers |
| 3,494,306 A | 2/1970 | Aguilar |
| 3,568,263 A | 3/1971 | Meehan |
| 3,646,244 A | 2/1972 | Cole |
| 3,701,835 A | 10/1972 | Eisele et al. |
| 3,880,396 A | 4/1975 | Freiberger et al. |
| 3,906,592 A | 9/1975 | Sakasegawa et al. |
| 3,991,960 A | 11/1976 | Tanaka |
| 4,047,797 A | 9/1977 | Arnold et al. |
| 4,059,872 A | 11/1977 | Delesandri |
| 4,119,285 A | 10/1978 | Bisping et al. |
| 4,239,316 A | 12/1980 | Spaulding |
| 4,285,486 A | 8/1981 | Von Osten et al. |
| 4,354,731 A | 10/1982 | Mouissie |
| 4,457,482 A | 7/1984 | Kitagawa |
| 4,525,012 A | 6/1985 | Dunner |
| 4,540,222 A | 9/1985 | Burrell |
| 4,564,163 A | 1/1986 | Barnett |
| 4,597,173 A | 7/1986 | Chino et al. |
| 4,611,875 A | 9/1986 | Clarke et al. |
| 4,635,886 A | 1/1987 | Santucci et al. |
| 4,645,292 A | 2/1987 | Sammueller |
| 4,657,340 A | 4/1987 | Tanaka et al. |
| 4,681,288 A | 7/1987 | Nakamura |
| 4,702,551 A | 10/1987 | Coulombe |
| 4,736,100 A | 4/1988 | Vastagh |
| 4,744,629 A | 5/1988 | Bertoglio et al. |
| 4,747,020 A | 5/1988 | Brickley et al. |
| 4,752,110 A | 6/1988 | Blanchet et al. |
| 4,787,706 A | 11/1988 | Cannon, Jr. et al. |
| 4,792,203 A | 12/1988 | Nelson et al. |
| 4,798,432 A | 1/1989 | Becker et al. |
| 4,805,979 A | 2/1989 | Bossard et al. |
| 4,808,774 A | 2/1989 | Crane |
| 4,824,193 A | 4/1989 | Maeda et al. |
| 4,824,196 A | 4/1989 | Bylander |
| 4,826,277 A | 5/1989 | Weber et al. |
| 4,838,643 A | 6/1989 | Hodges et al. |
| 4,840,449 A | 6/1989 | Ghandeharizadeh |
| 4,865,280 A | 9/1989 | Wollar |
| 4,898,448 A | 2/1990 | Cooper |
| 4,900,123 A | 2/1990 | Barlow |
| 4,911,662 A | 3/1990 | Debortoli et al. |
| 4,948,220 A | 8/1990 | Violo et al. |
| 4,949,376 A | 8/1990 | Nieves et al. |
| 4,971,421 A | 11/1990 | Ori |
| 4,991,928 A | 2/1991 | Zimmer |
| 4,995,688 A | 2/1991 | Anton et al. |
| 5,001,602 A | 3/1991 | Suffi et al. |
| 5,005,941 A | 4/1991 | Barlow et al. |
| 5,017,211 A | 5/1991 | Wenger et al. |
| 5,023,646 A | 6/1991 | Ishida et al. |
| 5,024,498 A | 6/1991 | Becker et al. |
| 5,028,114 A | 7/1991 | Krausse et al. |
| 5,037,175 A | 8/1991 | Weber |
| 5,048,918 A | 9/1991 | Daems et al. |
| 5,066,149 A | 11/1991 | Wheeler et al. |
| 5,067,784 A | 11/1991 | Debortoli et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,080,459 A | 1/1992 | Wettengel et al. |
| 5,100,221 A | 3/1992 | Carney et al. |
| 5,104,336 A | 4/1992 | Hatanaka et al. |
| 5,125,060 A | 6/1992 | Edmundson |
| 5,127,082 A | 6/1992 | Below et al. |
| 5,127,851 A | 7/1992 | Hilbert et al. |
| 5,129,030 A | 7/1992 | Petrunia |
| 5,129,607 A | 7/1992 | Satoh |
| 5,133,039 A | 7/1992 | Dixit |
| 5,138,678 A | 8/1992 | Briggs et al. |
| 5,138,688 A | 8/1992 | Debortoli |
| 5,142,598 A | 8/1992 | Tabone |
| 5,142,607 A | 8/1992 | Petrotta et al. |
| 5,150,277 A | 9/1992 | Bainbridge et al. |
| D330,368 S | 10/1992 | Bourgeois et al. |
| 5,152,760 A | 10/1992 | Latina |
| 5,153,910 A | 10/1992 | Mickelson et al. |
| 5,157,749 A | 10/1992 | Briggs et al. |
| 5,167,001 A | 11/1992 | Debortoli et al. |
| 5,170,452 A | 12/1992 | Ott |
| 5,189,723 A | 2/1993 | Johnson et al. |
| 5,199,099 A | 3/1993 | Dalgoutte |
| 5,204,929 A | 4/1993 | Machall et al. |
| 5,209,572 A | 5/1993 | Jordan |
| 5,214,735 A | 5/1993 | Henneberger et al. |
| 5,224,186 A | 6/1993 | Kishimoto et al. |
| 5,231,687 A | 7/1993 | Handley |
| 5,231,688 A | 7/1993 | Zimmer |
| 5,233,674 A | 8/1993 | Vladic |
| 5,239,609 A | 8/1993 | Auteri |
| 5,243,679 A | 9/1993 | Sharrow et al. |
| 5,253,320 A | 10/1993 | Takahashi et al. |
| 5,260,957 A | 11/1993 | Hakimi et al. |
| 5,261,633 A | 11/1993 | Mastro |
| 5,265,187 A | 11/1993 | Morin et al. |
| 5,274,731 A | 12/1993 | White |
| 5,278,933 A | 1/1994 | Hunsinger et al. |
| 5,280,138 A | 1/1994 | Preston et al. |
| 5,285,515 A | 2/1994 | Milanowski et al. |
| 5,315,679 A | 5/1994 | Baldwin et al. |
| 5,317,663 A | 5/1994 | Beard et al. |
| 5,323,478 A | 6/1994 | Milanowski et al. |
| 5,323,480 A | 6/1994 | Mullaney et al. |
| 5,333,193 A | 7/1994 | Cote et al. |
| 5,333,221 A | 7/1994 | Briggs et al. |
| 5,333,222 A | 7/1994 | Belenkiy et al. |
| 5,337,400 A | 8/1994 | Morin et al. |
| 5,339,379 A | 8/1994 | Kutsch et al. |
| 5,347,603 A | 9/1994 | Belenkiy et al. |
| 5,353,367 A | 10/1994 | Czosnowski et al. |
| 5,359,688 A | 10/1994 | Underwood |
| 5,363,466 A | 11/1994 | Milanowski et al. |
| 5,363,467 A | 11/1994 | Keith |
| 5,366,388 A | 11/1994 | Freeman et al. |
| 5,367,598 A | 11/1994 | Devenish, III et al. |
| 5,373,421 A | 12/1994 | Detsikas et al. |
| 5,383,051 A | 1/1995 | Delrosso et al. |
| 5,390,272 A | 2/1995 | Repta et al. |
| 5,398,295 A | 3/1995 | Chang et al. |
| 5,398,820 A | 3/1995 | Kiss |
| 5,399,814 A | 3/1995 | Staber et al. |
| 5,401,193 A | 3/1995 | Lo Cicero et al. |
| 5,402,515 A | 3/1995 | Vidacovich et al. |
| 5,408,557 A | 4/1995 | Hsu |
| RE34,955 E | 5/1995 | Anton et al. |
| 5,412,751 A | 5/1995 | Siemon et al. |
| 5,416,837 A | 5/1995 | Cote et al. |
| 5,418,874 A | 5/1995 | Carlisle et al. |
| 5,420,956 A | 5/1995 | Grugel et al. |
| 5,420,958 A | 5/1995 | Henson et al. |
| 5,421,532 A | 6/1995 | Richter |
| 5,438,641 A | 8/1995 | Malacarne |
| 5,442,725 A | 8/1995 | Peng |
| 5,442,726 A | 8/1995 | Howard et al. |
| 5,443,232 A | 8/1995 | Kesinger et al. |
| 5,444,804 A | 8/1995 | Yui et al. |
| 5,448,015 A | 9/1995 | Jamet et al. |
| 5,450,518 A | 9/1995 | Burek et al. |
| 5,458,019 A | 10/1995 | Trevino |
| 5,471,555 A | 11/1995 | Braga et al. |

(56) References Cited

U.S. PATENT DOCUMENTS

| | | |
|---|---|---|
| 5,479,505 A | 12/1995 | Butler et al. |
| 5,481,634 A | 1/1996 | Anderson et al. |
| 5,481,939 A | 1/1996 | Bernardini |
| 5,490,229 A | 2/1996 | Ghandeharizadeh et al. |
| 5,497,416 A | 3/1996 | Butler, III et al. |
| 5,497,444 A | 3/1996 | Wheeler ............... 385/135 |
| 5,511,144 A | 4/1996 | Hawkins et al. |
| 5,511,798 A | 4/1996 | Kawamoto et al. |
| 5,519,804 A | 5/1996 | Burek et al. |
| 5,530,786 A | 6/1996 | Radliff et al. |
| 5,535,970 A | 7/1996 | Gobbi |
| 5,542,015 A | 7/1996 | Hultermans |
| 5,546,495 A | 8/1996 | Bruckner et al. |
| 5,548,641 A | 8/1996 | Butler et al. |
| 5,553,183 A | 9/1996 | Bechamps |
| 5,553,186 A | 9/1996 | Allen |
| 5,572,617 A | 11/1996 | Bernhardt et al. |
| 5,575,680 A | 11/1996 | Suffi |
| 5,577,151 A | 11/1996 | Hoffer |
| 5,590,234 A | 12/1996 | Pulido |
| 5,595,507 A | 1/1997 | Braun et al. |
| 5,596,670 A | 1/1997 | Debortoli et al. |
| 5,600,020 A | 2/1997 | Wehle et al. |
| 5,602,954 A | 2/1997 | Nolf et al. |
| 5,608,606 A | 3/1997 | Blaney |
| 5,613,030 A | 3/1997 | Hoffer et al. |
| 5,617,501 A | 4/1997 | Miller et al. |
| 5,638,474 A | 6/1997 | Lampert et al. |
| 5,640,476 A | 6/1997 | Womack et al. |
| 5,640,482 A | 6/1997 | Barry et al. |
| 5,647,043 A | 7/1997 | Anderson et al. |
| 5,647,045 A | 7/1997 | Robinson et al. |
| 5,650,334 A | 7/1997 | Zuk et al. |
| 5,668,911 A | 9/1997 | Debortoli |
| 5,671,273 A | 9/1997 | Lanquist |
| 5,689,605 A | 11/1997 | Cobb et al. |
| 5,689,607 A | 11/1997 | Vincent et al. |
| 5,694,511 A | 12/1997 | Pimpinella et al. |
| 5,701,380 A | 12/1997 | Larson et al. |
| 5,704,573 A | 1/1998 | de Beers et al. |
| 5,708,742 A | 1/1998 | Beun et al. |
| 5,708,751 A | 1/1998 | Mattei |
| 5,710,851 A | 1/1998 | Walter et al. |
| 5,717,810 A | 2/1998 | Wheeler |
| 5,724,467 A | 3/1998 | vandenEnden et al. ...... 385/134 |
| 5,734,776 A | 3/1998 | Puetz |
| 5,740,300 A | 4/1998 | Hodge |
| 5,742,982 A | 4/1998 | Dodd et al. |
| 5,751,874 A | 5/1998 | Chudoba et al. |
| 5,751,882 A | 5/1998 | Daems et al. |
| 5,754,724 A | 5/1998 | Peterson et al. |
| 5,758,003 A | 5/1998 | Wheeler et al. |
| 5,758,004 A | 5/1998 | Alarcon et al. |
| 5,761,026 A | 6/1998 | Robinson et al. |
| 5,765,698 A | 6/1998 | Bullivant |
| 5,769,908 A | 6/1998 | Koppelman |
| 5,774,612 A | 6/1998 | Belenkiy et al. |
| 5,778,122 A | 7/1998 | Giebel et al. |
| 5,778,130 A | 7/1998 | Walters et al. |
| 5,781,686 A | 7/1998 | Robinson et al. |
| 5,788,087 A | 8/1998 | Orlando |
| 5,790,741 A | 8/1998 | Vincent et al. |
| 5,793,920 A | 8/1998 | Wilkins et al. |
| 5,793,921 A | 8/1998 | Wilkins et al. |
| 5,796,908 A | 8/1998 | Vicory |
| 5,823,646 A | 10/1998 | Arizpe et al. |
| 5,825,955 A | 10/1998 | Ernst et al. |
| 5,825,961 A | 10/1998 | Wilkins et al. |
| 5,828,807 A | 10/1998 | Tucker et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,870,519 A | 2/1999 | Jenkins et al. |
| 5,874,733 A | 2/1999 | Silver et al. |
| 5,877,565 A | 3/1999 | Hollenbach et al. |
| 5,880,864 A | 3/1999 | Williams et al. |
| 5,881,200 A | 3/1999 | Burt |
| 5,883,995 A | 3/1999 | Lu |
| 5,884,003 A | 3/1999 | Cloud et al. |
| 5,887,095 A | 3/1999 | Nagase et al. |
| 5,887,106 A | 3/1999 | Cheeseman et al. |
| 5,892,877 A | 4/1999 | Meyerhoefer |
| 5,894,540 A | 4/1999 | Drewing |
| 5,901,220 A | 5/1999 | Garver et al. |
| 5,903,693 A | 5/1999 | Brown |
| 5,906,342 A | 5/1999 | Kraus |
| 5,909,298 A | 6/1999 | Shimada et al. |
| 5,913,006 A | 6/1999 | Summach |
| 5,914,976 A | 6/1999 | Jayaraman et al. |
| 5,915,055 A | 6/1999 | Bennett et al. |
| 5,923,804 A | 7/1999 | Rosson |
| 5,930,425 A | 7/1999 | Abel et al. |
| 5,933,557 A | 8/1999 | Ott |
| 5,940,563 A | 8/1999 | Kobayashi et al. |
| 5,943,460 A | 8/1999 | Mead et al. |
| 5,945,633 A | 8/1999 | Ott et al. |
| 5,946,440 A | 8/1999 | Puetz |
| 5,949,946 A | 9/1999 | Debortoli et al. |
| 5,953,962 A | 9/1999 | Hewson |
| 5,956,439 A | 9/1999 | Pimpinella |
| 5,956,444 A | 9/1999 | Duda et al. |
| 5,956,449 A | 9/1999 | Otani et al. |
| 5,966,492 A | 10/1999 | Bechamps et al. |
| 5,969,294 A | 10/1999 | Eberle et al. |
| 5,975,769 A | 11/1999 | Larson et al. |
| 5,978,540 A | 11/1999 | Bechamps et al. |
| 5,980,303 A | 11/1999 | Lee et al. |
| 5,993,071 A | 11/1999 | Hultermans |
| 5,995,700 A | 11/1999 | Burek et al. |
| 5,999,393 A | 12/1999 | Brower |
| 6,001,831 A | 12/1999 | Papenfuhs et al. |
| 6,009,224 A | 12/1999 | Allen |
| 6,009,225 A | 12/1999 | Ray et al. |
| 6,011,831 A | 1/2000 | Nieves et al. |
| 6,027,252 A | 2/2000 | Erdman et al. |
| 6,044,193 A | 3/2000 | Szentesi et al. |
| 6,058,235 A | 5/2000 | Hiramatsu et al. |
| 6,061,492 A | 5/2000 | Strause et al. |
| 6,078,661 A | 6/2000 | Arnett et al. |
| 6,079,881 A | 6/2000 | Roth |
| 6,127,627 A | 10/2000 | Daoud |
| 6,130,983 A | 10/2000 | Cheng |
| 6,134,370 A | 10/2000 | Childers et al. |
| 6,149,313 A | 11/2000 | Giebel et al. |
| 6,149,315 A | 11/2000 | Stephenson |
| 6,151,432 A | 11/2000 | Nakajima et al. |
| 6,160,946 A | 12/2000 | Thompson et al. |
| 6,170,784 B1 | 1/2001 | MacDonald et al. |
| 6,175,079 B1 | 1/2001 | Johnston et al. |
| 6,181,861 B1 | 1/2001 | Wenski et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,201,920 B1 | 3/2001 | Noble et al. |
| 6,208,796 B1 | 3/2001 | Williams Vigliaturo |
| 6,212,324 B1 | 4/2001 | Lin et al. |
| 6,215,938 B1 | 4/2001 | Reitmeier et al. |
| 6,216,987 B1 | 4/2001 | Fukuo |
| 6,227,717 B1 | 5/2001 | Ott et al. |
| 6,229,948 B1 | 5/2001 | Blee et al. |
| 6,234,683 B1 | 5/2001 | Waldron et al. |
| 6,234,685 B1 | 5/2001 | Carlisle et al. |
| 6,236,795 B1 | 5/2001 | Rodgers |
| 6,240,229 B1 | 5/2001 | Roth |
| 6,243,522 B1 | 6/2001 | Allan et al. |
| 6,245,998 B1 | 6/2001 | Curry et al. |
| 6,263,141 B1 | 7/2001 | Smith |
| 6,265,680 B1 | 7/2001 | Robertson |
| 6,269,212 B1 | 7/2001 | Schiattone |
| 6,275,641 B1 | 8/2001 | Daoud |
| 6,278,829 B1 | 8/2001 | BuAbbud et al. |
| 6,278,831 B1 | 8/2001 | Henderson et al. |
| D448,005 S | 9/2001 | Klein, Jr. et al. |

(56) References Cited

U.S. PATENT DOCUMENTS

| | | |
|---|---|---|
| 6,289,618 B1 | 9/2001 | Kump et al. |
| 6,292,614 B1 | 9/2001 | Smith et al. |
| 6,301,424 B1 | 10/2001 | Hwang |
| 6,307,997 B1 | 10/2001 | Walters et al. |
| 6,318,824 B1 | 11/2001 | LaGrotta et al. |
| 6,321,017 B1 | 11/2001 | Janus et al. |
| 6,322,279 B1 | 11/2001 | Yamamoto et al. |
| 6,325,549 B1 | 12/2001 | Shevchuk |
| 6,327,059 B1 | 12/2001 | Bhalla et al. |
| RE37,489 E | 1/2002 | Anton et al. |
| 6,343,313 B1 | 1/2002 | Salesky et al. |
| 6,344,615 B1 | 2/2002 | Nolf et al. |
| 6,347,888 B1 | 2/2002 | Puetz |
| 6,353,696 B1 | 3/2002 | Gordon et al. |
| 6,353,697 B1 | 3/2002 | Daoud |
| 6,357,712 B1 | 3/2002 | Lu |
| 6,359,228 B1 | 3/2002 | Strause et al. |
| 6,363,200 B1 | 3/2002 | Thompson et al. |
| 6,370,309 B1 | 4/2002 | Daoud |
| 6,371,419 B1 | 4/2002 | Ohnuki |
| 6,375,129 B2 | 4/2002 | Koziol |
| 6,377,218 B1 | 4/2002 | Nelson et al. |
| 6,379,052 B1 | 4/2002 | De Jong et al. |
| 6,385,374 B2 | 5/2002 | Kropp |
| 6,385,381 B1 | 5/2002 | Janus et al. |
| 6,389,214 B1 | 5/2002 | Smith et al. |
| 6,397,166 B1 | 5/2002 | Leung et al. |
| 6,398,149 B1 * | 6/2002 | Hines et al. .................. 242/399 |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,425,694 B1 | 7/2002 | Szilagyi et al. |
| 6,427,045 B1 | 7/2002 | Matthes et al. |
| 6,431,762 B1 | 8/2002 | Taira et al. |
| 6,434,313 B1 | 8/2002 | Clapp, Jr. et al. |
| 6,438,310 B1 | 8/2002 | Lance et al. |
| 6,452,925 B1 | 9/2002 | Sistanizadeh et al. |
| 6,456,773 B1 | 9/2002 | Keys |
| 6,464,402 B1 | 10/2002 | Andrews et al. |
| 6,466,724 B1 | 10/2002 | Glover et al. |
| 6,469,905 B1 | 10/2002 | Hwang |
| D466,087 S | 11/2002 | Cuny et al. |
| 6,478,472 B1 | 11/2002 | Anderson et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,958 B1 | 11/2002 | Xue et al. |
| 6,496,640 B1 | 12/2002 | Harvey et al. |
| 6,504,988 B1 | 1/2003 | Trebesch et al. |
| 6,507,980 B2 | 1/2003 | Bremicker |
| 6,510,274 B1 | 1/2003 | Wu et al. |
| 6,515,227 B1 | 2/2003 | Massey et al. .................. 174/50 |
| 6,532,332 B2 | 3/2003 | Solheid et al. |
| 6,533,472 B1 | 3/2003 | Dinh et al. |
| 6,535,397 B2 | 3/2003 | Clark et al. |
| 6,535,682 B1 | 3/2003 | Puetz et al. |
| 6,539,147 B1 | 3/2003 | Mahony |
| 6,539,160 B2 | 3/2003 | Battey et al. |
| 6,542,688 B1 | 4/2003 | Battey et al. |
| 6,550,977 B2 | 4/2003 | Hizuka |
| 6,554,485 B1 | 4/2003 | Beatty et al. |
| 6,560,334 B1 | 5/2003 | Mullaney et al. |
| 6,567,601 B2 | 5/2003 | Daoud et al. |
| 6,571,048 B1 | 5/2003 | Bechamps et al. |
| 6,577,595 B1 | 6/2003 | Counterman |
| 6,577,801 B2 | 6/2003 | Broderick et al. |
| 6,579,014 B2 | 6/2003 | Melton et al. |
| 6,584,267 B1 | 6/2003 | Caveney et al. |
| 6,587,630 B2 | 7/2003 | Spence et al. |
| 6,588,938 B1 | 7/2003 | Lampert et al. |
| 6,591,051 B2 | 7/2003 | Solheid et al. |
| 6,591,053 B2 | 7/2003 | Fritz |
| 6,592,266 B1 | 7/2003 | Hankins et al. |
| 6,597,670 B1 | 7/2003 | Tweedy et al. |
| 6,600,866 B2 | 7/2003 | Gatica et al. |
| 6,601,997 B2 | 8/2003 | Ngo |
| 6,612,515 B1 | 9/2003 | Tinucci et al. |
| 6,614,978 B1 | 9/2003 | Caveney |
| 6,614,980 B1 | 9/2003 | Mahony |
| 6,621,975 B2 | 9/2003 | Laporte et al. |
| 6,625,374 B2 | 9/2003 | Holman et al. |
| 6,625,375 B1 | 9/2003 | Mahony |
| 6,631,237 B2 | 10/2003 | Knudsen et al. |
| 6,640,042 B2 | 10/2003 | Araki et al. |
| RE38,311 E | 11/2003 | Wheeler |
| 6,644,863 B1 | 11/2003 | Azami et al. |
| 6,647,197 B1 | 11/2003 | Marrs et al. |
| 6,648,520 B2 | 11/2003 | McDonald et al. |
| 6,654,536 B2 | 11/2003 | Battey et al. |
| 6,668,127 B1 | 12/2003 | Mahony |
| 6,669,149 B2 | 12/2003 | Akizuki |
| 6,677,520 B1 | 1/2004 | Kim et al. |
| 6,679,604 B1 | 1/2004 | Bove et al. |
| 6,684,005 B1 | 1/2004 | Egnell et al. |
| 6,687,450 B1 | 2/2004 | Kempeneers et al. |
| 6,693,552 B1 | 2/2004 | Herzig et al. |
| 6,701,056 B2 | 3/2004 | Burek et al. |
| 6,710,366 B1 | 3/2004 | Lee et al. |
| 6,715,619 B2 | 4/2004 | Kim et al. |
| 6,719,149 B2 | 4/2004 | Tomino |
| 6,741,784 B1 | 5/2004 | Guan |
| 6,741,785 B2 | 5/2004 | Barthel et al. |
| 6,746,037 B1 | 6/2004 | Kaplenski et al. |
| 6,748,154 B2 | 6/2004 | O'Leary et al. |
| 6,748,155 B2 | 6/2004 | Kim et al. |
| 6,758,600 B2 | 7/2004 | Del Grosso et al. |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,788,871 B2 | 9/2004 | Taylor |
| 6,792,190 B2 | 9/2004 | Xin et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 | 11/2004 | Nashimoto |
| 6,818,834 B1 | 11/2004 | Lin |
| 6,819,856 B2 | 11/2004 | Dagley et al. |
| 6,819,857 B2 | 11/2004 | Douglas et al. |
| 6,826,174 B1 | 11/2004 | Erekson et al. |
| 6,826,346 B2 | 11/2004 | Sloan et al. |
| 6,830,489 B2 | 12/2004 | Aoyama |
| 6,839,428 B2 | 1/2005 | Brower et al. |
| 6,839,438 B1 | 1/2005 | Riegelsberger et al. |
| 6,840,815 B2 | 1/2005 | Musolf et al. |
| 6,845,207 B2 | 1/2005 | Schray |
| 6,848,862 B1 | 2/2005 | Schlig |
| 6,850,685 B2 | 2/2005 | Tinucci et al. |
| 6,853,637 B1 | 2/2005 | Norrell et al. |
| 6,854,894 B1 | 2/2005 | Yunker et al. |
| 6,856,334 B1 | 2/2005 | Fukui |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B1 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke |
| 6,879,545 B2 | 4/2005 | Cooke et al. |
| 6,915,058 B2 | 7/2005 | Pons |
| 6,920,273 B2 | 7/2005 | Knudsen |
| 6,920,274 B2 | 7/2005 | Rapp et al. |
| 6,923,406 B2 | 8/2005 | Akizuki |
| 6,925,241 B2 | 8/2005 | Bohle et al. |
| 6,934,451 B2 | 8/2005 | Cooke |
| 6,934,456 B2 | 8/2005 | Ferris et al. |
| 6,935,598 B2 | 8/2005 | Sono et al. |
| 6,937,807 B2 | 8/2005 | Franklin et al. |
| 6,944,383 B1 | 9/2005 | Herzog et al. |
| 6,944,389 B2 | 9/2005 | Giraud et al. |
| 6,952,530 B2 | 10/2005 | Helvajian et al. |

(56) References Cited

U.S. PATENT DOCUMENTS

| | | |
|---|---|---|
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,985,665 B2 | 1/2006 | Baechtle |
| 6,993,237 B2 | 1/2006 | Cooke et al. |
| 7,000,784 B2 | 2/2006 | Canty et al. |
| 7,005,582 B2 | 2/2006 | Muller et al. |
| 7,006,748 B2 | 2/2006 | Dagley et al. |
| 7,007,296 B2 | 2/2006 | Rakib |
| 7,027,695 B2 | 4/2006 | Cooke et al. |
| 7,027,706 B2 | 4/2006 | Diaz et al. |
| 7,031,588 B2 | 4/2006 | Cowley et al. |
| 7,035,510 B2 | 4/2006 | Zimmel et al. |
| 7,038,137 B2 | 5/2006 | Grubish et al. |
| 7,054,513 B2 | 5/2006 | Herz et al. |
| 7,066,748 B2 | 6/2006 | Bricaud et al. |
| 7,068,907 B2 | 6/2006 | Schray |
| 7,070,459 B2 | 7/2006 | Denovich et al. |
| 7,077,710 B2 | 7/2006 | Haggay et al. |
| 7,079,744 B2 | 7/2006 | Douglas et al. |
| 7,090,406 B2 | 8/2006 | Melton et al. |
| 7,090,407 B2 | 8/2006 | Melton et al. |
| 7,094,095 B1 | 8/2006 | Caveney |
| 7,097,047 B2 | 8/2006 | Lee et al. |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,491 B1 | 10/2006 | Willey et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |
| 7,120,348 B2 | 10/2006 | Trebesch et al. |
| 7,120,349 B2 | 10/2006 | Elliott |
| 7,128,471 B2 | 10/2006 | Wilson |
| 7,139,462 B1 | 11/2006 | Richtman |
| 7,140,903 B2 | 11/2006 | Pulizzi et al. |
| 7,170,466 B2 | 1/2007 | Janoschka |
| 7,171,099 B2 | 1/2007 | Barnes et al. |
| 7,171,121 B1 | 1/2007 | Skarica et al. |
| 7,181,142 B1 | 2/2007 | Xu et al. |
| 7,193,783 B2 | 3/2007 | Willey et al. |
| 7,194,181 B2 | 3/2007 | Holmberg et al. |
| 7,195,521 B2 | 3/2007 | Musolf et al. |
| 7,200,314 B2 | 4/2007 | Womack et al. |
| 7,200,316 B2 | 4/2007 | Giraud et al. |
| 7,220,065 B2 | 5/2007 | Han et al. |
| 7,221,832 B2 | 5/2007 | Tinucci |
| 7,228,036 B2 | 6/2007 | Elkins, II et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,239,789 B2 | 7/2007 | Grubish et al. |
| 7,245,809 B1 | 7/2007 | Gniadek et al. |
| 7,259,325 B2 | 8/2007 | Pincu et al. |
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,287,913 B2 | 10/2007 | Keenum et al. |
| 7,289,731 B2 | 10/2007 | Thinguldstad |
| 7,292,769 B2 | 11/2007 | Watanabe et al. |
| 7,298,950 B2 | 11/2007 | Frohlich |
| 7,300,216 B2 | 11/2007 | Morse et al. |
| 7,300,308 B2 | 11/2007 | Laursen et al. |
| 7,302,149 B2 | 11/2007 | Swam et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,310,471 B2 | 12/2007 | Bayazit et al. |
| 7,310,472 B2 | 12/2007 | Haberman |
| 7,315,681 B2 | 1/2008 | Kewitsch |
| 7,325,975 B2 | 2/2008 | Yamada et al. |
| 7,330,625 B2 | 2/2008 | Barth |
| 7,330,626 B2 | 2/2008 | Kowalczyk et al. |
| 7,330,629 B2 | 2/2008 | Cooke et al. |
| 7,331,718 B2 | 2/2008 | Yazaki et al. |
| 7,340,145 B2 | 3/2008 | Allen |
| 7,349,615 B2 | 3/2008 | Frazier et al. |
| 7,373,071 B2 | 5/2008 | Douglas et al. |
| 7,376,321 B2 | 5/2008 | Bolster et al. |
| 7,376,323 B2 | 5/2008 | Zimmel |
| 7,391,952 B1 | 6/2008 | Ugolini et al. |
| 7,397,996 B2 | 7/2008 | Herzog et al. |
| 7,400,813 B2 | 7/2008 | Zimmel |
| 7,404,736 B2 | 7/2008 | Herbst et al. |
| 7,409,137 B2 | 8/2008 | Barnes |
| 7,414,198 B2 | 8/2008 | Stansbie et al. |
| 7,417,188 B2 | 8/2008 | McNutt et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,428,363 B2 | 9/2008 | Leon et al. |
| 7,437,049 B2 | 10/2008 | Krampotich |
| 7,439,453 B2 | 10/2008 | Murano et al. |
| 7,454,113 B2 | 11/2008 | Barnes |
| 7,460,757 B2 | 12/2008 | Hoehne et al. |
| 7,460,758 B2 | 12/2008 | Xin |
| 7,461,981 B2 | 12/2008 | Yow, Jr. et al. |
| 7,462,779 B2 | 12/2008 | Caveney et al. |
| 7,463,810 B2 | 12/2008 | Bayazit et al. |
| 7,463,811 B2 | 12/2008 | Trebesch et al. |
| 7,469,090 B2 | 12/2008 | Ferris et al. |
| 7,471,867 B2 | 12/2008 | Vogel et al. |
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,507,111 B2 | 3/2009 | Togami et al. |
| 7,509,015 B2 | 3/2009 | Murano |
| 7,509,016 B2 | 3/2009 | Smith et al. |
| 7,522,804 B2 | 4/2009 | Araki et al. |
| 7,523,898 B1 | 4/2009 | Barry et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,534,958 B2 | 5/2009 | McNutt et al. |
| 7,536,075 B2 | 5/2009 | Zimmel |
| 7,542,645 B1 | 6/2009 | Hua et al. |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,577,331 B2 | 8/2009 | Laurisch et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,377 B2 | 11/2009 | Gonzales et al. |
| 7,620,272 B2 | 11/2009 | Hino et al. |
| 7,620,287 B2 | 11/2009 | Appenzeller et al. |
| 7,641,398 B2 | 1/2010 | O'Riorden et al. |
| 7,668,430 B2 | 2/2010 | McClellan et al. |
| 7,668,433 B2 | 2/2010 | Bayazit et al. |
| 7,672,561 B1 | 3/2010 | Keith et al. |
| 7,676,135 B2 | 3/2010 | Chen |
| 7,697,811 B2 | 4/2010 | Murano et al. |
| 7,715,125 B2 | 5/2010 | Willey |
| 7,715,683 B2 | 5/2010 | Kowalczyk et al. |
| 7,734,138 B2 | 6/2010 | Bloodworth et al. |
| 7,740,409 B2 | 6/2010 | Bolton et al. |
| 7,743,495 B2 | 6/2010 | Mori et al. |

(56) References Cited

U.S. PATENT DOCUMENTS

| | | |
|---|---|---|
| 7,751,674 B2 | 7/2010 | Hill |
| 7,751,675 B2 | 7/2010 | Holmberg et al. |
| 7,756,382 B2 | 7/2010 | Saravanos et al. |
| 7,760,984 B2 | 7/2010 | Solheid et al. |
| 7,764,858 B2 | 7/2010 | Bayazit et al. |
| 7,764,859 B2 | 7/2010 | Krampotich et al. |
| 7,769,266 B2 | 8/2010 | Morris |
| 7,805,044 B2 | 9/2010 | Reagan et al. |
| 7,809,235 B2 | 10/2010 | Reagan et al. |
| 7,822,310 B2 | 10/2010 | Castonguay et al. |
| 7,850,372 B2 | 12/2010 | Nishimura et al. |
| 7,853,112 B2 | 12/2010 | Zimmel et al. |
| 7,856,166 B2 | 12/2010 | Biribuze et al. |
| 7,914,332 B2 | 3/2011 | Song et al. |
| 7,942,589 B2 | 5/2011 | Yazaki et al. |
| 7,945,135 B2 | 5/2011 | Cooke et al. |
| 7,945,136 B2 | 5/2011 | Cooke et al. |
| 7,945,138 B2 | 5/2011 | Hill et al. |
| 7,970,250 B2 | 6/2011 | Morris |
| 8,014,171 B2 | 9/2011 | Kelly et al. |
| 8,014,646 B2 | 9/2011 | Keith et al. |
| 8,020,813 B1 | 9/2011 | Clark et al. |
| 8,059,932 B2 | 11/2011 | Hill et al. |
| 8,107,785 B2 | 1/2012 | Berglund et al. |
| 8,131,126 B2 | 3/2012 | Kowalczyk et al. |
| 8,206,058 B2 | 6/2012 | Vrondran et al. |
| 8,369,679 B2 | 2/2013 | Wakileh et al. |
| 8,391,666 B2 | 3/2013 | Hetzer et al. |
| 8,472,773 B2 | 6/2013 | de Jong |
| 8,491,331 B2 | 7/2013 | Follingstad |
| 8,537,477 B2 | 9/2013 | Shioda |
| 2001/0010741 A1 | 8/2001 | Hizuka |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0034290 A1 | 3/2002 | Pershan |
| 2002/0037139 A1 | 3/2002 | Asao et al. |
| 2002/0064364 A1 | 5/2002 | Battey et al. |
| 2002/0131730 A1 | 9/2002 | Keeble et al. |
| 2002/0136519 A1 | 9/2002 | Tinucci et al. |
| 2002/0141724 A1 | 10/2002 | Ogawa et al. |
| 2002/0150372 A1 | 10/2002 | Schray |
| 2002/0172467 A1 | 11/2002 | Anderson et al. |
| 2002/0181918 A1 | 12/2002 | Spence et al. |
| 2002/0181922 A1 | 12/2002 | Xin et al. |
| 2002/0191939 A1 | 12/2002 | Daoud et al. |
| 2002/0194596 A1 | 12/2002 | Srivastava |
| 2003/0007743 A1 | 1/2003 | Asada |
| 2003/0007767 A1 | 1/2003 | Douglas et al. |
| 2003/0021539 A1 | 1/2003 | Kwon et al. |
| 2003/0066998 A1 | 4/2003 | Lee |
| 2003/0086675 A1 | 5/2003 | Wu et al. |
| 2003/0095753 A1 | 5/2003 | Wada et al. |
| 2003/0147604 A1 | 8/2003 | Tapia et al. |
| 2003/0174996 A1 | 9/2003 | Henschel et al. |
| 2003/0180012 A1 | 9/2003 | Deane et al. |
| 2003/0183413 A1 | 10/2003 | Kato |
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2003/0223725 A1 | 12/2003 | Laporte et al. |
| 2003/0235387 A1 | 12/2003 | Dufour |
| 2004/0011750 A1 | 1/2004 | Kim et al. ...................... 211/26 |
| 2004/0013389 A1 | 1/2004 | Taylor |
| 2004/0013390 A1 | 1/2004 | Kim et al. |
| 2004/0022494 A1 | 2/2004 | Liddle et al. |
| 2004/0067036 A1 | 4/2004 | Clark et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0120679 A1 | 6/2004 | Vincent et al. |
| 2004/0147159 A1 | 7/2004 | Urban et al. |
| 2004/0151465 A1 | 8/2004 | Krampotich et al. |
| 2004/0175090 A1 | 9/2004 | Vastmans et al. |
| 2004/0192115 A1 | 9/2004 | Bugg |
| 2004/0208459 A1 | 10/2004 | Mizue et al. |
| 2004/0228598 A1 | 11/2004 | Allen et al. |
| 2004/0240827 A1 | 12/2004 | Daoud et al. |
| 2004/0240882 A1 | 12/2004 | Lipski et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0026497 A1 | 2/2005 | Holliday |
| 2005/0036749 A1 | 2/2005 | Vogel et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0107086 A1 | 5/2005 | Tell et al. |
| 2005/0111809 A1 | 5/2005 | Giraud et al. |
| 2005/0111810 A1 | 5/2005 | Giraud et al. |
| 2005/0123261 A1 | 6/2005 | Bellekens et al. |
| 2005/0129379 A1 | 6/2005 | Reagan et al. |
| 2005/0175293 A1 | 8/2005 | Byers et al. |
| 2005/0201073 A1 | 9/2005 | Pincu et al. |
| 2005/0232566 A1 | 10/2005 | Rapp et al. |
| 2005/0233647 A1 | 10/2005 | Denovich et al. |
| 2005/0254757 A1 | 11/2005 | Ferretti, III et al. |
| 2005/0281526 A1 | 12/2005 | Vongseng et al. |
| 2005/0281527 A1 | 12/2005 | Wilson et al. |
| 2006/0007562 A1 | 1/2006 | Willey et al. |
| 2006/0018448 A1 | 1/2006 | Stevens et al. |
| 2006/0018622 A1 | 1/2006 | Caveney |
| 2006/0039290 A1 | 2/2006 | Roden et al. |
| 2006/0044774 A1 | 3/2006 | Vasavda et al. |
| 2006/0045458 A1 | 3/2006 | Sasaki et al. |
| 2006/0072606 A1 | 4/2006 | Posthuma |
| 2006/0077968 A1 | 4/2006 | Pitsoulakis et al. |
| 2006/0093303 A1 | 5/2006 | Reagan et al. |
| 2006/0110118 A1 | 5/2006 | Escoto et al. |
| 2006/0133759 A1 | 6/2006 | Mullaney et al. |
| 2006/0147172 A1 | 7/2006 | Luther et al. |
| 2006/0153517 A1 | 7/2006 | Reagan et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0215980 A1 | 9/2006 | Bayazit et al. |
| 2006/0228087 A1 | 10/2006 | Bayazit et al. |
| 2006/0269194 A1 | 11/2006 | Luther et al. |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047894 A1 | 3/2007 | Holmberg et al. |
| 2007/0104447 A1 | 5/2007 | Allen |
| 2007/0127201 A1 | 6/2007 | Mertesdorf et al. |
| 2007/0131628 A1 | 6/2007 | Mimlitch, III et al. |
| 2007/0189692 A1 | 8/2007 | Zimmel et al. |
| 2007/0196071 A1 | 8/2007 | Laursen et al. |
| 2007/0221793 A1 | 9/2007 | Kusuda et al. |
| 2007/0237484 A1 | 10/2007 | Reagan et al. |
| 2007/0257159 A1 | 11/2007 | Nelson et al. |
| 2007/0274718 A1 | 11/2007 | Bridges et al. |
| 2008/0011514 A1 | 1/2008 | Zheng et al. |
| 2008/0025683 A1 | 1/2008 | Murano |
| 2008/0031585 A1 | 2/2008 | Solheid et al. |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085094 A1 | 4/2008 | Krampotich |
| 2008/0089656 A1 | 4/2008 | Wagner et al. |
| 2008/0095541 A1 | 4/2008 | Dallesasse |

(56) References Cited

U.S. PATENT DOCUMENTS

| | | |
|---|---|---|
| 2008/0100440 A1 | 5/2008 | Downie et al. |
| 2008/0106871 A1 | 5/2008 | James |
| 2008/0112681 A1 | 5/2008 | Battey et al. |
| 2008/0118207 A1 | 5/2008 | Yamamoto et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145013 A1 | 6/2008 | Escoto et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175550 A1 | 7/2008 | Coburn et al. |
| 2008/0175551 A1 | 7/2008 | Smrha et al. |
| 2008/0175552 A1* | 7/2008 | Smrha et al. ............... 385/135 |
| 2008/0193091 A1 | 8/2008 | Herbst |
| 2008/0205823 A1 | 8/2008 | Luther et al. |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0247723 A1 | 10/2008 | Herzog et al. |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0296060 A1 | 12/2008 | Hawley et al. |
| 2008/0298763 A1 | 12/2008 | Appenzeller et al. |
| 2008/0304803 A1 | 12/2008 | Krampotich et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022470 A1 | 1/2009 | Krampotich |
| 2009/0038845 A1 | 2/2009 | Fransen et al. |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0074371 A1 | 3/2009 | Bayazit et al. |
| 2009/0080849 A1 | 3/2009 | Hankins et al. |
| 2009/0097813 A1 | 4/2009 | Hill |
| 2009/0136194 A1 | 5/2009 | Barnes |
| 2009/0136195 A1 | 5/2009 | Smrha et al. |
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0166404 A1 | 7/2009 | German et al. |
| 2009/0169163 A1 | 7/2009 | Abbott, III et al. |
| 2009/0175588 A1 | 7/2009 | Brandt et al. |
| 2009/0180749 A1 | 7/2009 | Douglas et al. |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1 | 8/2009 | Holmberg et al. |
| 2009/0207577 A1 | 8/2009 | Fransen et al. |
| 2009/0208178 A1 | 8/2009 | Kowalczyk et al. |
| 2009/0208210 A1 | 8/2009 | Trojer et al. |
| 2009/0214171 A1 | 8/2009 | Coburn et al. |
| 2009/0220200 A1 | 9/2009 | Sheau Tung Wong et al. |
| 2009/0220204 A1 | 9/2009 | Ruiz |
| 2009/0226142 A1 | 9/2009 | Barnes et al. |
| 2009/0238531 A1 | 9/2009 | Holmberg et al. |
| 2009/0245743 A1 | 10/2009 | Cote et al. |
| 2009/0252472 A1 | 10/2009 | Solheid et al. |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. |
| 2009/0269018 A1 | 10/2009 | Frohlich et al. |
| 2009/0274429 A1 | 11/2009 | Krampotich et al. |
| 2009/0274430 A1 | 11/2009 | Krampotich et al. |
| 2009/0274432 A1 | 11/2009 | Iwaya |
| 2009/0290842 A1 | 11/2009 | Bran de Leon et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0003000 A1 | 1/2010 | Rapp et al. |
| 2010/0012671 A1 | 1/2010 | Vrondran et al. |
| 2010/0054681 A1 | 3/2010 | Biribuze et al. |
| 2010/0054682 A1 | 3/2010 | Cooke et al. |
| 2010/0054685 A1 | 3/2010 | Cooke et al. |
| 2010/0054687 A1 | 3/2010 | Ye et al. |
| 2010/0061691 A1 | 3/2010 | Murano et al. |
| 2010/0061693 A1 | 3/2010 | Bran de Leon et al. |
| 2010/0074587 A1 | 3/2010 | Loeffelholz et al. |
| 2010/0080517 A1 | 4/2010 | Cline et al. |
| 2010/0086267 A1 | 4/2010 | Cooke et al. |
| 2010/0086274 A1 | 4/2010 | Keith |
| 2010/0111483 A1 | 5/2010 | Reinhardt et al. |
| 2010/0119201 A1 | 5/2010 | Smrha et al. |
| 2010/0142544 A1 | 6/2010 | Chapel et al. |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0178022 A1 | 7/2010 | Schroeder et al. |
| 2010/0202745 A1 | 8/2010 | Sokolowski et al. |
| 2010/0220967 A1 | 9/2010 | Cooke et al. |
| 2010/0247051 A1 | 9/2010 | Kowalczyk et al. |
| 2010/0278499 A1 | 11/2010 | Mures et al. |
| 2010/0296790 A1 | 11/2010 | Cooke et al. |
| 2010/0310225 A1 | 12/2010 | Anderson et al. |
| 2010/0310226 A1 | 12/2010 | Wakileh et al. |
| 2010/0316334 A1 | 12/2010 | Kewitsch |
| 2010/0322582 A1 | 12/2010 | Cooke et al. |
| 2010/0322583 A1 | 12/2010 | Cooke et al. |
| 2010/0329624 A1 | 12/2010 | Zhou et al. |
| 2011/0069931 A1 | 3/2011 | Cote et al. |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |
| 2011/0097977 A1 | 4/2011 | Bubnick et al. |
| 2011/0186532 A1 | 8/2011 | Wu |
| 2011/0192631 A1 | 8/2011 | Burek et al. |
| 2011/0211799 A1 | 9/2011 | Conner et al. |
| 2011/0217016 A1 | 9/2011 | Mullsteff |
| 2011/0222821 A1 | 9/2011 | Pitwon et al. |
| 2011/0268404 A1 | 11/2011 | Cote et al. |
| 2011/0280537 A1 | 11/2011 | Cowen et al. |
| 2012/0051707 A1 | 3/2012 | Barnes et al. |
| 2012/0057838 A1 | 3/2012 | Hill et al. |
| 2012/0183263 A1 | 7/2012 | Wu |
| 2013/0077927 A1 | 3/2013 | O'Connor |

FOREIGN PATENT DOCUMENTS

| | | |
|---|---|---|
| CH | 688705 A5 | 1/1998 |
| DE | 8711970 U1 | 10/1987 |
| DE | 3726718 A1 | 2/1989 |
| DE | 3726719 A1 | 2/1989 |
| DE | 4030301 A1 | 3/1992 |
| DE | 4231181 C1 | 8/1993 |
| DE | 20115940 U1 | 1/2002 |
| DE | 10338848 A1 | 3/2005 |
| DE | 202005009932 U1 | 11/2005 |
| DE | 102007024476 A1 | 11/2008 |
| EP | 0105597 A2 | 4/1984 |
| EP | 0250900 A2 | 1/1988 |
| EP | 0408266 A2 | 1/1991 |
| EP | 0474091 A1 | 8/1991 |
| EP | 0468671 A1 | 1/1992 |
| EP | 0490698 A1 | 6/1992 |
| EP | 0529830 A1 | 3/1993 |
| EP | 0544004 A1 | 6/1993 |
| EP | 0547778 A1 | 6/1993 |
| EP | 0581527 A1 | 2/1994 |
| EP | 0620462 A1 | 10/1994 |
| EP | 0693699 A1 | 1/1996 |
| EP | 0720322 A2 | 7/1996 |
| EP | 0940700 A2 | 9/1999 |
| EP | 0949522 A2 | 10/1999 |

(56) References Cited

FOREIGN PATENT DOCUMENTS

| | | |
|---|---|---|
| EP | 1041417 A2 | 10/2000 |
| EP | 1056177 A1 | 11/2000 |
| EP | 1065542 A1 | 1/2001 |
| EP | 1203974 A2 | 5/2002 |
| EP | 1289319 A2 | 3/2003 |
| EP | 1316829 A2 | 6/2003 |
| EP | 1367308 A1 | 12/2003 |
| EP | 1621907 A1 | 2/2006 |
| EP | 1777563 A1 | 4/2007 |
| FR | 2378378 A1 | 8/1978 |
| GB | 2241591 A | 9/1991 |
| GB | 2277812 A | 11/1994 |
| GB | 2367379 A | 4/2002 |
| JP | 3172806 A | 7/1991 |
| JP | 5045541 A | 2/1993 |
| JP | 06018749 A | 1/1994 |
| JP | 7308011 A | 11/1995 |
| JP | 8007308 A | 1/1996 |
| JP | 8248235 A | 9/1996 |
| JP | 8248237 A | 9/1996 |
| JP | 3487946 A | 10/1996 |
| JP | 8254620 A | 10/1996 |
| JP | 3279474 A | 10/1997 |
| JP | 9258033 A | 10/1997 |
| JP | 9258055 A | 10/1997 |
| JP | 2771870 B2 | 7/1998 |
| JP | 3448448 A | 8/1998 |
| JP | 10227919 A | 8/1998 |
| JP | 3478944 A | 12/1998 |
| JP | 10332945 A | 12/1998 |
| JP | 10339817 A | 12/1998 |
| JP | 11023858 A | 1/1999 |
| JP | 2000098138 A | 4/2000 |
| JP | 2000098139 A | 4/2000 |
| JP | 2000241631 A | 9/2000 |
| JP | 2001004849 A | 1/2001 |
| JP | 3160322 B2 | 4/2001 |
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 2002169035 A | 6/2002 |
| JP | 3312893 B2 | 8/2002 |
| JP | 2002305389 A | 10/2002 |
| JP | 3344701 B2 | 11/2002 |
| JP | 2003029054 A | 1/2003 |
| JP | 3403573 B2 | 5/2003 |
| JP | 2003169026 A | 6/2003 |
| JP | 2003215353 A | 7/2003 |
| JP | 2003344701 A | 12/2003 |
| JP | 3516765 B2 | 4/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 2004361652 A | 12/2004 |
| JP | 2004361893 A | 12/2004 |
| JP | 3107704 U | 2/2005 |
| JP | 2005055748 A | 3/2005 |
| JP | 2005062569 A | 3/2005 |
| JP | 2005084241 A | 3/2005 |
| JP | 2005148327 A | 6/2005 |
| JP | 2005257937 A | 9/2005 |
| JP | 3763645 B2 | 4/2006 |
| JP | 3778021 B2 | 5/2006 |
| JP | 2006126513 A | 5/2006 |
| JP | 2006126516 A | 5/2006 |
| JP | 3794540 B2 | 7/2006 |
| JP | 2006227041 A1 | 8/2006 |
| JP | 3833638 B2 | 10/2006 |
| JP | 2006292924 A | 10/2006 |
| JP | 3841344 B2 | 11/2006 |
| JP | 3847533 B2 | 11/2006 |
| JP | 200747336 A | 2/2007 |
| JP | 3896035 B2 | 3/2007 |
| JP | 2007067458 A1 | 3/2007 |
| JP | 3934052 B2 | 6/2007 |
| JP | 3964191 B2 | 8/2007 |
| JP | 3989853 B2 | 10/2007 |
| JP | 4026244 B2 | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 4184329 B2 | 11/2008 |
| JP | 2008542822 T | 11/2008 |
| JP | 2009503582 T | 1/2009 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9712268 A1 | 4/1997 |
| WO | 9736197 A1 | 10/1997 |
| WO | 9744605 A1 | 11/1997 |
| WO | 9825416 A1 | 6/1998 |
| WO | 9927404 A1 | 6/1999 |
| WO | 0005611 A2 | 2/2000 |
| WO | 0127660 A2 | 4/2001 |
| WO | 0242818 A1 | 5/2002 |
| WO | 03009527 A2 | 1/2003 |
| WO | 2004052066 A1 | 6/2004 |
| WO | 2006/127400 A2 | 11/2006 |
| WO | 2007050515 A1 | 5/2007 |
| WO | 2007079074 A2 | 7/2007 |
| WO | 2007149215 A2 | 12/2007 |
| WO | 2008063054 A2 | 5/2008 |
| WO | 2008113054 A2 | 9/2008 |
| WO | 2008157248 A1 | 12/2008 |
| WO | 2009120280 A2 | 10/2009 |
| WO | 2010080745 A1 | 7/2010 |
| WO | 2011011510 A2 | 1/2011 |

OTHER PUBLICATIONS

Non-Final Office Action for U.S. Appl. No. 12/952,912 mailed Dec. 28, 2012, 9 pages.

Non-Final Office Action for U.S. Appl. No. 12/953,118 mailed Jan. 7, 2013, 9 pages.

Annex to Form PCT/ISA/2006, Communication Relating to the Results of the Partial International Search, for PCT/US2009/004549 mailed Feb. 10, 2010, 2 pages.

Annex to Form PCT/ISA/206, Communication Relating to the Results of the Partial International Search, for PCT/US2009/004548 mailed Jan. 19, 2010, 2 pages.

Corning Cable Systems, "Corning Cable Systems Products for BellSouth High Density Shelves," Jun. 2000, 2 pages.

Corning Cable Systems, "Corning Cable Systems Quick Reference Guide for Verizon FTTP FDH Products," Jun. 2005, 4 pages.

Conner, M. "Passive Optical Design for RFOG and Beyond," Braodband Properties, Apr. 2009, pp. 78-81.

Corning Evolant, "Eclipse Hardware Family," Nov. 2009, 1 page.

Corning Evolant, "Enhanced Management Frame," Dec. 2009, 1 page.

Corning Evolant, "Enhanced Management Frame (EMF)," Specification Sheet, Nov. 2009, 24 pages.

Corning Cable Systems, "Evolant Solutions for Evolving Networks: Fiber Optic Hardware," Oct. 2002, 2 pages.

Corning Cable Systems, "Fiber Optic Hardware with Factory-Installed Pigtails: Features and Benefits," Nov. 2010, 12 pages.

Corning Cable Systems, "FiberManager System 1- and 3-Position Compact Shelves," Jan. 2003, 4 pages.

Corning Cable Systems, "FiberManager System Frame and Components," Jan. 2003, 12 pages.

Corning Cable Systems, "High Density Frame," Jul. 2001, 2 pages.

Corning Cable Systems, "High Density Frame (HDF) Connector-Splice Shelves and Housings," May 2003, 4 pages.

(56) References Cited

OTHER PUBLICATIONS

International Search Report for PCT/US10/35529 mailed Jul. 23, 2010, 2 pages.
International Search Report for PCT/US10/35563 mailed Jul. 23, 2012, 1 page.
International Search Report for PCT/US2008/002514 mailed Aug. 8, 2008, 2 pages.
International Search Report for PCT/US2008/010317 mailed Mar. 4, 2008, 2 pages.
International Search Report for PCT/US2009/001692 mailed Nov. 24, 2009, 5 pages.
International Search Report for PCT/US2010/024888 mailed Jun. 23, 2010, 5 pages.
International Search Report for PCT/US2010/027402 mailed Jun. 16, 2010, 2 pages.
Corning Cable Systems, "MTX Frames and Accessories," Feb. 2006, 4 pages.
Panduit, "Lock-in LC Duplex Clip," Accessed Mar. 22, 2012, 1 page.
International Search Report for PCT/US06/49351 mailed Apr. 25, 2008, 1 page.
International Search Report for PCT/US09/57069 mailed Mar. 24, 2010, 2 pages.
International Search Report for PCT/US2009/057244 mailed Nov. 9, 2009 3 pages.
International Search Report for PCTUS2009004548 mailed Mar. 19, 2010, 5 pages.
International Search Report for PCTUS2009004549 mailed Apr. 20, 2010, 6 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US2010/023901 mailed Aug. 25, 2011, 8 pages.
Advisory Action for U.S. Appl. No. 12/221,117 mailed Aug. 24, 2011, 3 pages.
Examiner's Answer to Appeal Brief for U.S. Appl. No. 12/221,117 mailed Mar. 29, 2012, 16 pages.
Final Office Action for U.S. Appl. No. 12/221,117 mailed Feb. 19, 2010, 7 pages.
Final Office Action for U.S. Appl. No. 12/221,117 mailed Jun. 10, 2011, 8 pages.
Non-final Office Action for U.S. Appl. No. 12/221,117 mailed Jul. 14, 2010, 7 pages.
Non-final Office Action for U.S. Appl. No. 12/221,117 mailed Jun. 9, 2009, 5 pages.
Non-final Office Action for U.S. Appl. No. 12/221,117 mailed Dec. 21, 2010, 7 pages.
Advisory Action for U.S. Appl. No. 12/394,483 mailed Feb. 16, 2012, 3 pages.
Final Office Action for U.S. Appl. No. 12/394,483 mailed Dec. 6, 2011, 14 pages.
Non-final Office Action for U.S. Appl. No. 12/394,483 mailed Jun. 17, 2011, 11 pages.
Advisory Action for U.S. Appl. No. 12/950,234 mailed Dec. 21, 2011, 3 pages.
Non-final Office Action for U.S. Appl. No. 12/950,234 mailed Jun. 17, 2011, 7 pages.
Non-final Office Action for U.S. Appl. No. 12/950,234 mailed Mar. 12, 2012, 10 pages.
Final Office Action for U.S. Appl. No. 12/950,234 mailed Oct. 14, 2011, 10 pages.
Advisory Action mailed May 12, 2011, for U.S. Appl. No. 12/323,423, 3 pages.
Final Rejection mailed Mar. 3, 2011, for U.S. Appl. No. 12/323,423, 17 pages.
Non-Final Rejection mailed Aug. 5, 2011, for U.S. Appl. No. 12/323,423, 13 pages.
Unknown, Author, "QuickNet SFQ Series MTP Fiber Optic Cassettes," Panduit Specification Sheet, Jan. 2009, 2 pages.
Unknown Author, "Cellular Specialties introduces the first simulated in-building location-based tracking solution," smart-grid.tmenet.com/news, Sep. 14, 2009, 2 pages.
Unknown Author, "CDMA Co-Pilot Transmitter," Cellular Specialties, Inc., Aug. 2009, 2 pages.
International Search Report for PCT/US2010/038986 mailed Aug. 18, 2010, 1 page.
International Search Report for PCT/US2010/023901 mailed Jun. 11, 2010, 3 pages.
Notice of Allowance for U.S. Appl. No. 12/576,769 mailed May 31, 2012, 9 pages.
Non-final Office Action for U.S. Appl. No. 12/576,806 mailed Dec. 13, 2011, 6 pages.
Notice of Allowance for U.S. Appl. No. 12/576,806 mailed Apr. 18, 2012, 5 pages.
Non-Final Office Action for U.S. Appl. No. 12/707,889 mailed Jan. 2, 2013, 7 pages.
Non-Final Office Action for U.S. Appl. No. 12/953,536 mailed Jan. 2, 2013, 20 pages.
Final Office Action for U.S. Appl. No. 12/394,114 mailed Oct. 25, 2012, 8 pages.
Non-final Office Action for U.S. Appl. No. 12/732,487 mailed Sep. 19, 2012, 22 pages.
Non-final Office Action for U.S. Appl. No. 12/818,986 mailed Feb. 3, 2012, 12 pages.
Final Office Action for U.S. Appl. No. 12/818,986 mailed Oct. 18, 2012, 13 pages.
Non-final Office Action for U.S. Appl. No. 12/952,960 mailed Oct. 4, 2012, 11 pages.
Non-final Office Action for U.S. Appl. No. 12/953,134 mailed Sep. 25, 2012, 8 pages.
Non-final Office Action for U.S. Appl. No. 12/915,682 mailed Oct. 24, 2012, 8 pages.
Non-final Office Action for U.S. Appl. No. 12/946,139 mailed Jul. 26, 2012, 12 pages.
Final Office Action for U.S. Appl. No. 12/946,139 mailed Feb. 15, 2013, 17 pages.
Non-final Office Action for U.S. Appl. No. 12/751,884 mailed Feb. 15, 2013, 5 pages.
Non-final Office Action for U.S. Appl. No. 12/394,114 mailed Feb. 27, 2013, 8 pages.
Non-final Office Action for U.S. Appl. No. 12/819,065 mailed Mar. 4, 2013, 7 pages.
Final Office Action for U.S. Appl. No. 12/952,960 mailed Mar. 7, 2013, 13 pages.
Notice of Allowance for U.S. Appl. No. 12/732,487 mailed Mar. 19, 2013, 11 pages.
Non-final Office Action for U.S. Appl. No. 12/953,134 mailed Mar. 21, 2013, 9 pages.
Final Office Action for U.S. Appl. No. 12/641,617 mailed May 10, 2013, 21 pages.
European Search Report for patent application 10790017.7 mailed Nov. 8, 2012, 7 pages.
Examination Report for European patent application 09789090.9-2216 mailed Aug. 29, 2011, 4 pages.
Examination Report for European patent application 09789090.9-2216 mailed Mar. 30, 2012, 6 pages.
Written Opinion of the International Searching Authority for International patent application PCT/US2009004548, mailed Apr. 5, 2011, 6 pages.
European Search Report for European patent application 09789090.9-2217 mailed Jan. 24, 2013, 5 pages.
Notice of Allowance for U.S. Appl. No. 13/090,621 mailed Apr. 22, 2013, 8 pages.
Final Office Action for U.S. Appl. No. 12/953,039 mailed May 1, 2013, 8 pages.

(56) References Cited

OTHER PUBLICATIONS

Final Office Action for U.S. Appl. No. 12/953,118 mailed May 3, 2013, 11 pages.
Final Office Action for U.S. Appl. No. 12/915,682 mailed Apr. 18, 2013, 9 pages.
Advisory Action for U.S. Appl. No. 12/952,960 mailed May 15, 2013, 2 pages.
Non-final Office Action for U.S. Appl. No. 12/952,960 mailed Jun. 20, 2013, 13 pages.
Non-final Office Action for U.S. Appl. No. 12/953,536 mailed Jun. 6, 2013, 21 pages.
Non-final Office Action for U.S. Appl. No. 11/820,300 mailed Apr. 25, 2012, 10 pages.
Final Office Action for U.S. Appl. No. 12/871,052 mailed Jul. 1, 2013, 12 pages.
Non-final Office Action for U.S. Appl. No. 12/940,699 mailed Jun. 26, 2013, 9 pages.
Notice of Allowance for U.S. Appl. No. 13/090,621 mailed Jun. 25, 2013, 8 pages.
Non-Final Rejection mailed Sep. 7, 2010, for U.S. Appl. No. 12/323,423, 18 pages.
Notice of Allowance for U.S. Appl. No. 12/323,423 mailed Jan. 24, 2012, 8 pages.
Examiner's Answer mailed Mar. 4, 2011, for U.S. Appl. No. 12/323,415, 11 pages.
Final Rejection mailed Jun. 25, 2010, for U.S. Appl. No. 12/323,415, 10 pages.
Non-Final Rejection mailed Aug. 5, 2011, for U.S. Appl. No. 12/323,415, 41 pages.
Non-final Office Action for U.S. Appl. No. 12/323,415 mailed Apr. 23, 2012, 11 pages.
Non-Final Rejection mailed Dec. 10, 2009, for U.S. Appl. No. 12/323,415, 7 pages.
Examiner's Answer to Appeal Brief for U.S. Appl. No. 11/320,062 mailed Dec. 8, 2011, 8 pages.
Final Office Action for U.S. Appl. No. 11/320,062 mailed Mar. 8, 2011, 8 pages.
Non-final Office Action for U.S. Appl. No. 11/320,062 mailed Jan. 15, 2010, 11 pages.
Non-final Office Action for U.S. Appl. No. 12/320,062 mailed Sep. 30, 2010, 7 pages.
Final Office Action for U.S. Appl. No. 11/439,086 mailed Feb. 4, 2010, 14 pages.
Non-final Office Action for U.S. Appl. No. 11/439,086 mailed May 3, 2010, 11 pages.
Non-final Office Action for U.S. Appl. No. 11/439,086 mailed Sep. 21, 2009, 10 pages.
Final Office Action for U.S. Appl. No. 12/079,481 mailed Mar. 18, 2010, 10 pages.
Non-final Office Action for U.S. Appl. No. 12/079,481 mailed Dec. 26, 2008, 9 pages.
Non-final Office Action for U.S. Appl. No. 12/079,481 mailed Sep. 16, 2009, 10 pages.
Notice of Allowance for U.S. Appl. No. 12/079,481 mailed Jun. 3, 2010, 6 pages.
Notice of Allowance for U.S. Appl. No. 12/079,481 mailed Oct. 4, 2010, 4 pages.
Final Office Action for U.S. Appl. No. 12/394,114 mailed Dec. 22, 2011, 8 pages.
Non-final Office Action for U.S. Appl. No. 12/394,114 mailed Mar. 16, 2012, 8 pages.
Non-final Office Action for U.S. Appl. No. 12/394,114 mailed Sep. 1, 2011, 7 pages.
Non-final Office Action for U.S. Appl. No. 12/323,373 mailed May 3, 2012, 7 pages.
Non-final Office Action for U.S. Appl. No. 11/809,474 mailed Apr. 8, 2008, 13 pages.
Non-final Office Action for U.S. Appl. No. 11/809,474 mailed Nov. 13, 2008, 10 pages.
Notice of Allowance for U.S. Appl. No. 11/809,474 mailed Jul. 6, 2009, 6 pages.
Final Office Action for U.S. Appl. No. 11/320,031 mailed Mar. 8, 2011, 8 pages.
Non-final Office Action for U.S. Appl. No. 11/320,031 mailed Jan. 5, 2010, 16 pages.
Non-final Office Action for U.S. Appl. No. 11/320,031 mailed Sep. 30, 2010, 7 pages.
Notice of Allowance for U.S. Appl. No. 11/320,031 mailed Nov. 15, 2011, 7 pages.
Non-final Office Action for U.S. Appl. No. 12/157,622 mailed Mar. 31, 2009, 9 pages.
Non-final Office Action for U.S. Appl. No. 12/157,622 mailed Oct. 15, 2009, 9 pages.
Notice of Allowance for U.S. Appl. No. 12/157,622 mailed Apr. 22, 2010, 4 pages.
Non-final Office Action for U.S. Appl. No. 12/323,395 mailed Dec. 8, 2011, 7 pages.
Non-final Office Action for U.S. Appl. No. 12/415,454 mailed Mar. 2, 2012, 5 pages.
Non-final Office Action for U.S. Appl. No. 12/415,454 mailed Sep. 6, 2011, 7 pages.
Notice of Allowance for U.S. Appl. No. 12/415,454 mailed Jan. 13, 2012, 5 pages.
Non-final Office Action for U.S. Appl. No. 12/576,769 mailed Feb. 2, 2012, 23 pages.
Notice of Allowance for U.S. Appl. No. 12/415,454 mailed Jun. 19, 2012, 5 pages.
International Search Report for PCT/US2009/066779 mailed Aug. 27, 2010, 3 pages.
"MPO Fiber Optic Rack Panels now available from L-com Connectivity Products," article dated Jun. 4, 2007, 16 pages, http://www.l-com.com/content/Article.aspx?Type=P&ID=438.
"19" Rack Panel with 16 MPO Fiber Optic Couplers—1U high, product page, accessed Oct. 23, 2012, 2 pages, http://www.l-com.com/item.aspx?id=9767#.UlbgG8XXay5.
"Drawing for L-com 1U Panel with 16 MTP couplers," May 15, 2007, 1 page, http://www.l-com.com/multimedia/eng_drawings/PR17516MTP.pdf.
"RapidNet Fibre MTP VHD Cassette," Brochure, Date Unknown, 1 page, http://www.hellermanntyton.se/documents/5000/576_fiber_1U.pdf.
"MPO for Gigabit Ethernet/FAS-NET MTP Solution," Brochure, Date Unknown, 11 pages, http://www.infinique.com/upload/13182286190.pdf.
"Hubbell OptiChannel High Density 144 Port 1U Fiber Enclosure," Brochure, Date Unknown, 2 pages, http://www.hubbell-premise.com/literature/PLDF010.pdf.
Non-final Office Action for U.S. Appl. No. 12/771,473 mailed Oct. 4, 2012, 6 pages.
Non-final Office Action for U.S. Appl. No. 12/819,081 mailed Aug. 21, 2012, 12 pages.
Notice of Allowance for U.S. Appl. No. 12/417,325 mailed Aug. 22, 2012, 7 pages.
Notice of Panel Decision for Pre-Appeal Brief for U.S. Appl. No. 12/417,325 mailed Aug. 8, 2012, 2 pages.
Advisory Action for U.S. Appl. No. 12/417,325 mailed Jun. 29, 2012, 3 pages.
Advisory Action for U.S. Appl. No. 12/417,325 mailed Jun. 12, 2012, 3 pages.
Final Office Action for U.S. Appl. No. 12/417,325 mailed Apr. 16, 2012, 6 pages.
Final Office Action for U.S. Appl. No. 12/417,325 mailed Feb. 7, 2012, 7 pages.
Non-final Office Action for U.S. Appl. No. 12/417,325 mailed Jun. 15, 2011, 6 pages.
Notice of Allowance for U.S. Appl. No. 12/487,929 mailed Sep. 12, 2012, 4 pages.
Notice of Allowance for U.S. Appl. No. 12/487,929 mailed Jun. 13, 2012, 8 pages.
Advisory Action for U.S. Appl. No. 12/487,929 mailed Apr. 17, 2012, 3 pages.

(56) References Cited

OTHER PUBLICATIONS

Final Office Action for U.S. Appl. No. 12/487,929 mailed Feb. 14, 2012, 6 pages.
Final Office Action for U.S. Appl. No. 12/487,929 mailed Dec. 5, 2011, 7 pages.
Non-final Office Action for U.S. Appl. No. 12/487,929 mailed May 23, 2011, 7 pages.
Notice of Allowance for U.S. Appl. No. 12/415,253 mailed Mar. 11, 2011, 7 pages.
Non-final Office Action for U.S. Appl. No. 12/415,253 mailed Jul. 12, 2010, 11 pages.
Final Office Action for U.S. Appl. No. 12/415,253 mailed Apr. 16, 2010, 9 pages.
Non-final Office Action for U.S. Appl. No. 12/415,253 mailed Sep. 30, 2009, 8 pages.
Non-final Office Action for U.S. Appl. No. 12/641,617 mailed Oct. 5, 2012, 21 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Non-final Office Action for U.S. Appl. No. 12/751,884 mailed Jul. 2, 2012, 9 pages.
Non-final Office Action for U.S. Appl. No. 12/871,052 mailed Aug. 13, 2012, 8 pages.
Final Office Action for U.S. Appl. No. 12/952,912 mailed Aug. 30, 2013, 15 pages.
Advisory Action for U.S. Appl. No. 12/771,473 mailed Oct. 2, 2013, 3 pages.
Notice of Allowance for U.S. Appl. No. 12/641,617 mailed Sep. 4, 2013, 9 pages.
Notice of Allowance for U.S. Appl. No. 12/871,052 mailed Sep. 18, 2013, 9 pages.
Non-final Office Action for U.S. Appl. No. 12/953,039 mailed Sep. 12, 2013, 8 pages.
Non-final Office Action for U.S. Appl. No. 12/946,139 mailed Oct. 2, 2013, 18 pages.
Final Office Action for U.S. Appl. No. 12/394,114 mailed Oct. 4, 2013, 10 pages.
Non-final Office Action for U.S. Appl. No. 12/818,986 mailed Oct. 4, 2013, 19 pages.
Advisory Action for U.S. Appl. No. 12/953,134 mailed Nov. 4, 2013, 3 pages.
Final Office Action for U.S. Appl. No. 12/952,960 mailed Oct. 29, 2013, 8 pages.
Notice of Allowance for U.S. Appl. No. 13/292,130 mailed Oct. 18, 2013, 9 pages.
Non-final Office Action for U.S. Appl. No. 13/901,074 mailed Oct. 9, 2013, 6 pages.
Non-final Office Action for U.S. Appl. No. 12/956,446 mailed Sep. 6, 2013, 10 pages.
International Search Report and Written Opinion for PCT/US2011/035683 mailed Sep. 8, 2011, 15 pages.
International Search Report and Written Opinion for PCT/US2010/039218 mailed Oct. 27, 2010, 13 pages.
International Search Report and Written Opinion for PCT/US2011/035684 mailed Jul. 1, 2011, 11 pages.
International Search Report and Written Opinion for PCT/US11/61754 mailed Mar. 26, 2012, 9 pages.
First Office Action for Chinese patent application 201080032453.2 issued Mar. 26, 2013, 6 pages.
Chinese Search Report for Chinese patent application 201080032453.2 mailed May 15, 2013, 2 pages.
First Office Action for Chinese patent application 201080031621.6 mailed Sep. 26, 2013, 9 pages.
Chinese Search Report for Chinese patent application 201080031621.6 mailed Sep. 13, 2013, 2 pages.
Ramdas, "Modern File Systems and Storage," Proceedings of the 2nd International SANE Conference, May 22-25, 2000, MECC, Maastricht, The Netherlands, Copyright Rodney R. Ramdas, 10 pages.
Author Unknown, "144 Fiber Patch Panel 1U," Technical Data, ADTEK Group Limited, 2009, 2 pages.
Non-final Office Action for U.S. Appl. No. 13/603,894 mailed Oct. 3, 2013, 9 pages.
Advisory Action for U.S. Appl. No. 12/394,114 mailed Jan. 2, 2014, 3 pages.
Notice of Allowance for U.S. Appl. No. 12/871,052 mailed Dec. 24, 2013, 9 pages.
Final Office Action for U.S. Appl. No. 12/953,039 mailed Dec. 27, 2013, 10 pages.
Advisory Action for U.S. Appl. No. 12/952,960 mailed Jan. 8, 2014, 3 pages.
Advisory Action for U.S. Appl. No. 12/952,912 mailed Nov. 26, 2013, 3 pages.
Examiner's Answer to the Appeal Brief for U.S. Appl. No. 12/953,118 mailed Dec. 3, 2013, 6 pages.
Non-final Office Action for U.S. Appl. No. 13/597,549 mailed Jan. 14, 2014, 9 pages.
Final Office Action for U.S. Appl. No. 12/732,487 mailed Dec. 6, 2013, 24 pages.
Final Office Action for U.S. Appl. No. 12/956,446 mailed Dec. 23, 2013, 12 pages.
Non-final Office Action for U.S. Appl. No. 12/953,536 mailed Dec. 17, 2013, 21 pages.
Non-final Office Action for U.S. Appl. No. 12/819,065 mailed Dec. 3, 2013, 8 pages.
International Search Report and Written Opinion for PCT/US2011/062353 mailed Apr. 10, 2012, 15 pages.
Non-final Office Action for U.S. Appl. No. 12/956,475 mailed Oct. 4, 2012, 7 pages.
Non-final Office Action for U.S. Appl. No. 13/302,067 mailed Jun. 7, 2013, 13 pages.
Final Office Action for U.S. Appl. No. 12/771,473 mailed Jul. 19, 2013, 7 pages.
Notice of Allowance for U.S. Appl. No. 12/751,884 mailed Jul. 17, 2013, 8 pages.
Advisory Action for U.S. Appl. No. 12/641,617 mailed Jul. 29, 2013, 3 pages.
Final Office Action for U.S. Appl. No. 12/953,134 mailed Aug. 23, 2013, 11 pages.
Ex parte Quayle Action for U.S. Appl. No. 12/953,164 mailed Aug. 16, 2013, 5 pages.
Non-final Office Action for U.S. Appl. No. 12/732,487 mailed Jul. 17, 2013, 22 pages.
Non-final Office Action and Interview Summary for U.S. Appl. No. 12/707,889 mailed Aug. 8, 2013, 15 pages.
Advisory Action for U.S. Appl. No. 12/953,039 mailed Jul. 12, 2013, 3 pages.
Advisory Action for U.S. Appl. No. 12/953,118 mailed Jul. 12, 2013, 3 pages.
Notice of Allowance for U.S. Appl. No. 13/292,130 mailed Feb. 14, 2014, 7 pages.
Final Office Action for U.S. Appl. No. 12/707,889 mailed Feb. 11, 2014, 17 pages.
Non-final Office Action for U.S. Appl. No. 12/940,699 mailed Feb. 3, 2014, 10 pages.
Notice of Allowance for U.S. Appl. No. 12/952,960 mailed Feb. 13, 2014, 7 pages.
Notice of Allowance and Applicant-Initiated Interview Summary for U.S. Appl. No. 12/771,473 mailed Feb. 27, 2014, 8 pages.
Non-final Office Action for U.S. Appl. No. 13/688,675 mailed Jan. 31, 2014, 13 pages.
Non-final Office Action for U.S. Appl. No. 13/663,975 mailed Jan. 31, 2014, 18 pages.
Non-final Office Action for U.S. Appl. No. 12/394,114 mailed Mar. 21, 2014, 9 pages.

(56) References Cited

OTHER PUBLICATIONS

Non-final Office Action for U.S. Appl. No. 12/953,101 mailed Apr. 3, 2014, 9 pages.
Advisory Action for U.S. Appl. No. 12/953,039 mailed Mar. 6, 2014, 3 pages.
Advisory Action for U.S. Appl. No. 12/956,446 mailed Mar. 20, 2014, 3 pages.
Final Office Action for U.S. Appl. No. 13/603,894 mailed Mar. 20, 2014, 15 pages.
Final Office Action for U.S. Appl. No. 12/947,883 mailed Mar. 31, 2014, 13 pages.
International Preliminary Report on Patentability for PCT/US2012/052958 mailed Mar. 13, 2014, 12 pages.
Non-final Office Action for U.S. Appl. No. 13/621,958 mailed Feb. 13, 2014, 10 pages.
Non-final Office Action for U.S. Appl. No. 13/649,417 mailed Feb. 13, 2014, 10 pages.
Non-final Office Action for U.S. Appl. No. 12/953,003 mailed Apr. 14, 2014, 13 pages.
Non-final Office Action for U.S. Appl. No. 12/953,039 mailed Apr. 15, 2014, 8 pages.
Final Office Action for U.S. Appl. No. 12/946,139 mailed Apr. 22, 2014, 18 pages.
Final Office Action for U.S. Appl. No. 13/597,549 mailed Apr. 24, 2014, 10 pages.
Final Office Action for U.S. Appl. No. 13/901,074 mailed May 9, 2014, 7 pages.

* cited by examiner

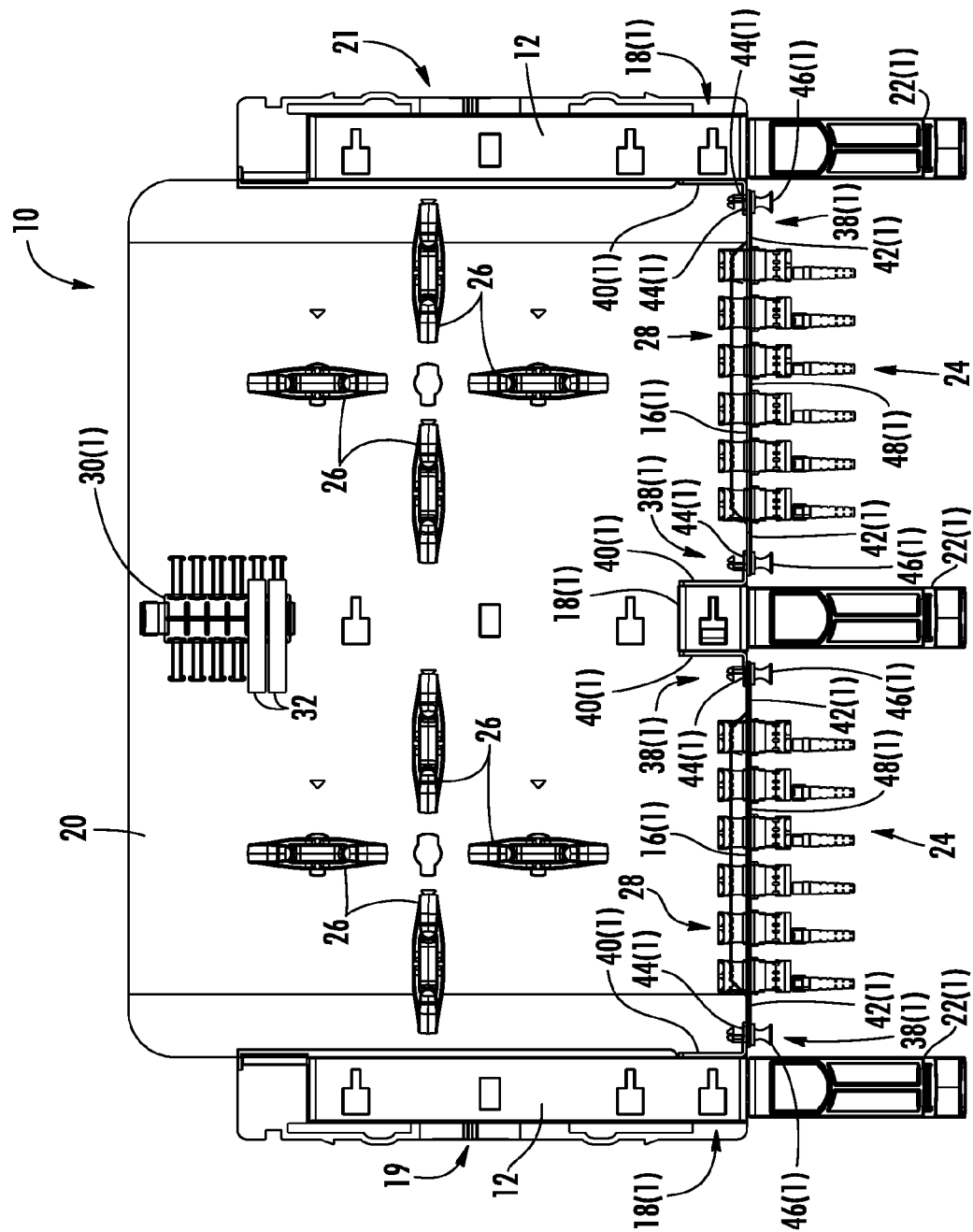

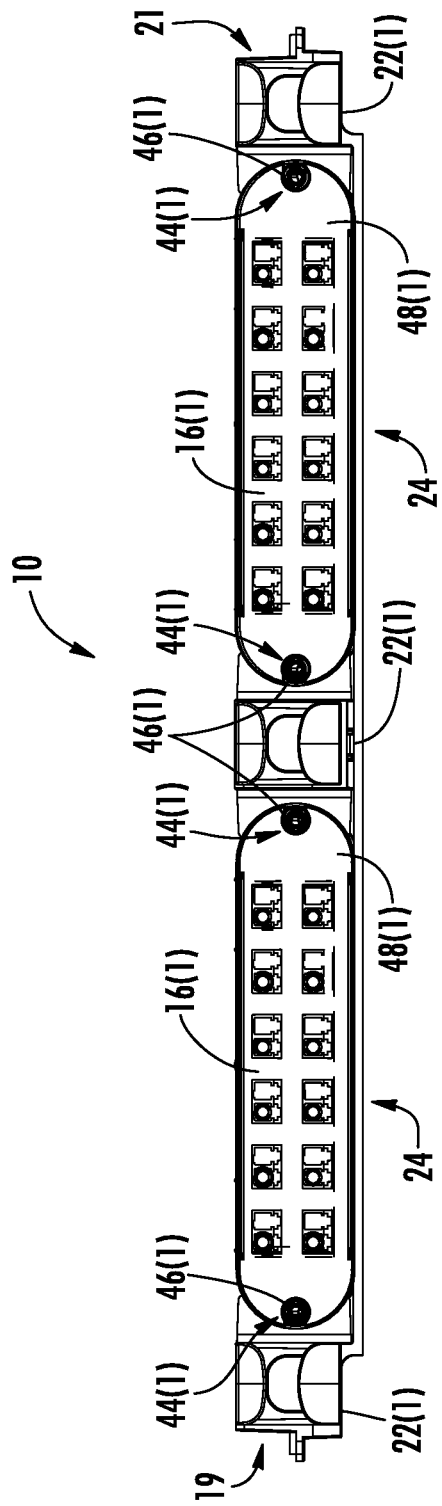

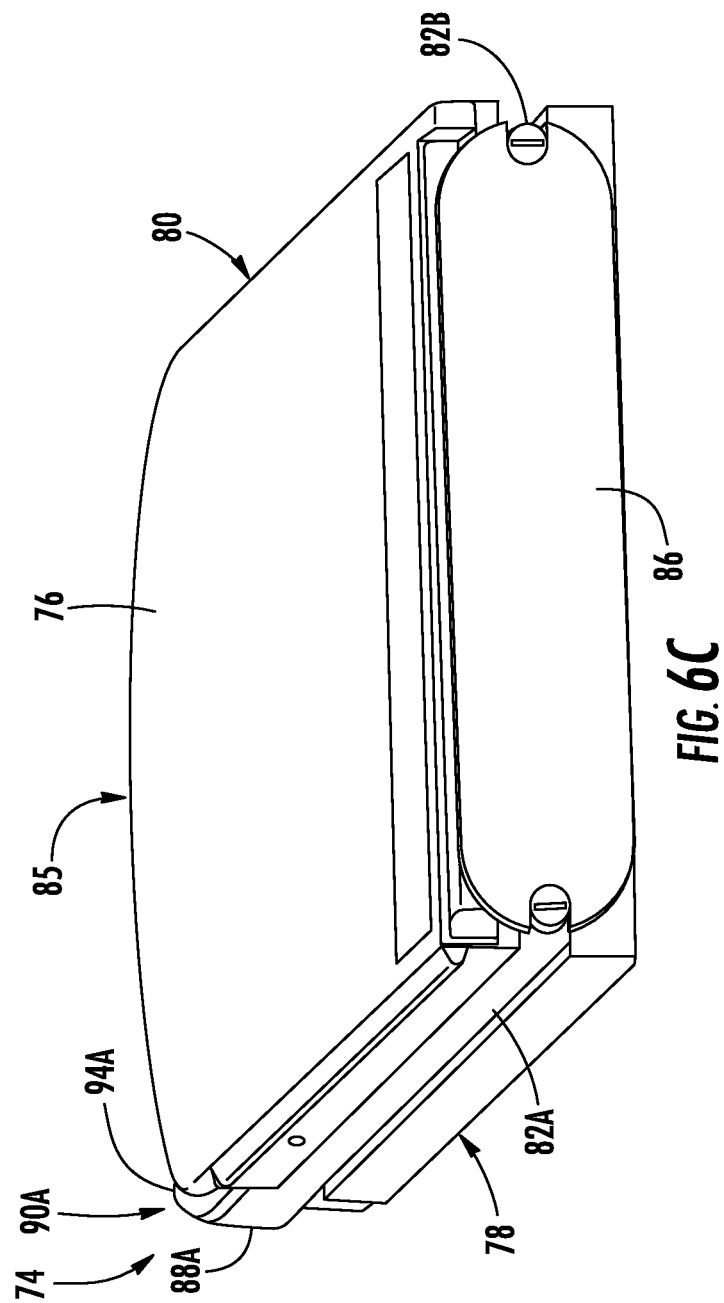

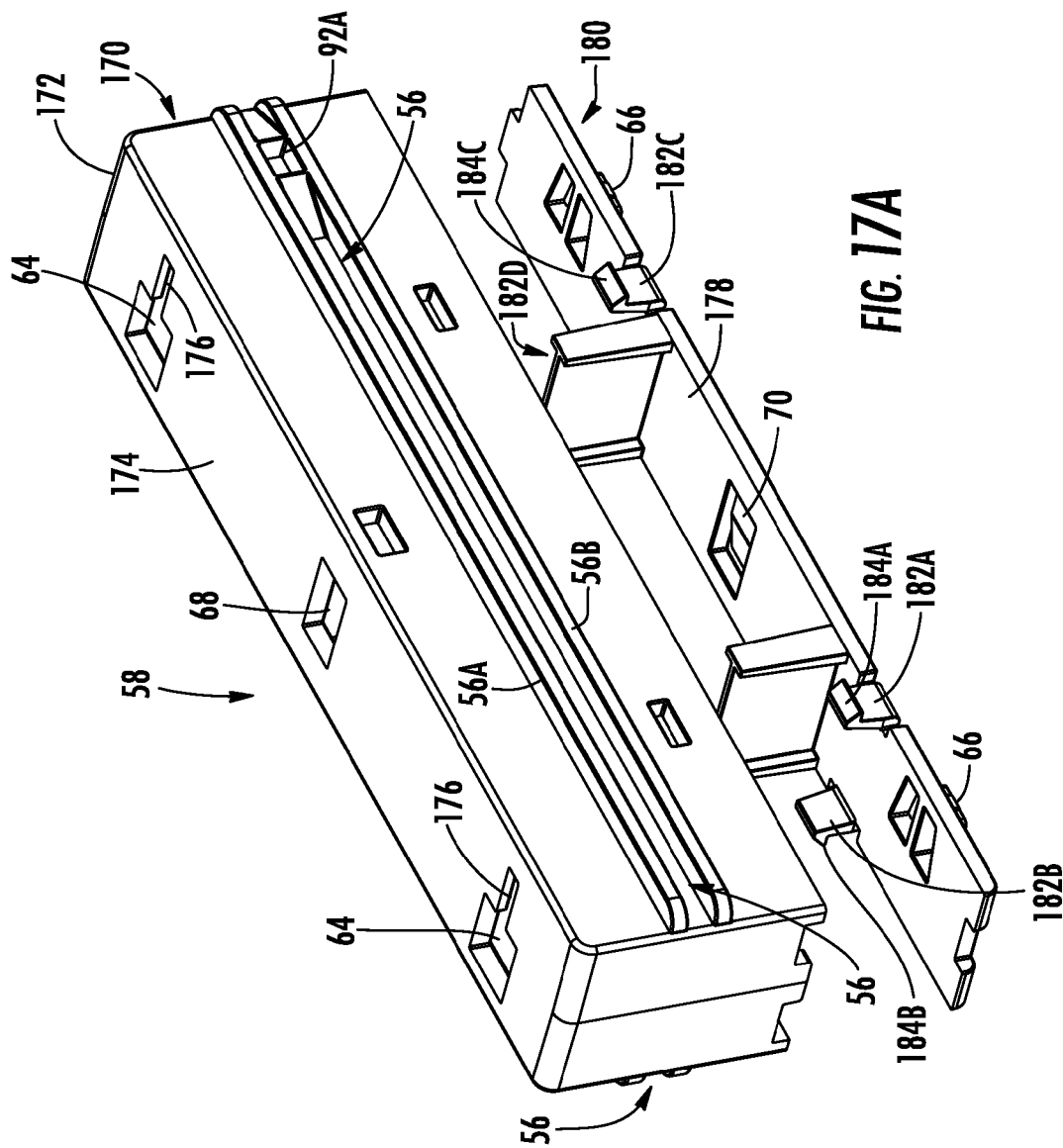

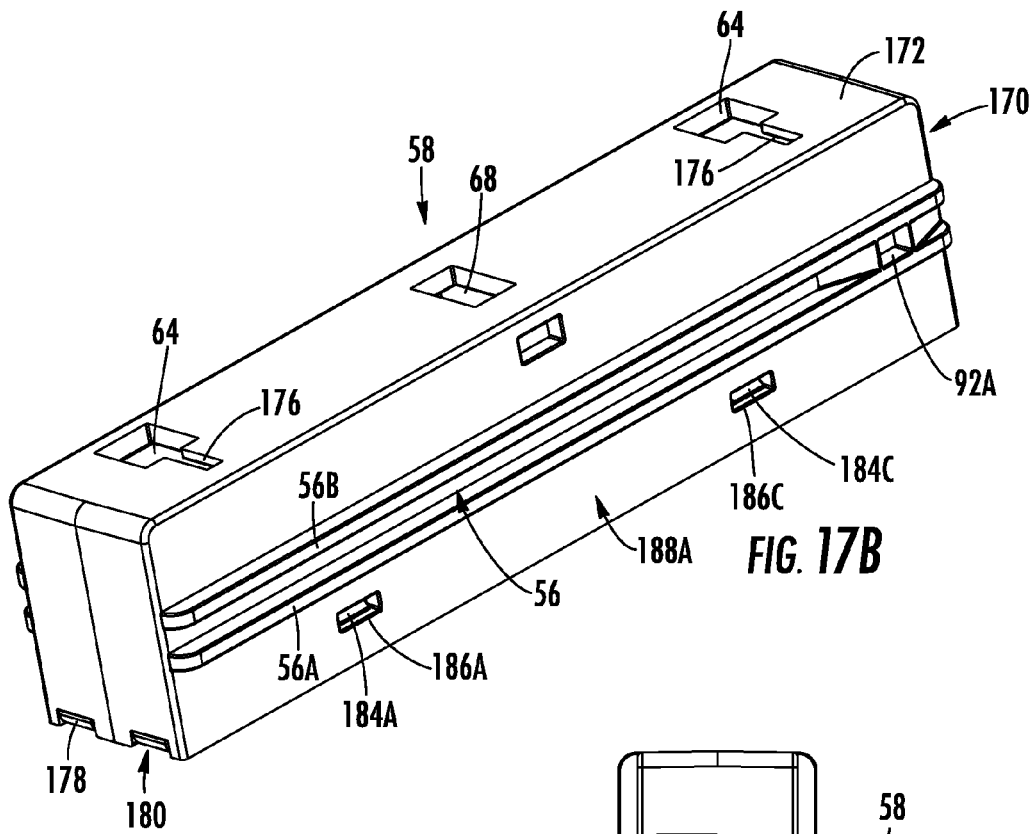
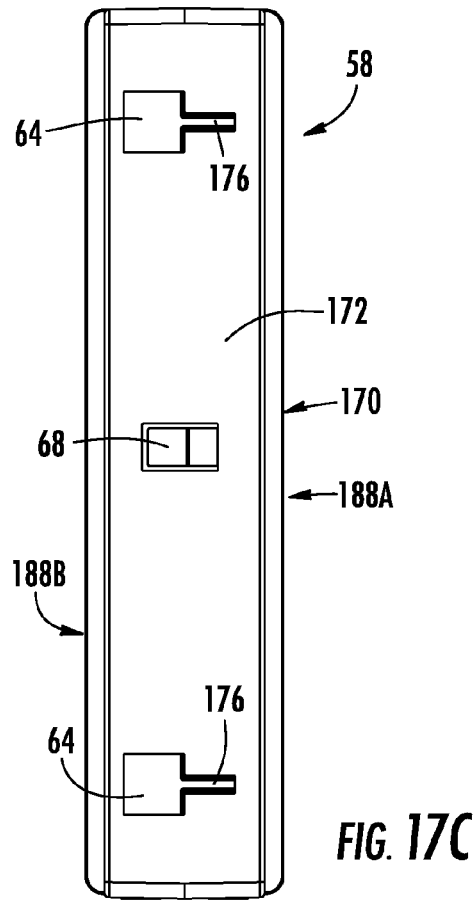

FIBER OPTIC HOUSINGS CONFIGURED TO ACCOMMODATE FIBER OPTIC MODULES/CASSETTES AND FIBER OPTIC PANELS, AND RELATED COMPONENTS AND METHODS

RELATED APPLICATIONS

The present application claims priority to U.S. Provisional Patent Application Ser. No. 61/329,925, filed Apr. 30, 2010, entitled "Fiber Optic Housing Adapted to Accommodate Both Modules and Panels," the disclosure of which is relied upon and incorporated herein by reference in its entirety.

The present application is related to U.S. Provisional Patent Application Ser. No. 61/329,948, filed Apr. 30, 2010, entitled "Stackable Shelf For A Fiber Optic Housing," the disclosure of which is relied upon and incorporated herein by reference in its entirety.

The present application is also related to U.S. patent application Ser. No. 12/940,699, filed Nov. 5, 2010, entitled "Stackable Shelves For A Fiber Optic Housing, and Related Components and Methods," the disclosure of which is relied upon and incorporated herein by reference in its entirety.

The present application is also related to U.S. Provisional Patent Application Ser. No. 61/329,898, filed Apr. 30, 2010, entitled "Rotatable Routing Guide Assembly," the disclosure of which is relied upon and incorporated herein by reference in its entirety.

The present application is also related to U.S. Provisional Patent Application Ser. No. 61/332,572, filed May 7, 2010, entitled "Fiber Optic Housing," the disclosure of which is relied upon and incorporated herein by reference in its entirety.

The present application is also related to U.S. Provisional Patent Application Ser. No. 61/332,548, filed May 7, 2010, entitled "Attachment Housing For A Fiber Optic Housing," the disclosure of which is relied upon and incorporated herein by reference in its entirety.

The present application is also related to U.S. Provisional Patent Application Ser. No. 61/332,529, filed May 7, 2010, entitled "Fiber Optic Management Area In A Fiber Optic Housing," the disclosure of which is relied upon and incorporated herein by reference in its entirety.

The present application is also related to U.S. Provisional Patent Application Ser. No. 61/332,508, filed May 7, 2010, entitled "Grommet and Routing Clip Assembly," the disclosure of which is relied upon and incorporated herein by reference in its entirety.

The present application is also related to U.S. Provisional Patent Application Ser. No. 61/180,331, filed May 21, 2009, entitled "Fiber Optic Equipment Guides and Rails Configured With Stopping Position(s), and Related Equipment," the disclosure of which is relied upon and incorporated herein by reference in its entirety.

The present application is also related to U.S. patent application Ser. No. 12/576,806, filed Oct. 9, 2009, entitled "Fiber Optic Equipment Guides and Rails Configured With Stopping Position(s), and Related Equipment and Methods," the disclosure of which is relied upon and incorporated herein by reference in its entirety.

BACKGROUND

1. Field of the Disclosure

The technology of the disclosure relates to fiber optic hardware, and more particularly to fiber optic housings suitable for supporting fiber optic equipment, including fiber optic modules/cassettes and fiber optic panels.

2. Technical Background

Benefits of optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support interconnections.

The fiber optic equipment is customized based on the application need. The fiber optic equipment is typically included in housings designed to support the fiber optic equipment, which are mounted in equipment racks to optimize use of space. One example of such fiber optic equipment is a fiber optic module. A fiber optic module is designed to provide cable-to-cable fiber optic connections and manage the polarity of fiber optic cable connections. A fiber optic module is mounted to a chassis or housing that is specifically designed to support fiber optic modules/cassettes. Another example of such fiber optic equipment is a fiber optic panel (also referred to as a "patch panel"). A fiber optic panel is designed to provide connection or termination points for optical fiber. A fiber optic panel typically includes fiber optic adapters that are configured to receive fiber optic connectors connected to the optical fiber to be connected or terminated. A fiber optic panel is typically mounted to a chassis or housing that is specifically designed to support fiber optic panels.

The need for particular fiber optic equipment may change. For example, it may be needed or desired to provide additional fiber optic panels at a data distribution center to support a fiber optic network. In this regard, housings specifically configured to support the additional fiber optic panels are provided and installed in available space in equipment racks at the data distribution center. If additional fiber optic modules/cassettes are needed at a data distribution center, housings specifically configured to support additional fiber optic modules or cassettes are provided and installed in available space in equipment racks at the data distribution center. However in these examples, the correct housing type to support the specific additional fiber optic equipment needed may not be readily available thus delaying installations and/or reconfigurations. Even if the correct housing types are readily available, they come at additional cost and requirements for inventory space to store the different types of housings needed to support the different types of fiber optic equipment that may be added or reconfigured. Further, the available space in an equipment rack for supporting additional fiber optic equipment may only be present in existing installed housings that are not fully populated. However, the housings with available space may not be configured to support the particular type of fiber optic equipment to be added.

SUMMARY OF THE DETAILED DESCRIPTION

Embodiments disclosed in the detailed description include fiber optic housings configured to accommodate fiber optic modules/cassettes and fiber optic panels, and related components and methods. In one embodiment, a fiber optic apparatus is provided. The fiber optic apparatus is comprised of a fiber optic housing. The fiber optic apparatus is also comprised of one or more removable panel clips disposed in the fiber optic housing. Each of the one or more removable panel clips includes at least one receptacle configured to receive an insert of a fiber optic panel to support the fiber optic panel in the fiber optic housing.

In another embodiment, a fiber optic housing comprising a stackable shelf, a panel clip, a front stacker assembly, and a rear stacker assembly is provided. The panel clip, the front stacker assembly, and the rear stacker assembly removably attach to the stackable shelf to allow the stackable shelf to accommodate one or both of a fiber optic module and a fiber optic panel interchangeably. The panel clip serves as an adapter piece, which allows an insert, such as a plunger for plunger-style panels, to be used where a track or rail guide system or method of retention is used. The front stacker assembly and the rear stacker assembly allow a rail guide or track-type fiber optic module to be used in a housing that accommodates fiber optic panels, including plunger-style fiber optic panels.

In another embodiment, a method of supporting fiber optic panels in a fiber optic housing also configured to support fiber optic modules is provided. The method comprises attaching a removable panel clip that includes at least one receptacle in a fiber optic housing that is configured to support fiber optic modules. The method also comprises inserting a fiber optic panel in the fiber optic housing such that at least one insert of the fiber optic panel is aligned with the at least one receptacle. The method also comprises inserting the at least one insert into the at least one receptacle to support the fiber optic panel in the fiber optic housing.

In another embodiment, a fiber optic shelf configured to be supported in a fiber optic housing is provided. The fiber optic shelf comprises a mounting surface. The fiber optic shelf is also comprised of one or more removable panel clips attached to the mounting surface. Each of the one or more removable panel clips includes at least one receptacle configured to receive an insert of a fiber optic panel to support the fiber optic panel in the mounting surface.

In another embodiment, a method of supporting fiber optic panels in a fiber optic housing configured to support fiber optic modules is provided. The method comprises attaching a removable panel clip that includes at least one receptacle in a mounting surface configured to support fiber optic modules. The method also comprises inserting a fiber optic panel in the mounting surface such that at least one insert of the fiber optic panel is aligned with the at least one receptacle. The method also comprises inserting the at least one insert into the at least one receptacle to support the fiber optic panel in the mounting surface.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIGS. 2A-2C are perspective, top, and front views, respectively, of the stackable shelf in FIGS. 1A-1C supporting fiber optic panels configured with stacker assemblies to support fiber optic panels in a 1-U height space;

FIGS. 6C and 6D are front perspective and top views, respectively, of an exemplary fiber optic module that can be supported by the rear stacker assemblies installed in the stackable shelf in FIG. 4, as illustrated in FIGS. 6A and 6B;

FIGS. 17A-17F are exploded perspective, assembled perspective, top, side, front, and bottom views, respectively, of a rear removable stacker assembly;

FIGS. 31B-1 and 31B-2 are bottom perspective views of front stacker assembly components in FIGS. 31A-1 and 31A-2, respectively, that are configured to be assembled together to form an alternative assembled front stacker assembly that can be installed in a stackable shelf to support fiber optic equipment;

FIGS. 31C-1 and 31C-2 are first side views of front stacker assembly components in FIGS. 31A-1 and 31A-2, respectively, that are configured to be assembled together to form an alternative assembled front stacker assembly that can be installed in a stackable shelf to support fiber optic equipment;

FIGS. 31D-1 and 31D-2 are second side views of front stacker assembly components in FIGS. 31A-1 and 31A-2, respectively, that are configured to be assembled together to form an alternative assembled front stacker assembly that can be installed in a stackable shelf to support fiber optic equipment;

FIGS. 31E-1 and 31E-2 are bottom views of front stacker assembly components in FIGS. 31A-1 and 31A-2, respectively, that are configured to be assembled together to form an alternative assembled front stacker assembly that can be installed in a stackable shelf to support fiber optic equipment;

FIGS. 31F-1 and 31F-2 are top views of front stacker assembly components in FIGS. 31A-1 and 31A-2, respectively, that are configured to be assembled together to form an alternative assembled front stacker assembly that can be installed in a stackable shelf to support fiber optic equipment;

FIGS. 32A-1 and 32A-2 are top perspective views of rear stacker assembly components that are configured to be assembled together to form an alternative assembled rear stacker assembly that can be installed in a stackable shelf to support fiber optic equipment;

FIGS. 32B-1 and 32B-2 are first side views of rear stacker assembly components in FIGS. 32A-1 and 32A-2, respectively, that are configured to be assembled together to form an alternative assembled rear stacker assembly that can be installed in a stackable shelf to support fiber optic equipment;

FIGS. 32C-1 and 32C-2 are second side views of rear stacker assembly components in FIGS. 32A-1 and 32A-2, respectively, that are configured to be assembled together to form an alternative assembled rear stacker assembly that can be installed in a stackable shelf to support fiber optic equipment;

FIGS. 32D-1 and 32D-2 are top views of rear stacker assembly components in FIGS. 32A-1 and 32A-2, respectively, that are configured to be assembled together to form an alternative assembled rear stacker assembly that can be installed in a stackable shelf to support fiber optic equipment;

FIGS. 32E-1 and 32E-2 are third side views of rear stacker assembly components in FIGS. 32A-1 and 32A-2, respectively, that are configured to be assembled together to form an alternative assembled rear stacker assembly that can be installed in a stackable shelf to support fiber optic equipment; and FIGS. 32F-1 and 32F-2 are bottom views of rear stacker assembly components in FIGS. 32A-1 and 32A-2, respectively, that are configured to be assembled together to form an alternative assembled rear stacker assembly that can be installed in a stackable shelf to support fiber optic equipment.

DETAILED DESCRIPTION OF THE EMBODIMENTS

Figure 1A:
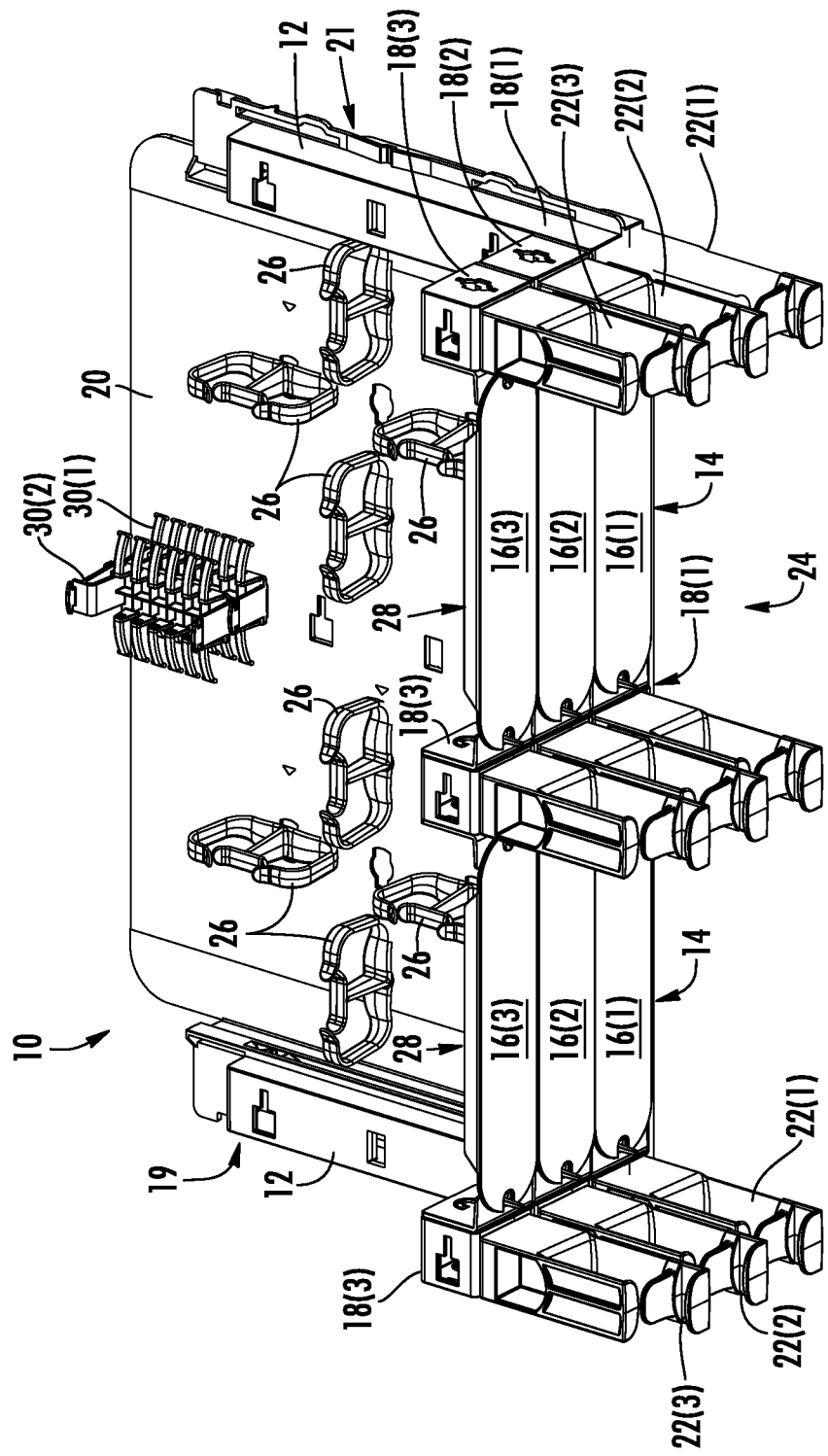
FIGS. 1A-1C are perspective, front, and side views, respectively, of an exemplary stackable shelf that can be movably inserted in a fiber optic housing and configured with stacker assemblies to support fiber optic equipment of height spaces.

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include fiber optic housings configured to accommodate fiber optic modules and fiber optic panels, and related components and methods. Fiber optic cassettes may also be accommodated. Throughout this disclosure, the term "fiber optic module" is intended to refer to either a fiber optic module or fiber optic cassette including but not limited to a splicing cassette. In one embodiment, a fiber optic apparatus is provided. The fiber optic apparatus is comprised of a fiber optic housing. The fiber optic apparatus is also comprised of one or more removable panel clips disposed in the fiber optic housing. Each of the one or more removable panel clips includes at least one receptacle configured to receive an insert of a fiber optic panel to support the fiber optic panel in the fiber optic housing.

In another embodiment, a fiber optic housing comprising a stackable shelf, a panel clip, a front stacker assembly, and a rear stacker assembly is provided. The panel clip, the front stacker assembly, and the rear stacker assembly removably attach to the stackable shelf to allow the stackable shelf to accommodate one or both of a fiber optic module and a fiber optic panel interchangeably. The panel clip serves as an adapter piece, which allows an insert, such as a plunger for plunger-style panels, to be used where a track or rail system or method of retention is used. The front stacker assembly and the rear stacker assembly allow a rail system or track-type system fiber optic module to be used in a housing that accommodates fiber optic panels, including plunger-style fiber optic panels.

The designation "U" refers to a standard equipment shelf size of a fiber optic equipment rack or a cabinet. This may also be referred to as "RU." For example, an equipment rack may support 1 U-sized shelves, with "U" equal to a standard 1.75 inches in height and nineteen (19) inches in width. In certain applications, the width of "U" may be twenty-three (23) inches. Typically, the more rack space (the more "U's") a fiber optic housing takes up, the higher the fiber capacity in the fiber optic housing.

FIGS. 1-32B illustrate respectively an exemplary stackable shelf configured with one or more removable stacker assemblies to support fiber optic equipment of varying heights. A stacker assembly is any component, member or assembly that is configurable to support fiber optic equipment at a different desired height or heights (e.g., U spaces) from a surface, including but not limited to a mounting surface provided for a fiber optic shelf. The stackable shelf may be movably mounted in a fiber optic housing. The stackable shelf contains features that allow fiber optic equipment to be stacked at different height spaces in the stackable shelf thereby increasing its rack unit height by using multiples of the same components. Depending on the nature of an installation, a stackable shelf configured for a 1 U fiber optic housing could also be converted for use in a higher U space fiber optic housing, such as 2 U, 3 U, or greater U size, and fractional U sizes (e.g., ⅓ U, ⅔ U, 1⅓ U, 2⅔ U, etc.) as examples, by stacking or removing these components in the factory or in the field at the installation site, as needed or desired. The stackable shelves disclosed herein are shown as being configured in 1 U, 2 U, and 3 U sizes, but note that any U sizes are possible greater than 3 U and fractional U sizes below and above 1 U, for example ⅓ U, ⅔ U, ¾ U, ⅔ U, 1⅓ U, 2⅔ U, 3½ U, etc. The stackable shelves and the heights at which they can support fiber optic equipment is not limited in this manner.

Figure 1B:
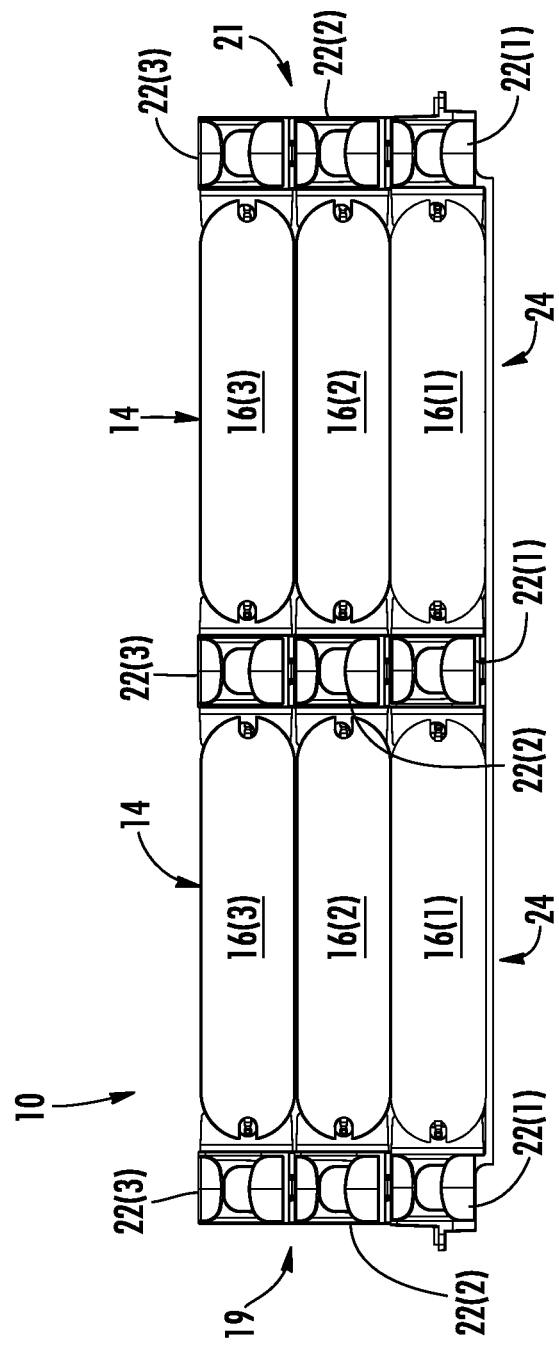
Figure 1C:
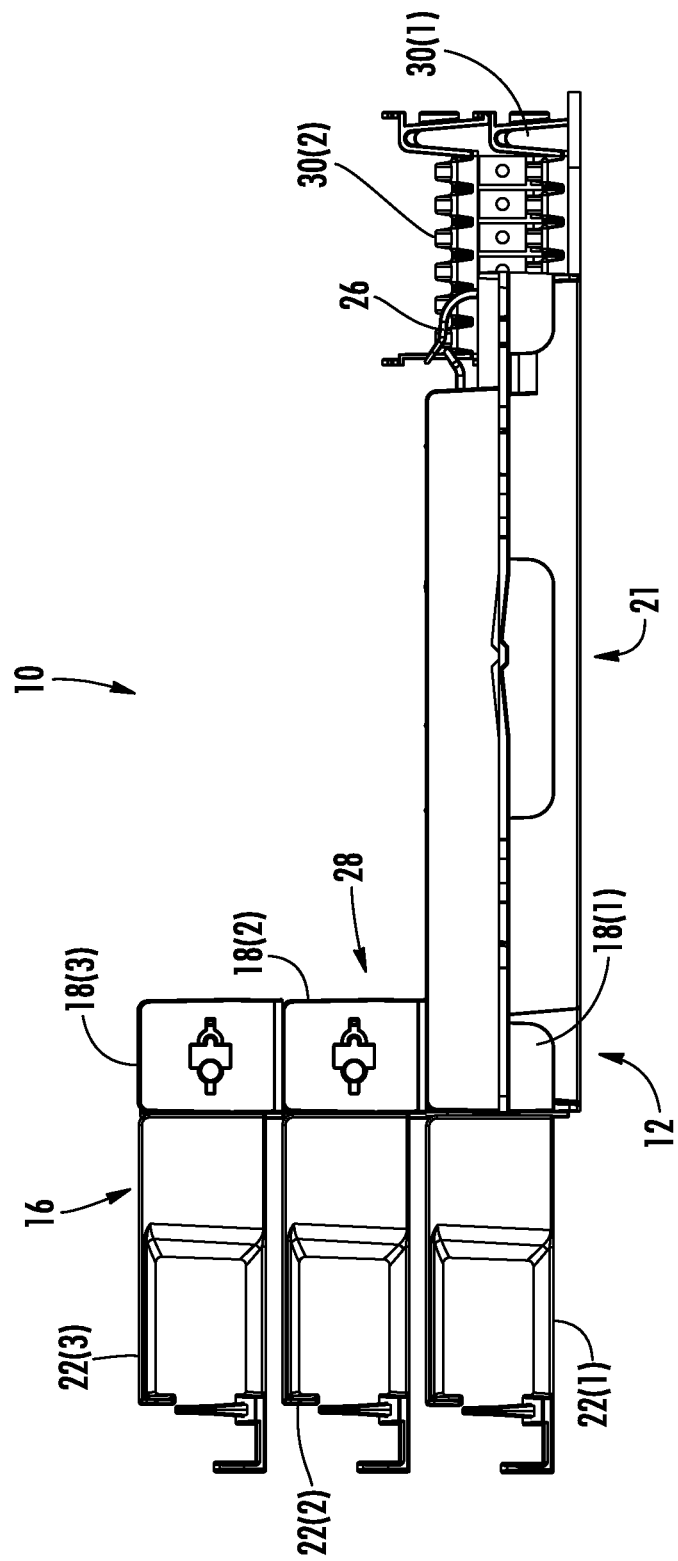

In this regard, FIGS. 1A-1C are perspective, front, and side views, respectively, of an exemplary stackable shelf 10 configured to be movably inserted in a fiber optic housing. The stackable shelf 10 is configured with stacker assemblies 12 to support fiber optic equipment 14 in multiple U height spaces depending on how the stackable shelf 10 is configured. In this example, the fiber optic equipment 14 is comprised of fiber optic panels 16(1)-16(3). Each fiber optic panel 16(1)-16(3) is of 1 U height space. Fiber optic panel 16(1) is disposed in a first 1 U height space. Fiber optic panel 16(2) is stacked on top of the fiber optic panel 16(1) and is disposed in a second 1 U height space. Fiber optic panel 16(3) is stacked on top of the fiber optic panel 16(2) and is disposed in a third 1 U space.

The designation (1) for a particular component or part referenced in this application is to signify that such component is located adjacent in the first or bottom U space of the stackable shelf 10 in this example. The designation (2) for a particular component or part referenced in this application is to signify that such component is located adjacent in the second U space of the stackable shelf 10 in this example, stacked above components disposed in the first U space of the stackable shelf 10 in this example. The designation (3) for a particular component or part referenced in this application is to signify that such component is located adjacent in the third U space of the stackable shelf 10 in this example, stacked above components disposed in the second U space of the stackable shelf 10 in this example.

In this embodiment as illustrated in FIGS. 1A-1C, to support the fiber optic panels 16(1)-16(3) in the stackable shelf in a 3 U configuration, front stacker assemblies 18(1)-18(3) are stacked on top of each other about a mounting surface 20 to support the three (3) fiber optic panels 16(1)-16(3) to a 3 U height space. In this embodiment, three (3) front stacker assemblies 18(1) are provided in the mounting surface 20 to support two (2) fiber optic panels 16(1). Two (2) front stacker assemblies 18(1) are integrated into the stacker assemblies 12 that are integrated on a left end 19 and a right end 21 of the mounting surface 20, and which may or may not be configured to be removable from the mounting surface 20. The stacker assembly 18(1) disposed in the center section of the mounting surface 20 is removably attached to the mounting surface between the left end 19 and the right end 21. In this manner, two (2) fiber optic panels 16(1) can be supported by the stackable shelf 10 in a 1 U height space, as illustrated in FIGS. 1A-1C, since two (2) stacker assemblies 18(1) are provided to support one (1) fiber optic panel 16(1) therebetween as will be described in more detail below. As will also be described in more detail below, the stackable shelf 10 can also be configured to support fiber optic modules (and/or fiber optic cassettes) in multiple U height spaces, including to height spaces less than 3 U and to height spaces greater than 3 U.

Before discussing the components that allow the stackable shelf 10 in FIGS. 1A-1C to be configured to support the fiber optic equipment 14 in multiple U spaces with regard to FIGS. 2A-28B, some other components that can be supported by the stackable shelf 10 and illustrated in FIGS. 1A-1C are introduced. For example, as will be described below and illustrated in FIGS. 14-15B, removable front fiber routing guides 22(1)-22(3) can be attached to the front stacker assemblies 18(1)-18(3) to route optical fibers connected to the fiber optic equipment 14 in a front 24 of the mounting surface 20 supported by the stackable shelf 10. As another example, removable and rotatable fiber routing guides 26 can be attached to the mounting surface 20 to route optical fibers connected to the fiber optic equipment 14 in a rear 28 of the fiber optic panels 16(1). More information regarding the rotatable fiber routing guides 26 is described in related U.S. Provisional Patent Application Ser. No. 61/329,898.

Figure 2A:
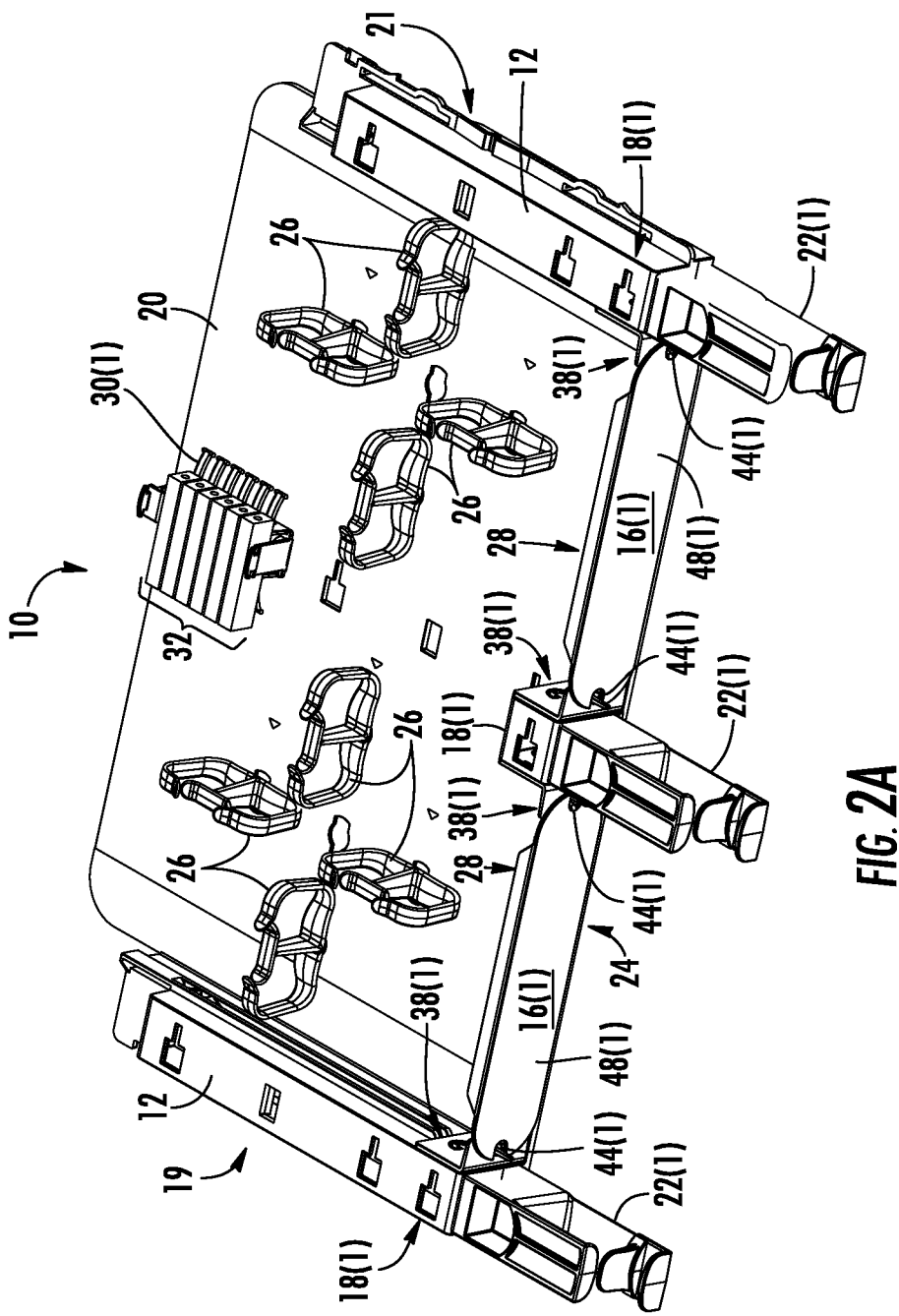

As another example that will be described in more detail below and illustrated in FIGS. 11A-13, fiber body holders 30(1)-30(2) can also be provided in the stackable shelf 10. The fiber body holders 30(1)-30(2) are configured to support fiber bodies 32, which may be fan-out bodies or furcation bodies, as illustrated in FIGS. 2A, 2B, and 10A, in optical fibers connected to the rear 28 of the fiber optic equipment 14. A first fiber body holder 30(1) is attached to the mounting surface 20 to support the fiber bodies 32. If desired or needed, a second fiber body holder 30(2) is stacked on top of the first body holder 30(1) to provide for the ability to support additional fiber bodies 32.

FIGS. 2A-2C are perspective, top, and front views, respectively, of the stackable shelf 10 in FIGS. 1A-1C after the stackable shelf 10 has been configured to support fiber optic panels 16(1) in a 1 U height space. The stackable shelf 10 illustrated in FIGS. 2A-2D can then be left as only support fiber optic panels 16(1) in a 1 U height space, or additional front stacker assemblies 18 (e.g., removable front stacker assemblies 18(2), 18(3)) can be stacked on top of the front stacker assemblies 18(1) to allow additional fiber optic panels 16 (e.g., fiber optic panels 16(2), 16(3)) to be supported by the stackable shelf 10 in additional U height spaces about the fiber optic panels 16(1).

FIGS. 2A-2D also illustrate how the fiber optic panels 16(1) are supported by the front stacker assemblies 18(1). As illustrated therein, first surfaces 40(1) of the removable panel clips 38(1) are attached to the front stacker assemblies 18(1). As illustrated in FIG. 2B, the removable panel clips 38(1) also include second surfaces 42(1) with receivers 44(1) disposed therein that are configured to receive an insert 46(1) disposed in a front plate 48(1) of the fiber optic panels 16(1) to attach and retain the fiber optic panels 16(1) to the removable panel clip 38(1). Thus, the fiber optic panels 16(1) are secured to the stackable shelf 10 by attaching to the removable panel clips 38(1), which are in turn attached to the front stacker assemblies 18(1), which are in turn attached to the mounting surface 20. In this embodiment of the fiber optic panels 16(1), the insert 46(1) is comprised of a plunger for retention of the fiber optic panel 16(1) to the removable panel clips 38(1). However, other types of inserts 46(1) could be employed.

Figure 2D:
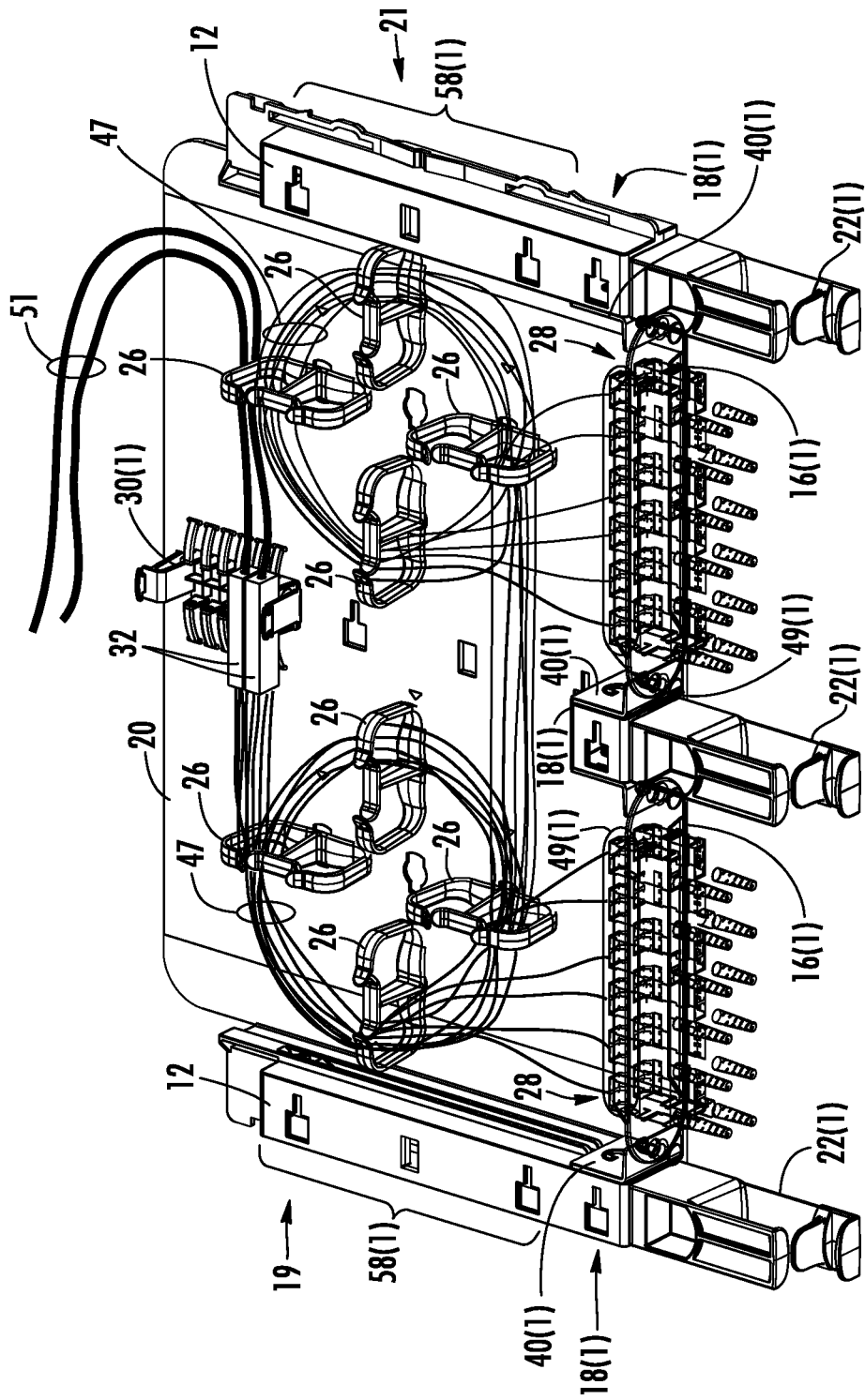
FIG. 2D is a perspective view of the stackable shelf configured with removable stacker assemblies to support fiber optic panels in a 1 U height space in FIGS. 2A-2C, with optical fibers routed through rear routing guides secured to the stackable shelf and terminated to the rear of fiber optic adapters disposed in the fiber optic panels.

FIG. 2D is a perspective view of the stackable shelf 10 with optical fibers 47 routed through fiber routing guides 26 terminated to the rear 28 of fiber optic adapters 49(1) disposed in the fiber optic panels 16(1). The optical fibers 47 extend from the fiber bodies 32 that are installed and supported in the fiber body holder 30(1), as also illustrated in FIG. 2D. The fiber bodies 32 are connected to fiber optic cables 51 that contain the optical fibers 47.

Figure 3A:
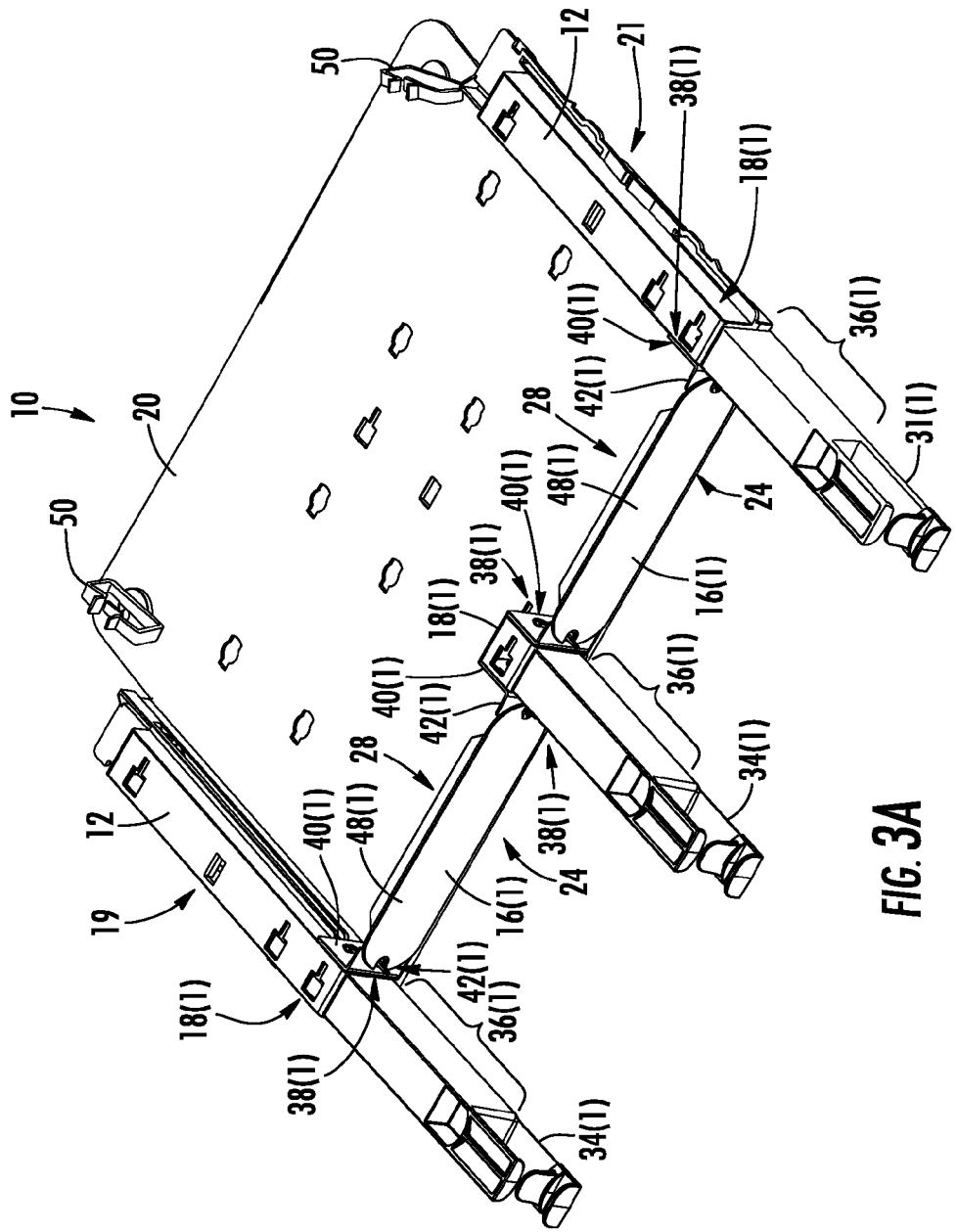
FIG. 3A is a perspective view of the stackable shelf in FIGS. 2A-2C, but configured with elongated fiber routing guides attached to the stacker assemblies.
Figure 3B:
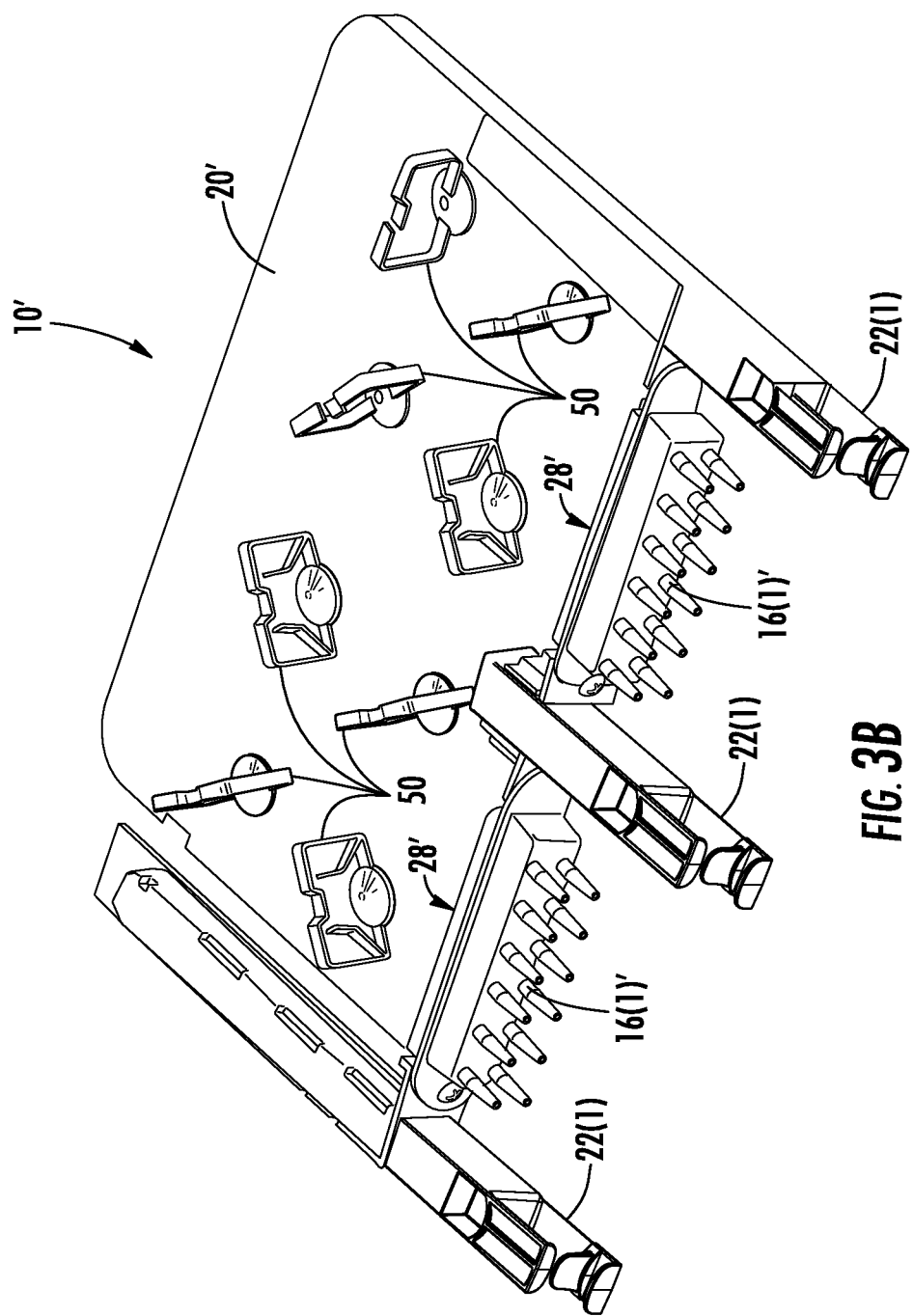
FIG. 3B is a perspective view of an alternative stackable shelf with rear routing guides secured to the stackable shelf and rotated approximately forty-five (45) degrees from the rear routing guides disposed in the stackable shelf in FIG. 3A.

FIG. 3A is a perspective view of the stackable shelf 10 in FIGS. 2A-2D, but configured with alternative elongated fiber routing guides 34(1) that include elongated sections 36(1) to extend the fiber routing guides 34(1) farther away from the mounting surface 20. FIG. 3B illustrates an alternative rotatable routing guide 50 that may be attached to a mounting surface 20' of an alternative stackable shelf 10' to route optical fibers connected to a rear 28' of a fiber optic panel 16(1)'.

Figure 4:
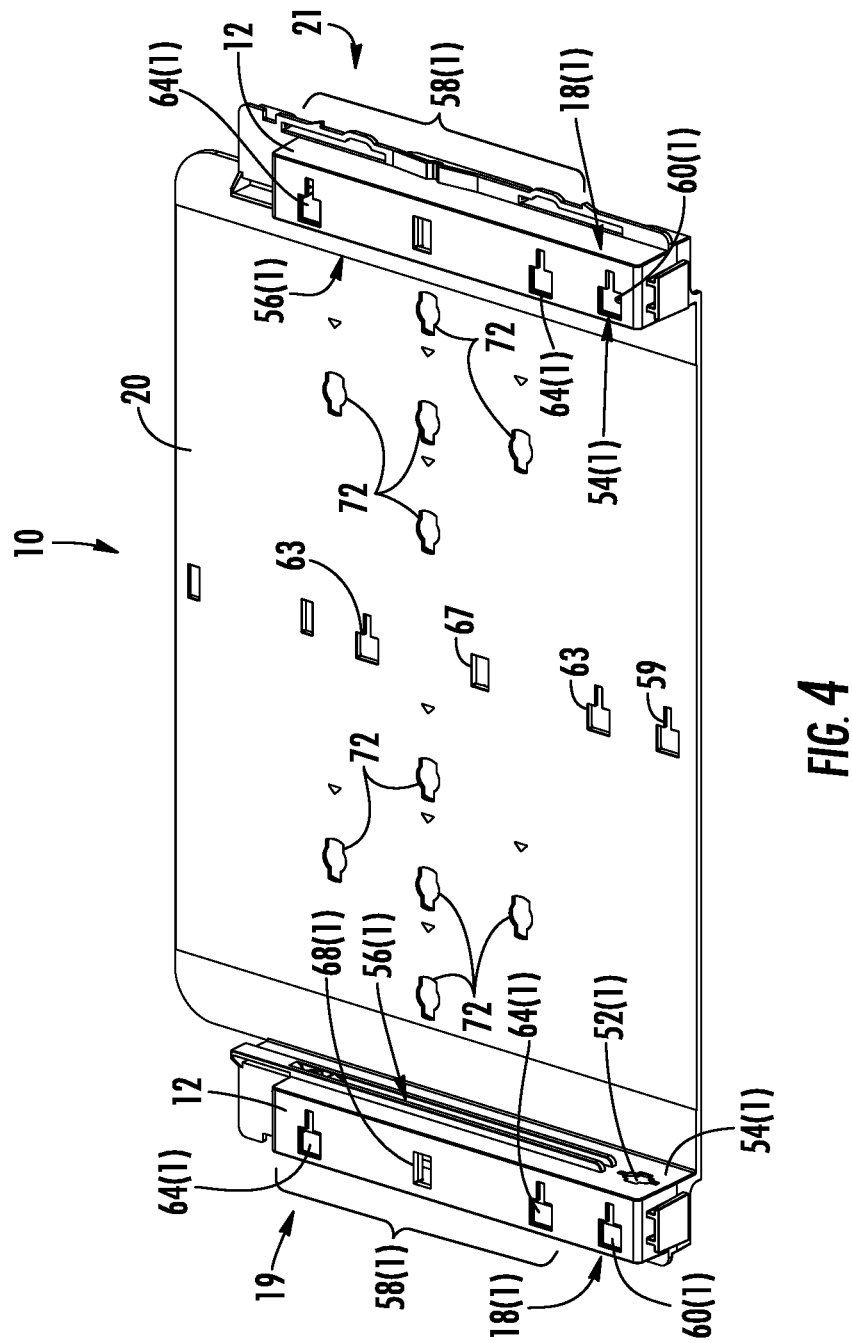
FIG. 4 is a perspective view of the stackable shelf in FIGS. 1A-2D without any fiber optic equipment installed therein.

FIG. 4 is a perspective view of the stackable shelf 10 in FIGS. 1A-2D without any fiber optic equipment installed therein. FIG. 4 is provided as a starting point to describe how stacker assemblies and related components are added and stacked on the mounting surface 20 of the stackable shelf 10 to configure the stackable shelf 10 to support fiber optic equipment of varying U height spaces. As illustrated in FIG. 4, stacker assemblies 12 are integrated into the mounting surface 20. The stacker assemblies 12 are configured to support either the fiber optic panels 16(1) or fiber optic modules in this embodiment. To support fiber optic panels 16(1), a receiver 52(1) is disposed in a side 54(1) of the front stacker assembly 18(1) portion of the stacker assembly 12 to receive the removable panel clips 38(1) illustrated in FIGS. 2A-2D. More detail and information regarding the removable panel clips 38(1) being attached to the front stacker assembly 18(1) is described below and illustrated in FIGS. 9A-10E. If a fiber optic module(s) is desired to be supported, the removable panel clips 38(1) are not employed. Instead, the fiber optic module(s) includes a rail guide that is configured to receive a rail 56(1) disposed in a rear stacker assembly 58(1) provided as a portion of the stacker assembly 12. More information regarding installing a fiber optic module receiving the rail 56(1) disposed in the rear stacker assembly 58(1) to support the fiber optic module in the stackable shelf 10 is illustrated in more detail below in FIGS. 6-7B, 9-11 and 13A-13F.

Figure 5A:
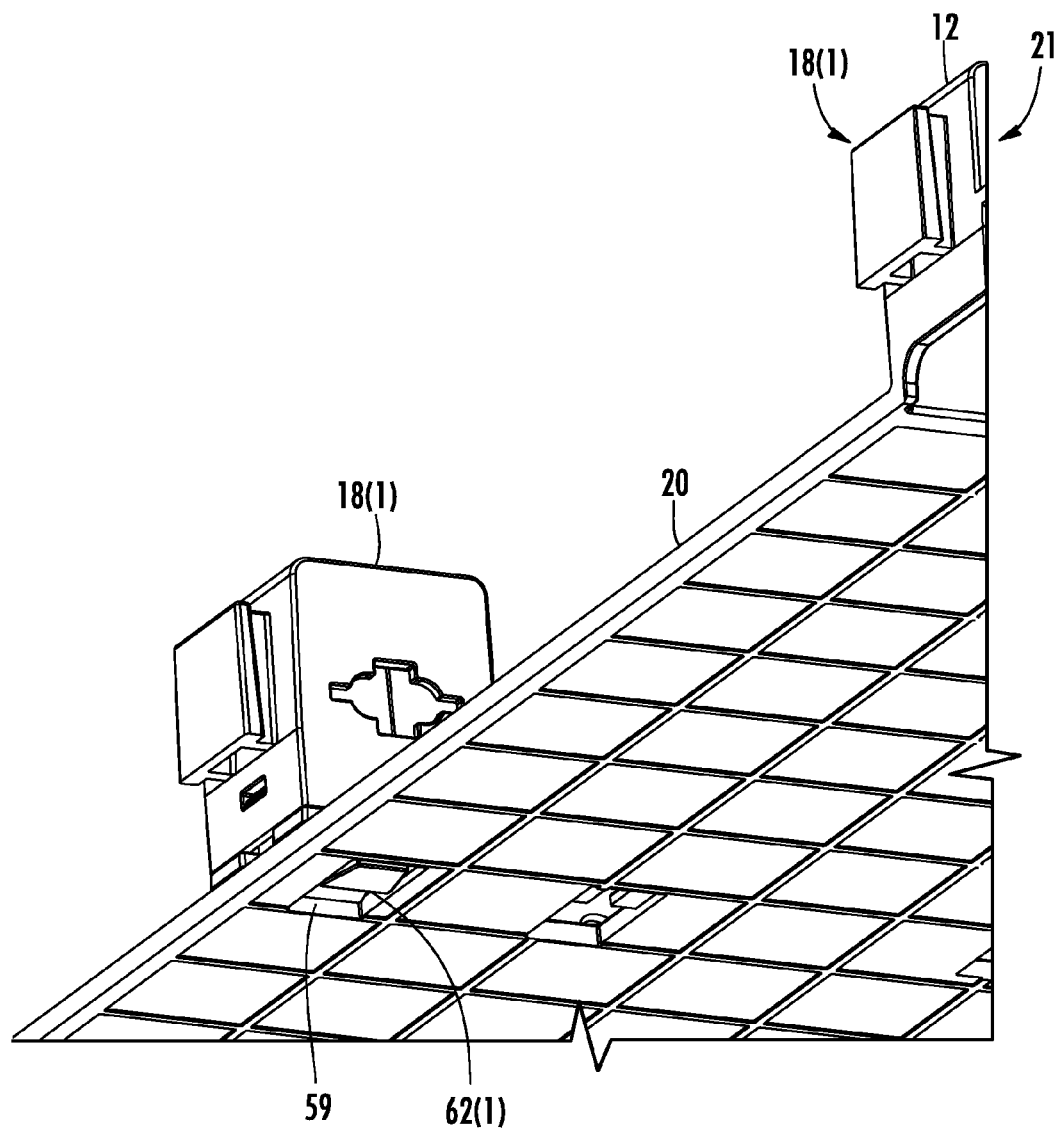
FIG. 5A is a bottom close-up perspective view of a front removable stacker assembly installed and secured to the stackable shelf in FIG. 4.

With continuing reference to FIG. 4, to support attaching a front stacker assembly 18(1) between the front stacker assemblies 18(1) disposed on the ends 19, 21 of the mounting surface 20 to support the fiber optic panels 16(1) in FIGS. 1A-2D, the receivers 59 are disposed in the mounting surface 20. As illustrated in FIG. 5A and described in more detail in FIGS. 5A-5B and 12A-12F, the bottom of the front stacker assemblies 18(1) include a latch 62(1) that is configured to be received and secured in the receiver 59 to attach additional front stacker assemblies 18(1) in the mounting surface 20 to support the fiber optic panels 16(1). An additional front stacker assembly 18(1) attached to the mounting surface 20 is illustrated in FIG. 5B.

Similarly, to support attaching an additional removable rear stacker assembly 58(1) between the non-removable rear stacker assemblies 58(1) disposed on the ends 19, 21 of the mounting surface 20 to support fiber optic modules, receivers 64(1) are disposed in the mounting surface 20. As illustrated in FIG. 5C and described in more detail in FIGS. 13A-13F, the bottom of the rear stacker assembly 58(1) include latches 66(1) that are configured to be received and secured in receivers 63 to attach an additional rear stacker assembly 58(1) in the mounting surface 20 to support fiber optic modules. An additional receiver 67 is disposed in the mounting surface 20 to receive an additional latch 70(1) disposed in the bottom of the rear stacker assembly 58(1). An additional rear stacker assembly 58(1) attached to the mounting surface 20 is illustrated in FIG. 5D. Also, receivers 72 in the form of openings are disposed in the mounting surface 20 to receive the removable fiber routing guides 26 illustrated in FIGS. 1A-2D.

Figure 5B:
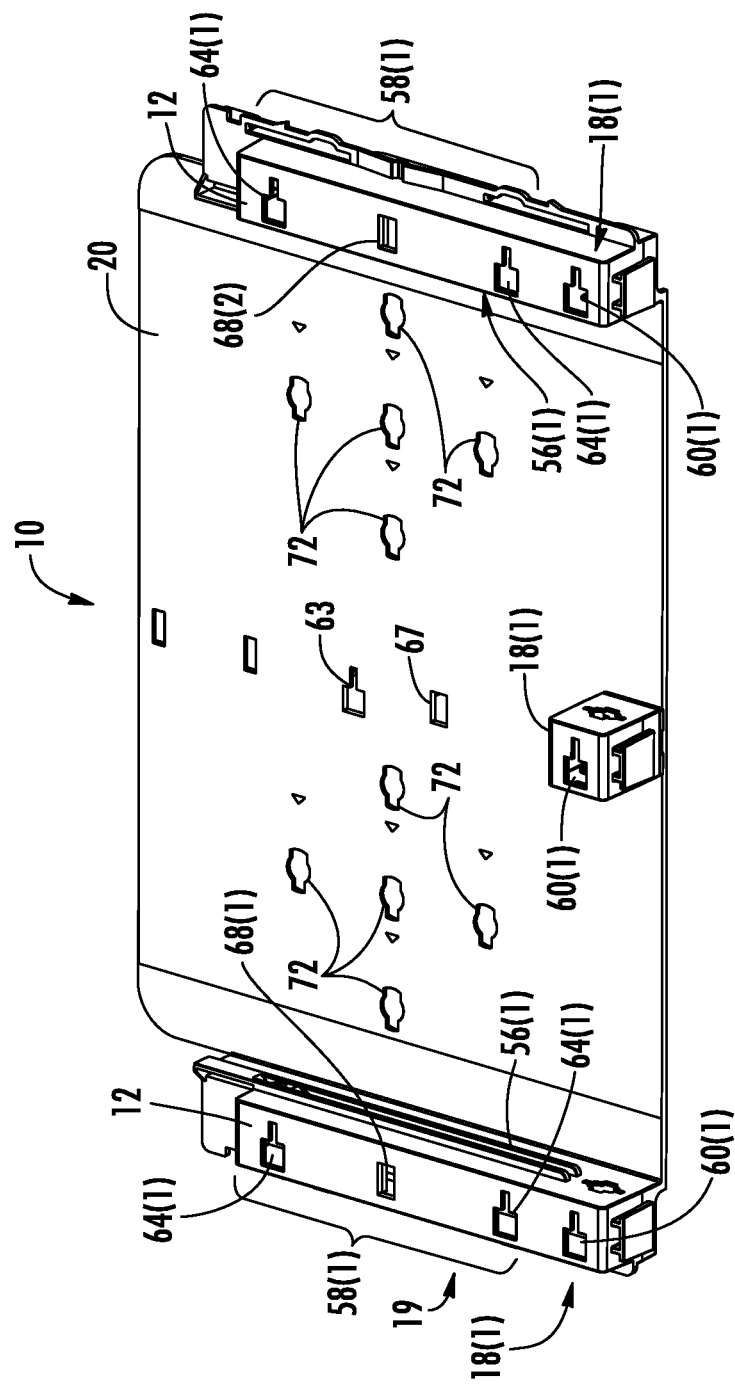
FIG. 5B is a top perspective view of the stackable shelf in FIG. 4 with the front removable stacker assembly in FIG. 5A attached to the mounting surface to support fiber optic panels in a 1 U height space.
Figure 5C:
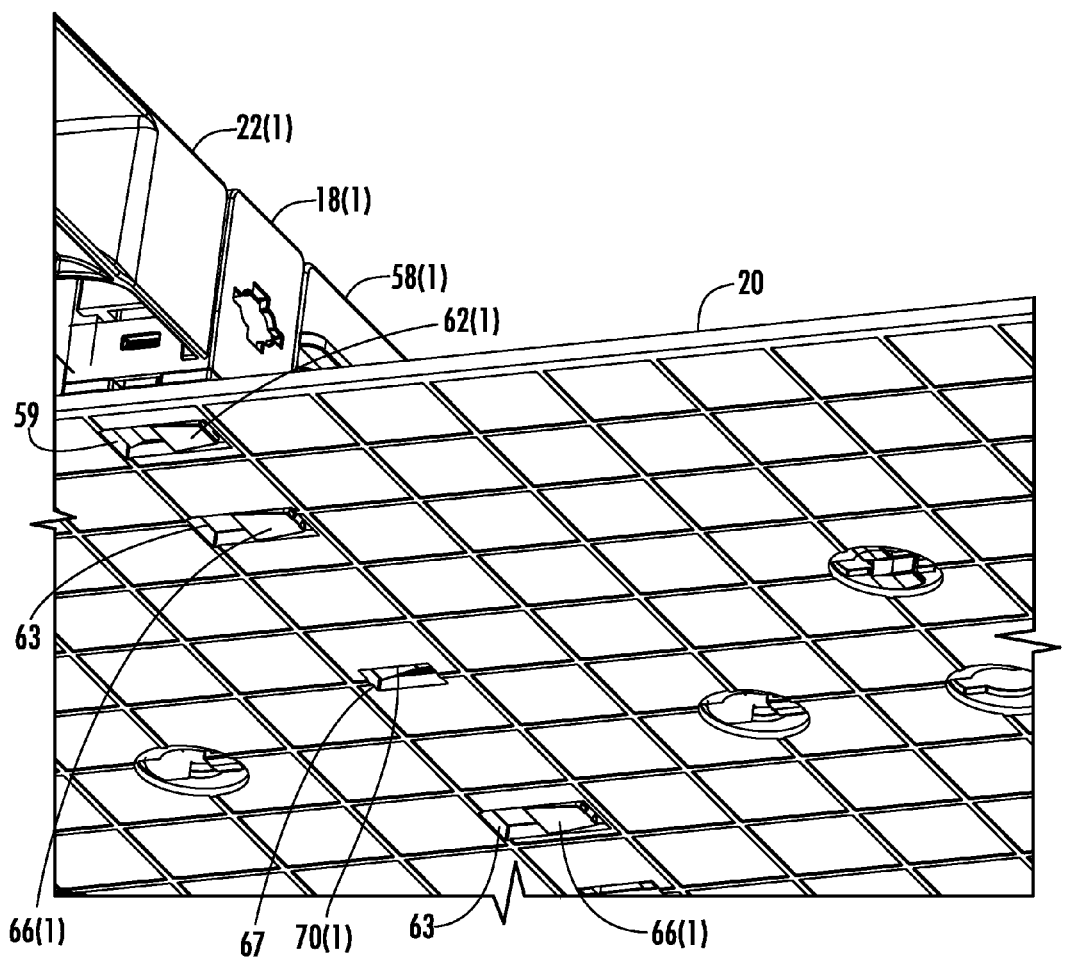
FIG. 5C is a bottom close-up perspective view of a rear removable stacker assembly installed and secured to the stackable shelf in FIG. 4.
Figure 5D:
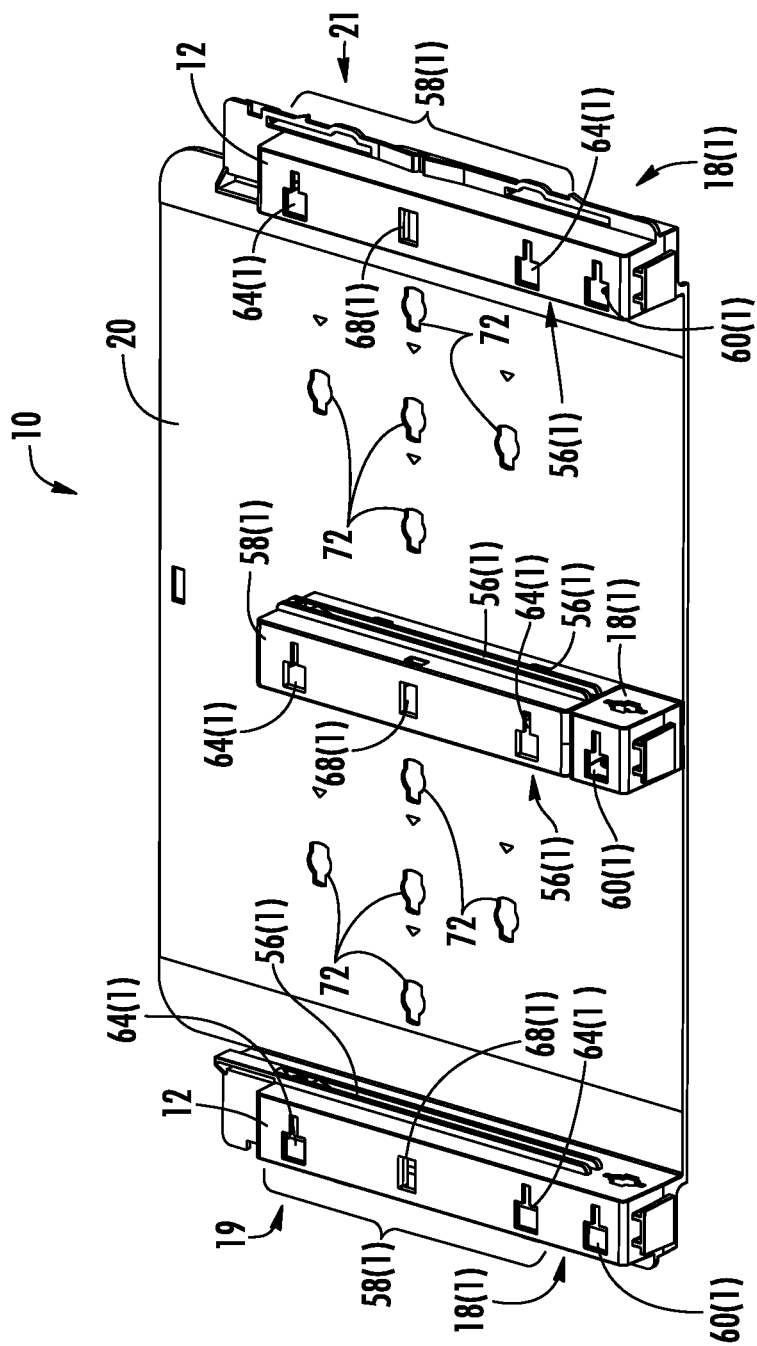
FIG. 5D is a top perspective view of the stackable shelf in FIG. 4 configured with the front removable stacker assembly and rear removable stacker assembly in FIG. 5C attached to the mounting surface to support fiber optic modules in a 1-U height space.

With reference to FIGS. 4, 5B, and 5D, to support allowing stacking additional front stacker assemblies 18 on top of the front stacker assemblies 18(1) to support additional fiber optic panels 16 at U height spaces above the U height space of the stacker assemblies 12 (e.g., fiber optic panels 16(2) and 16(3) in FIGS. 1A-1C), receivers 60(1) are also disposed in the top of the front stacker assemblies 18(1). As illustrated in FIG. 5A, the latch 62 disposed in the bottom of the front stacker assembly 18(1) is configured to be received and secured in the receivers 60(1) to support stacking additional front stacker assemblies 18 on top of the front stacker assembly 18(1).

Similarly, to support stacking additional rear stacker assemblies 58 on top of the rear stacker assemblies 58(1) to support additional fiber optic modules at U height spaces above the U height space of the stacker assemblies 12, receivers 64(1) are disposed in the top of the rear stacker assemblies 58(1). In this embodiment, the receivers 64(1) are of the same design as the receivers 60(1). As illustrated in FIG. 5C, the bottom of the rear stacker assemblies 58 include the latches 66(1) that are configured to be received and secured in the receivers 64(1) to support stacking additional rear stacker assemblies 58 on top of the rear stacker assembly 58(1). An additional receiver 68(1) is also disposed in the rear stacker assemblies 58(1) configured to receive an additional latch 70, as illustrated in FIG. 5C, disposed in the bottom of the rear stacker assemblies 58 stacked on top of the rear stacker assembly 58(1). In this embodiment, the additional receiver 70(1) is of a different design from the receivers 60(1), 64(1).

Figure 6A:
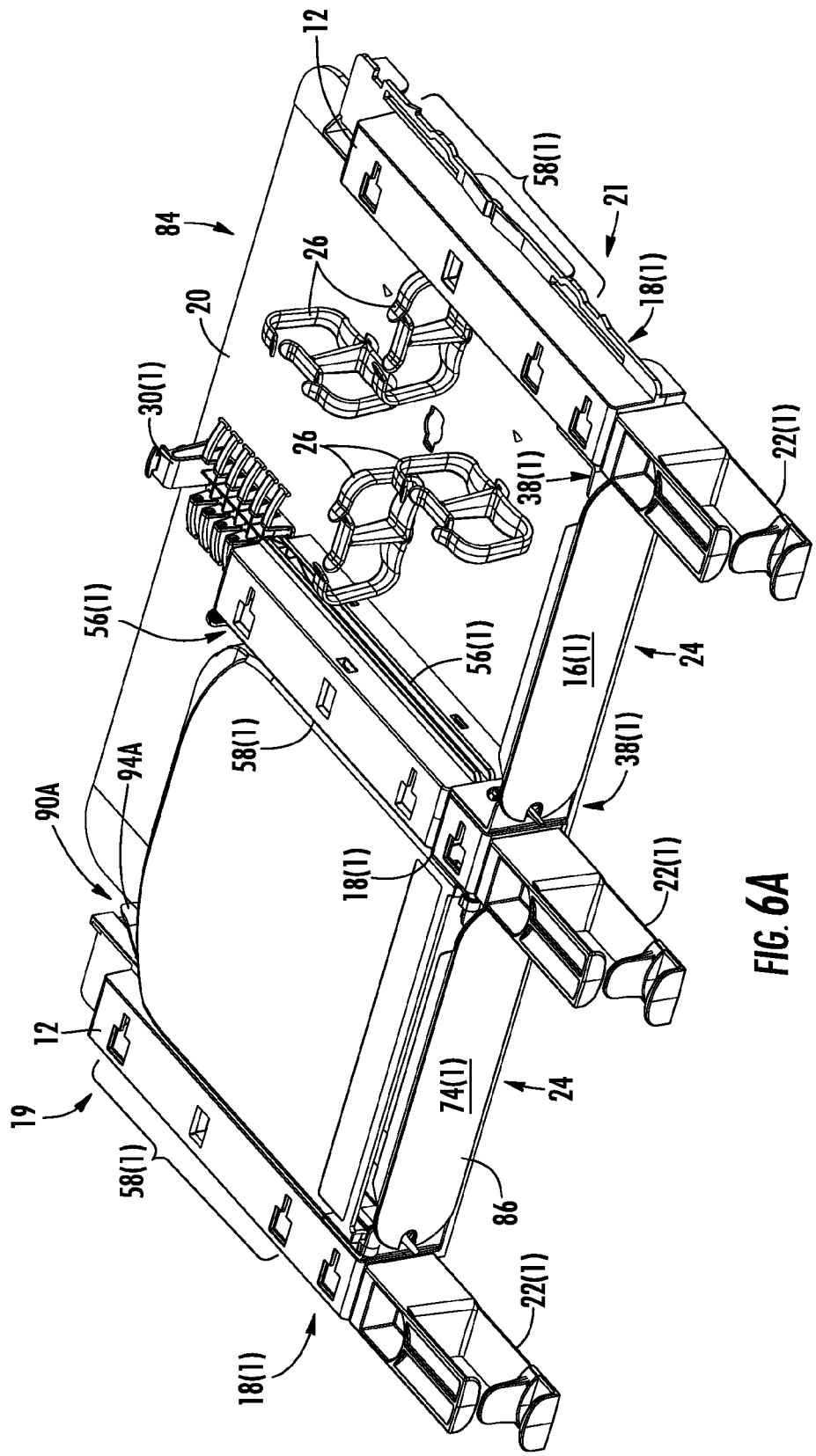
FIGS. 6A and 6B are perspective and side views, respectively, of the stackable shelf in FIGS. 1A-2D including front and rear removable stacker assemblies installed in the stackable shelf and supporting a fiber optic panel and a fiber optic module.
Figure 6B:
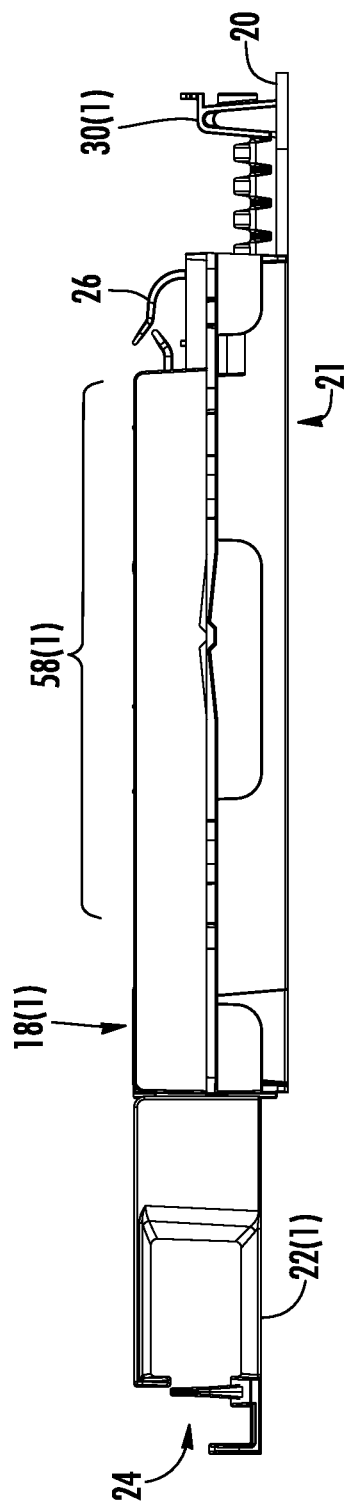

FIGS. 6A and 6B are perspective and side views, respectively, of the stackable shelf 10 in FIGS. 1A-2D including front stacker assemblies 18(1) and rear stacker assemblies 58(1) installed in the stackable shelf 10. The stackable shelf 10 is supporting both a fiber optic panel 16(1) and a fiber optic module 74(1) illustrated in FIGS. 6C and 6D in the same height space. FIG. 7 is a perspective view of the stackable shelf 10 in FIGS. 1A-2D including front stacker assemblies 18(1) and rear stacker assemblies 58(1) installed in the stackable shelf 10 supporting two (2) fiber optic modules 74(1), 74(2) in the same height space.

Figure 6D:
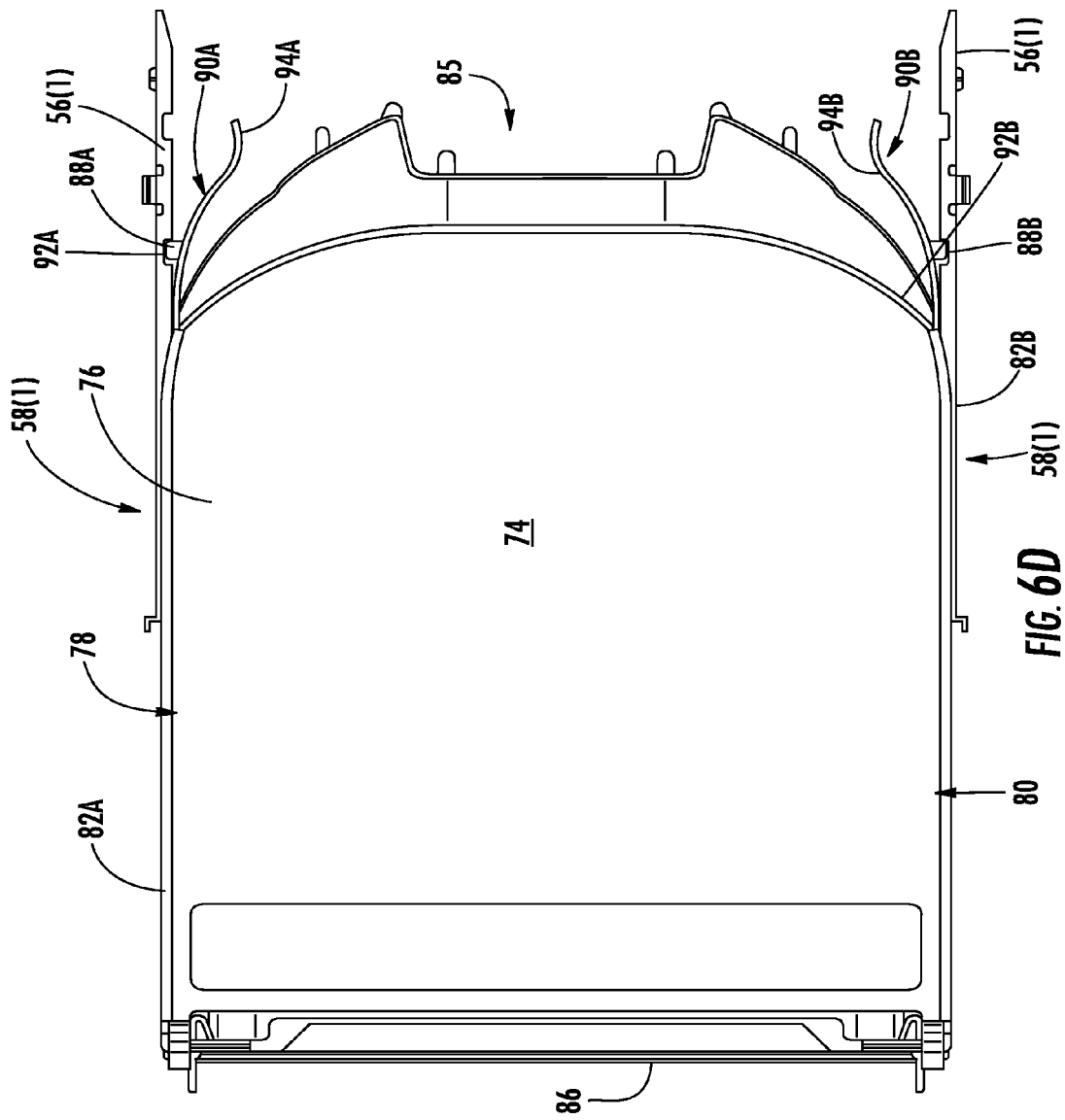
Figure 7:
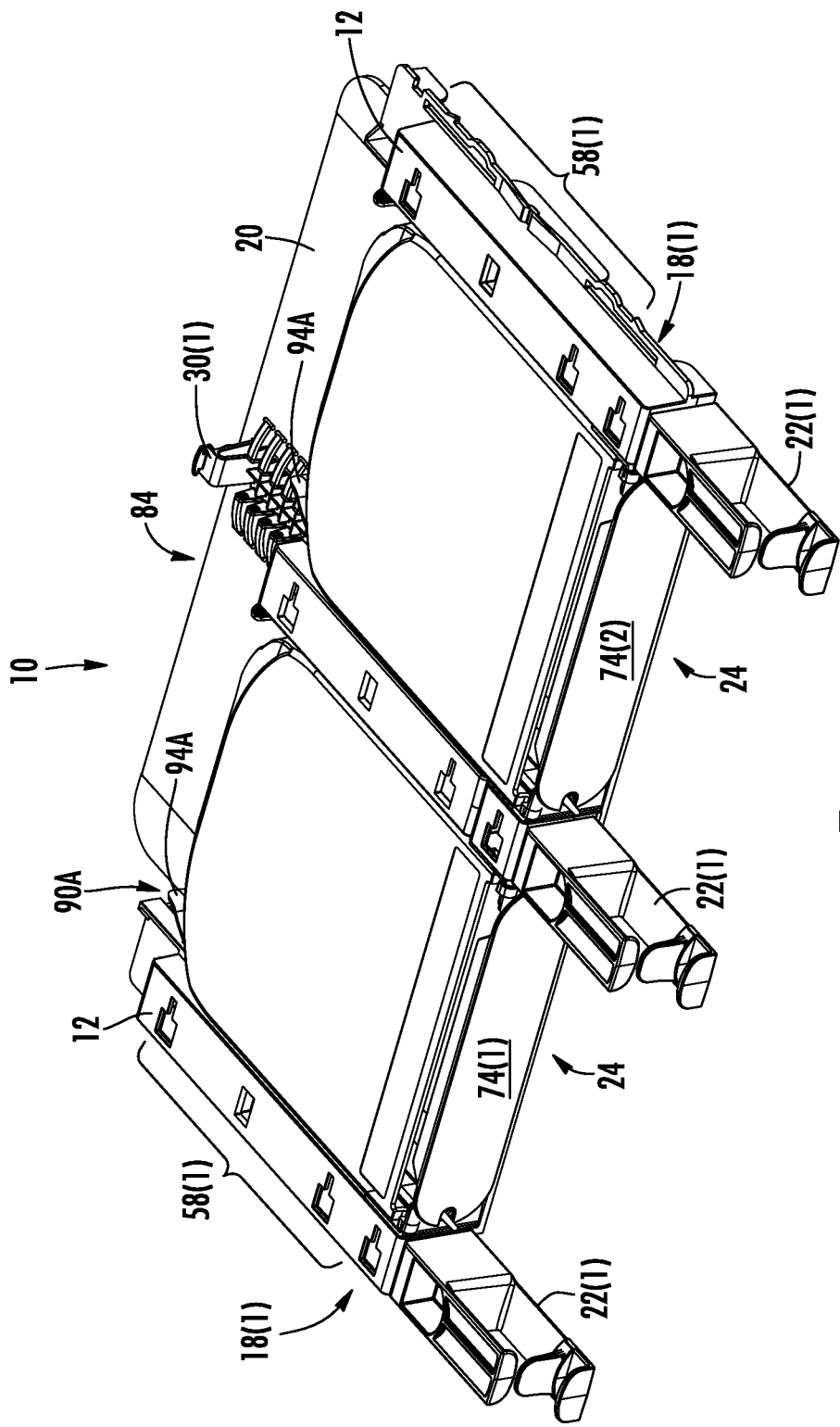
FIG. 7 is a perspective view of the stackable shelf in FIGS. 1A-2D including front and rear removable stacker assemblies to support two fiber optic modules in a 1 U height space.

As illustrated in the front perspective and top views of the fiber optic module 74 in FIGS. 6C and 6D, respectively, the fiber optic module 74 includes a housing 76 that includes a first end 78 and a second end 80. Rails guides 82A, 82B are disposed in the housing 76 on the first end 78 and the second end 80 of the housing 76, respectively. Thus, when a rear portion 85 of the fiber optic module 74 is inserted between rear stacker assemblies 58(1) from the front 24 of the mounting surface 20, the rail guides 82A, 82B of the fiber optic module 74 are aligned with the rails 56(1) in the rear stacker assemblies 58(1). As illustrated in FIGS. 6A, 6D, and 7, the rail guides 82A, 82B receive the rails 56(1). The fiber optic module 74 can be slid back from the front 24 of the mounting surface 20 to a rear 84 of the mounting surface 20, as illustrated in FIG. 6A, until a front side 86 of the fiber optic module 74 is located adjacent to the front stacker assembly 18(1) on the ends 19, 21 of the mounting surface 20.

As illustrated in FIG. 6D, the fiber optic module 74 can be locked into place in the rails 56(1) by protrusions 88A, 88B provided in a latching system 90A, 90B disposed in the rail guides 82A, 82B, respectively. As illustrated in FIG. 6D, the protrusions 88A, 88B are each configured to be secured into notches 92A, 92B disposed in the rails 56(1) to lock the fiber optic module 74 about the rear stacker assemblies 58(1). When it is desired to release the fiber optic module 74 from the rear stacker assemblies 58(1), latches 94A, 94B can be pushed inward toward the fiber optic module 74 to release the protrusions 88A, 88B from the notches 92A, 92B, respectively, to allow the rail guides 82A, 82B of the fiber optic module 74 to be moved about the rails 56(1) of the rear stacker assemblies 58(1).

Figure 8A:
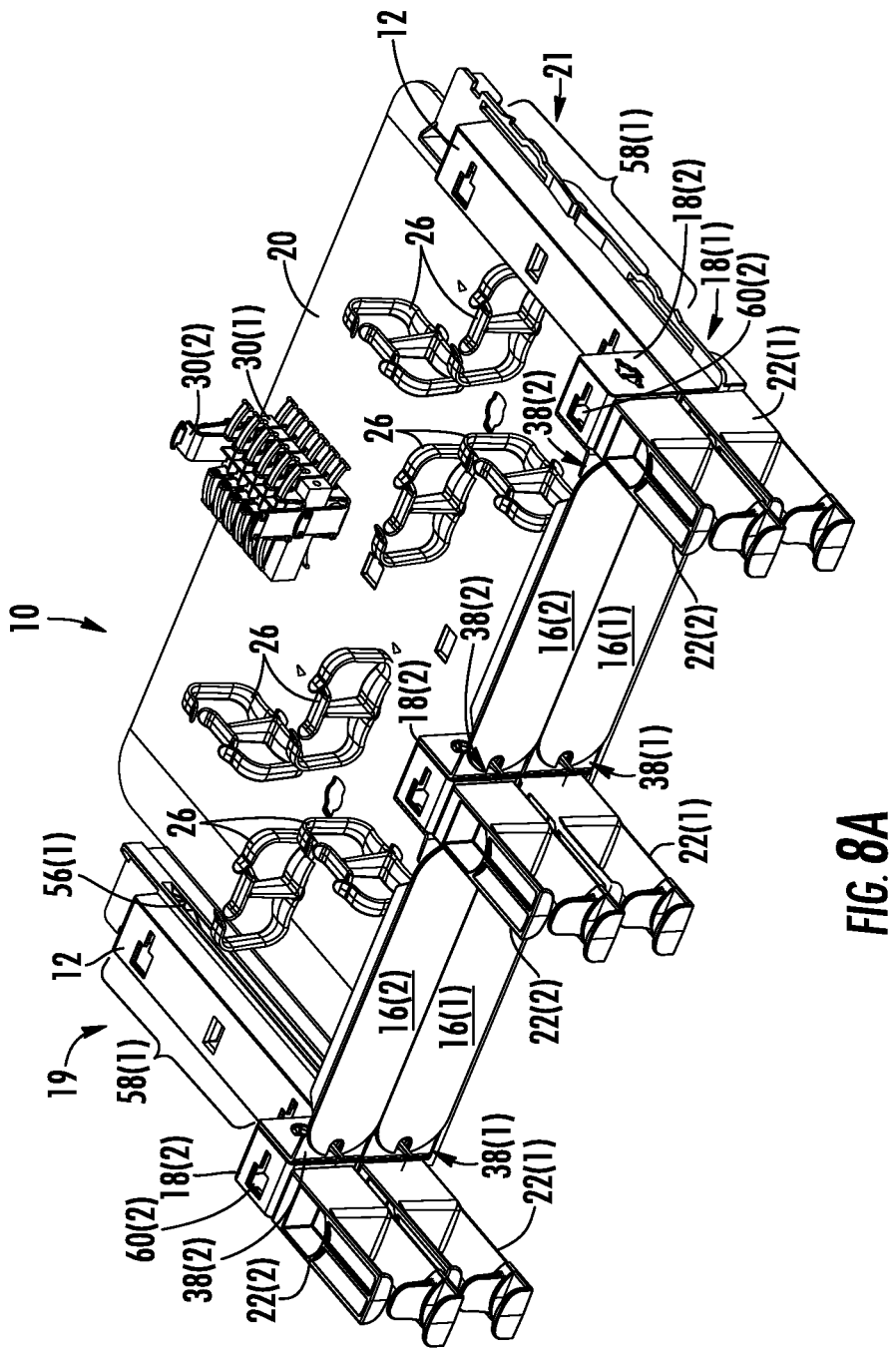
FIGS. 8A-8C are perspective, front, and rear views, respectively, of the stackable shelf in FIGS. 1A-2D including an additional front removable stacker assemblies to support fiber optic panels in a 2 U height space.
Figure 8B:
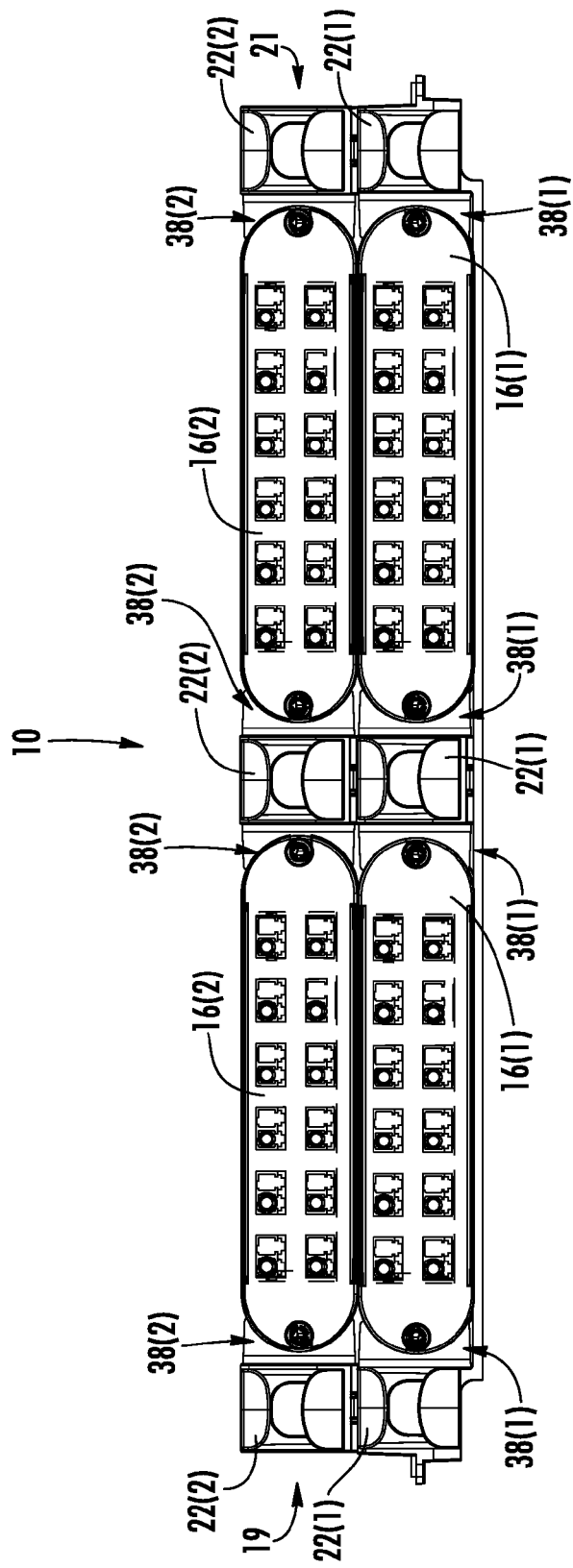
Figure 8C:
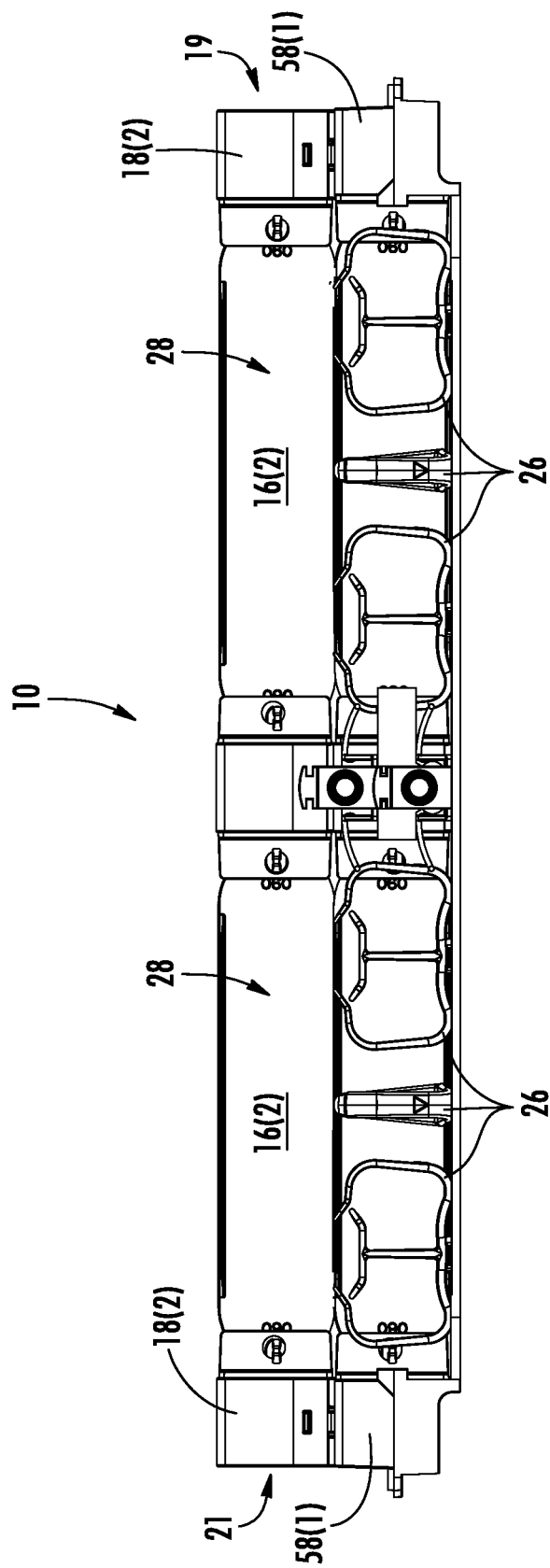
Figure 9:
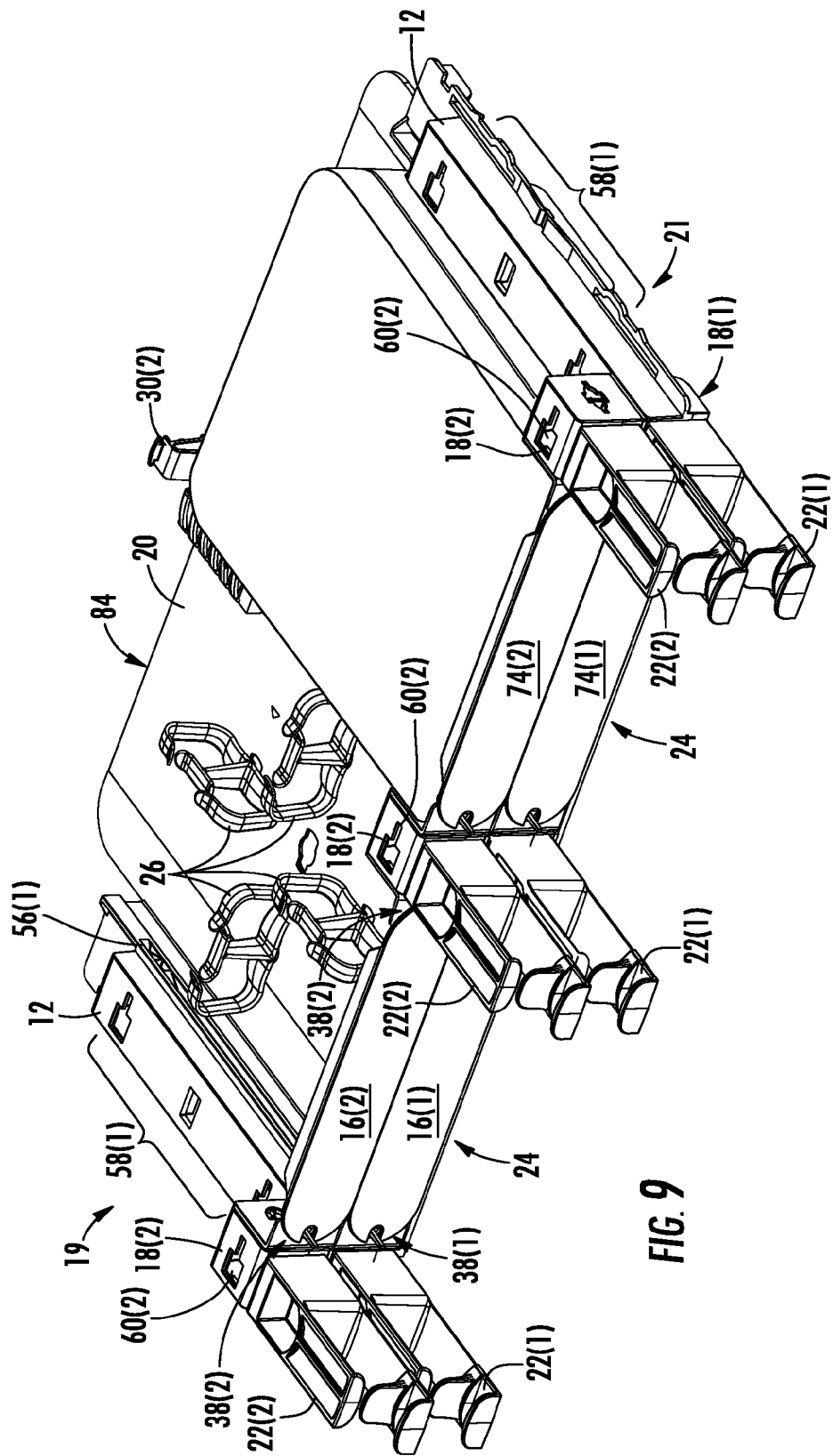
FIG. 9 is a perspective view of the stackable shelf in FIGS. 1A-2D configured with removable stacker assemblies to support an additional fiber optic panel and additional fiber optic module in a 2 U height space.
Figure 10:
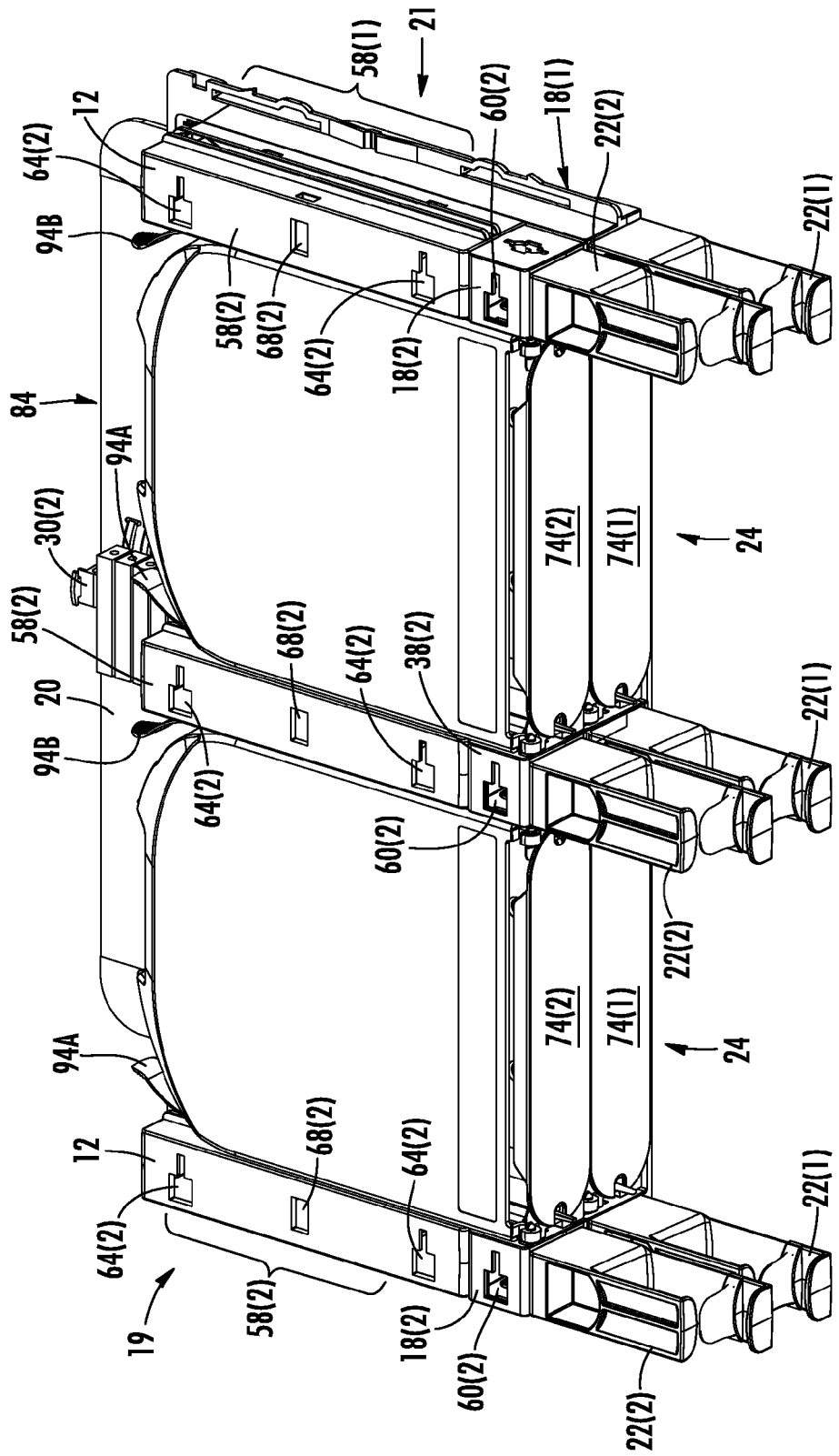
FIG. 10 is a perspective view of the stackable shelf in FIGS. 1A-2D configured with removable stacker assemblies to support additional fiber modules in a 2 U height space.

As previously discussed, providing the front stacker assemblies 18 and rear stacker assemblies 58 allows the stackable shelf 10 to be configured in a stacked arrangement to support fiber optic equipment at multiple height spaces as needed or desired. One example of this arrangement is illustrated in FIGS. 8A-8C. FIGS. 8A-8C are perspective, front, and rear views, respectively, of the stackable shelf 10 in FIGS. 1A-2D including additional front removable stacker assemblies 18(2) stacked on top of the front stacker assemblies 18(1) to support additional fiber optic panels 16(2) stacked over fiber optic panels 16(1) in a 2 U height space. FIG. 9 is a perspective view of the stackable shelf 10 in FIGS. 1A-2D including additional front removable stacker assemblies 18(2) stacked on top of the front stacker assemblies 18(1) to support an additional fiber optic panel 16(2) stacked over the fiber optic panel 16(1) and an additional fiber optic module 74(2) stacked over the fiber optic module 74(1) in a 2 U height space. FIG. 10 is a perspective view of the stackable shelf 10 in FIGS. 1A-2D including additional rear removable stacker assemblies 58(2) stacked on top of the rear stacker assemblies 58(1) to support additional fiber optic modules 74(2) stacked over the fiber optic modules 74(1) in a 2 U height space. Thus, in these configurations, the stackable shelf 10 is configured for providing fiber optic equipment in a 2 U height space for a 2 U fiber optic housing.

In FIGS. 8A-8C and 9, the removable panels clips 38(1), 38(2) previously described are employed to secure the fiber optic panels 16(1), 16(2) to the front stacker assemblies 18(1), 18(2), respectively. More information regarding stacking of front stacker assemblies 18 on top of other front stacker assemblies 18 to support additional fiber optic equipment at additional height spaces in the stackable shelf 10, such as front stacker assemblies 18(2) stacked on top of the front stacker assemblies 18(1) in FIGS. 8A-8C, is described below and illustrated in FIGS. 12A-12F.

Figure 11:
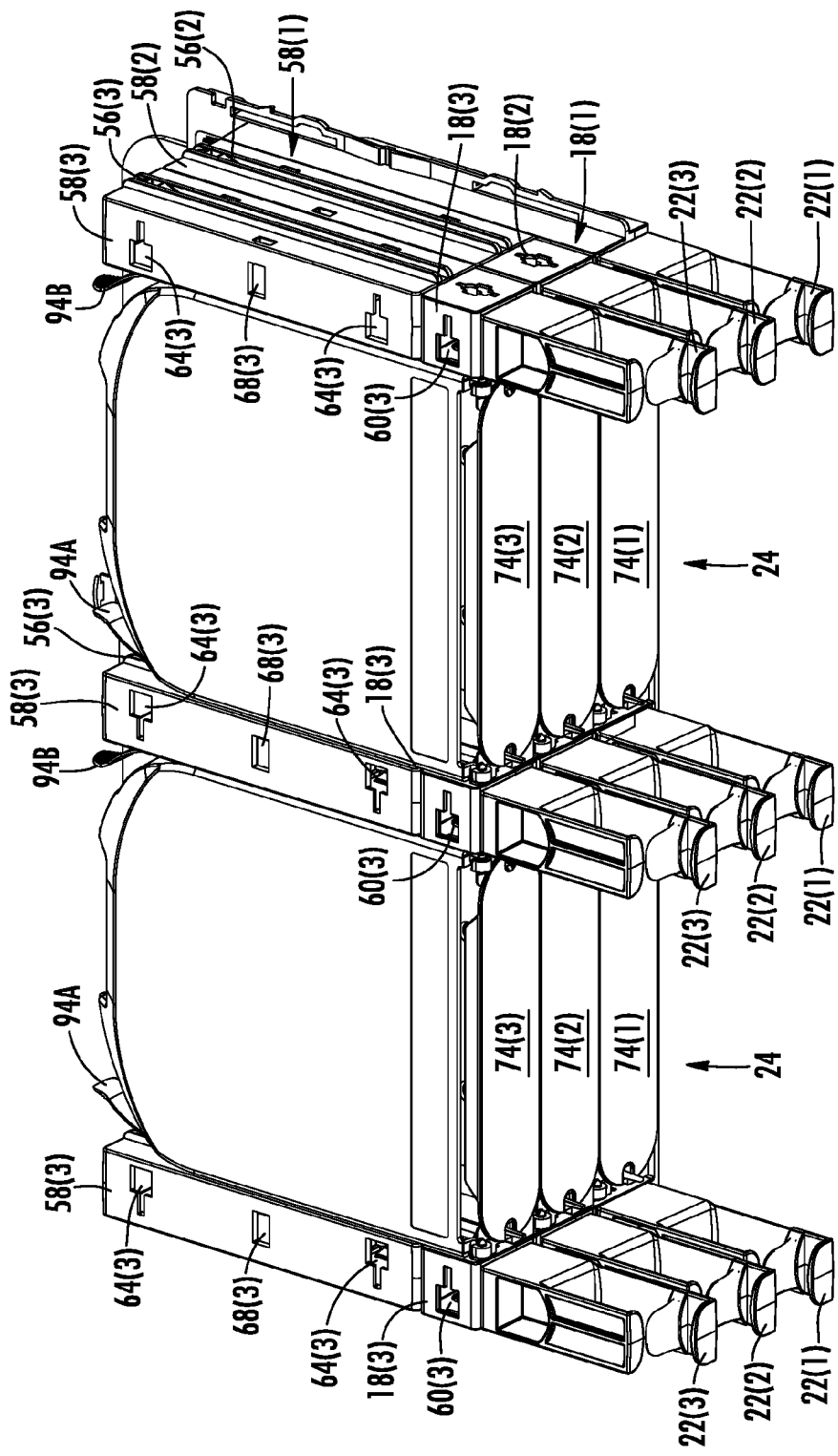
FIG. 11 is a perspective view of the stackable shelf in FIGS. 1A-2D configured with removable stacker assemblies to support additional fiber modules in a 3 U height space.

FIG. 11 is a perspective view of the stackable shelf 10 in FIGS. 1A-2D including additional rear removable stacker assemblies 58(2) stacked on top of the rear stacker assemblies 58(1), and rear removable stacker assemblies 58(3) stacked on top of the rear stacker assemblies 58(2) to support additional fiber optic modules 74(3), 74(2) stacked over the fiber optic modules 74(1) in a 3 U height space. Thus, in this configuration, the stackable shelf 10 is configured for providing fiber optic equipment in 3 U height space for a 3 U fiber optic housing.

FIGS. 12A-12F are a perspective exploded, assembled perspective, front, side, top, and bottom views, respectively, of the front stacker assembly 18. The front stacker assembly 18 illustrated in FIGS. 12A-12F is shown as a removable stacker assembly 18 that can be attached and removed to the mounting surface 20 and/or on top of other front stacker assemblies 18. However, the design features in the front stacker assembly 18 illustrated in FIGS. 12A-12F could also be employed in a front stacker assembly 18 that is not removable and disposed permanently on the mounting surface 20 of the stackable shelf 10, as illustrated in FIG. 4.

As illustrated FIGS. 12A-12F, the front stacker assembly 18 includes a support member 100. The support member 100 is comprised of a support body 102. The receiver 60 previously described with regard to FIGS. 4, 5B, and 5D is disposed in the support body 102. A first receiver 104A comprised of an opening in this embodiment is disposed in a first side 106 of the support body 102 and is configured to support fiber optic equipment in the stackable shelf 10. A second receiver 104B (FIG. 12D) comprised of a second opening in this embodiment is disposed in a second side 108 of the support body 102, and is also configured to support fiber optic equipment in the stackable shelf 10. For example, as previously discussed and discussed in more detail below with regard to FIGS. 15A-16E, the removable panel clips 38 can be attached to the first and second receivers 104A, 104B in the support body 102 so that fiber optic panels 16 can be secured to the removable panel clips 38. In turn, the fiber optic panels 16 attached to the removable panel clips 38 are then secured to the support body 102 of the front stacker assembly 18.

With continuing reference to FIGS. 12A-12F, a fiber routing guide receiver 110 is also disposed in the support body 102. The fiber routing guide receiver 110 is comprised of a platform 112 raised from the surface of the support body 102 by two (2) support members 114A, 114B. The fiber routing guide receiver 110, and more particularly, the platform 112, is configured to receive the front fiber routing guide 22, as described in more detail below and illustrated in FIGS. 13-14B.

Figure 12A:
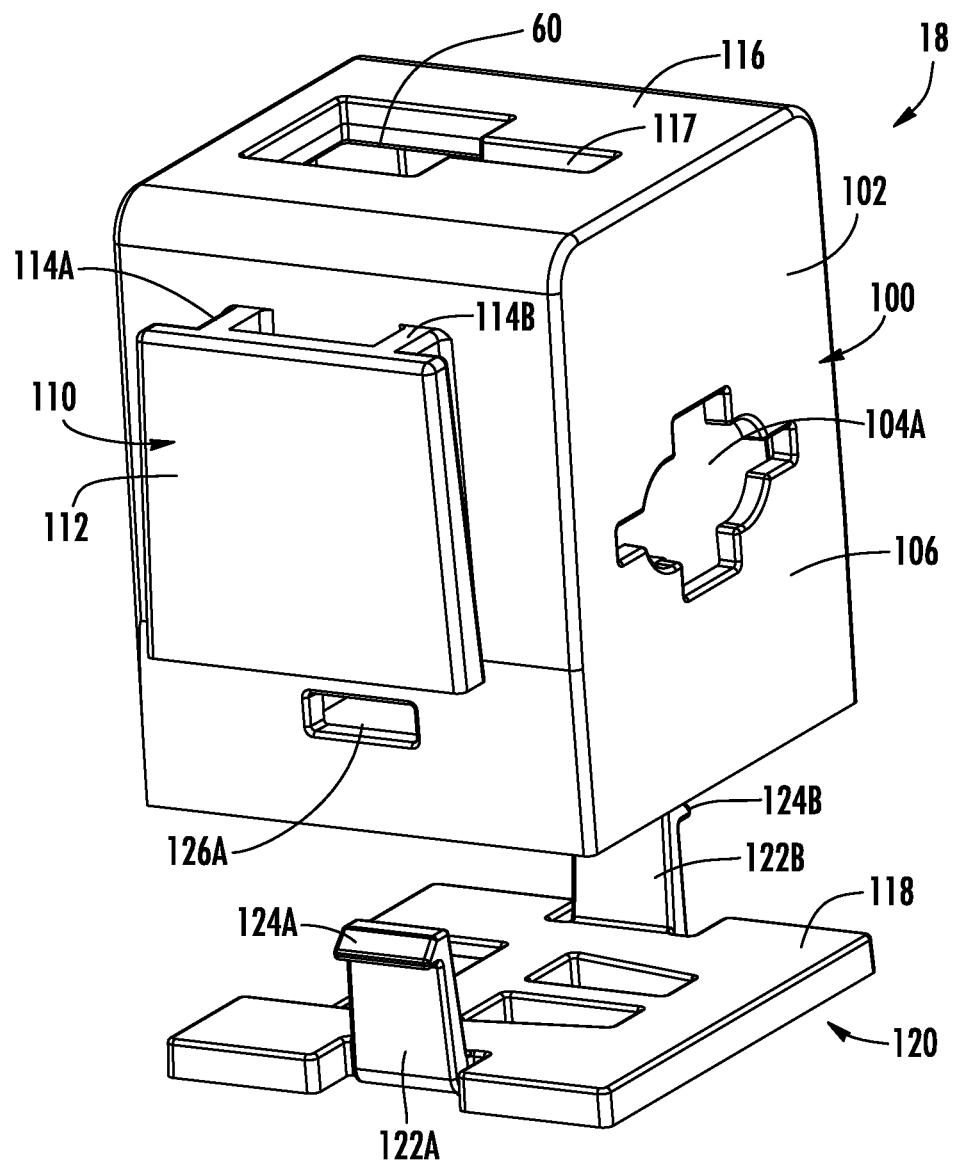
FIGS. 12A-12F are perspective exploded, assembled perspective, front, side, bottom, and top views, respectively, of a front removable stacker assembly.
Figure 12B:
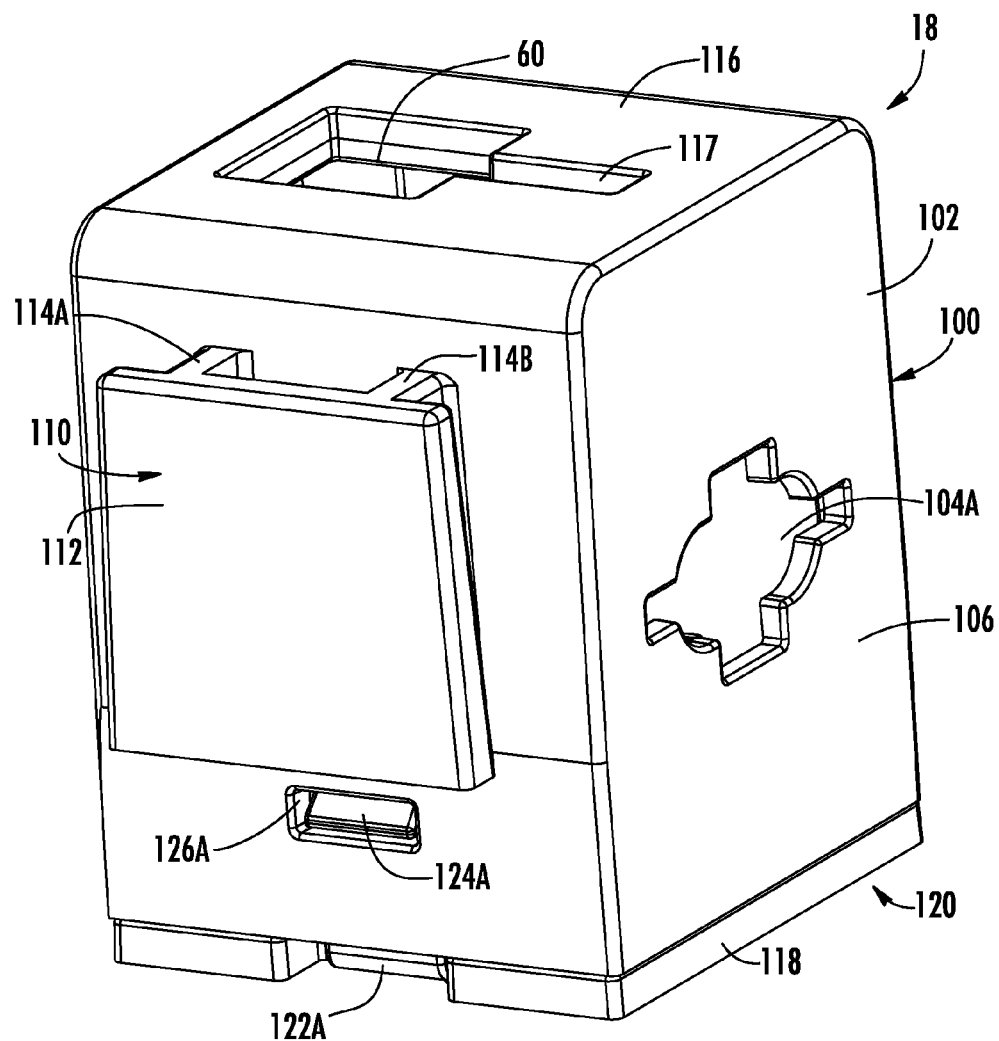
Figure 12C:
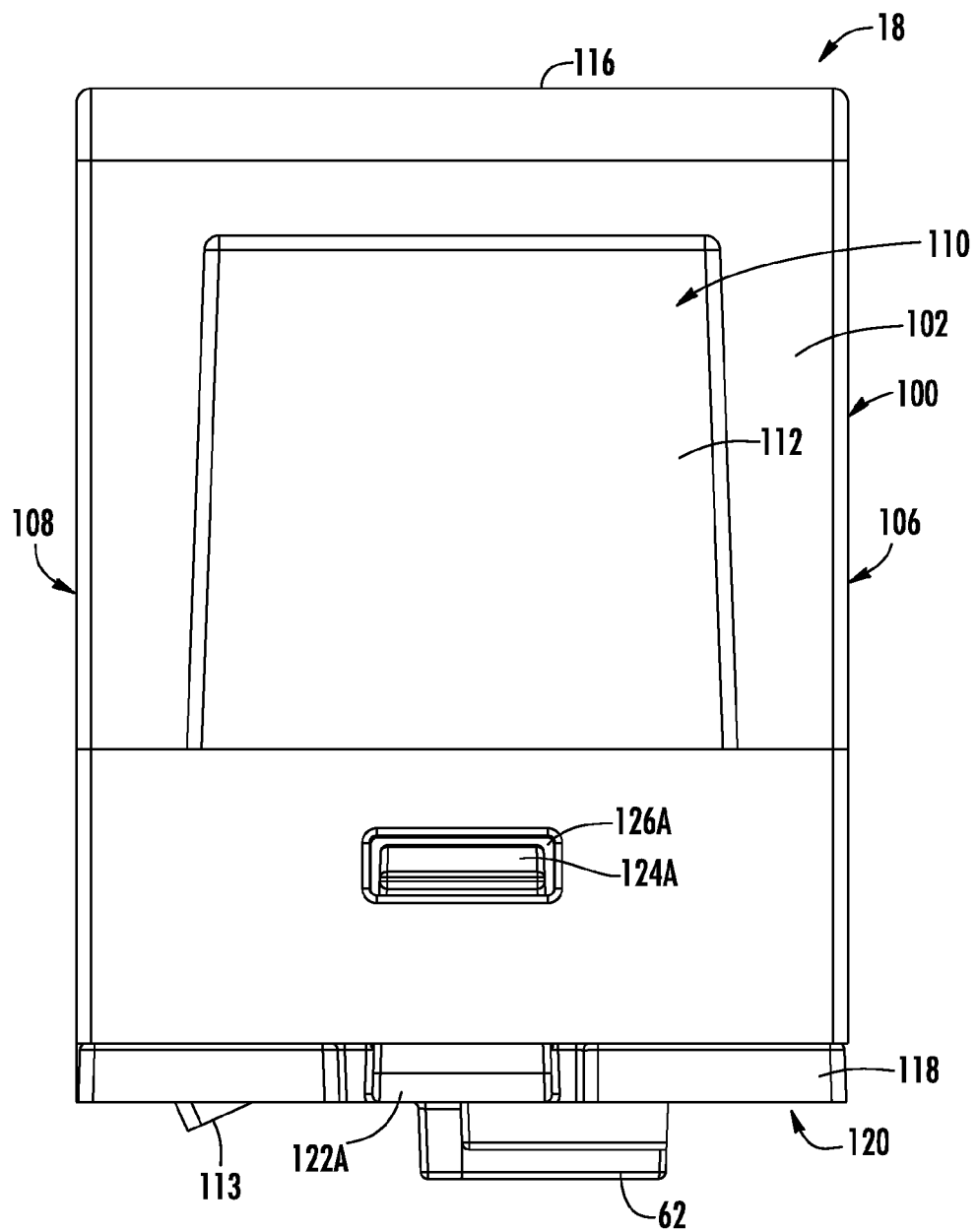
Figure 12D:
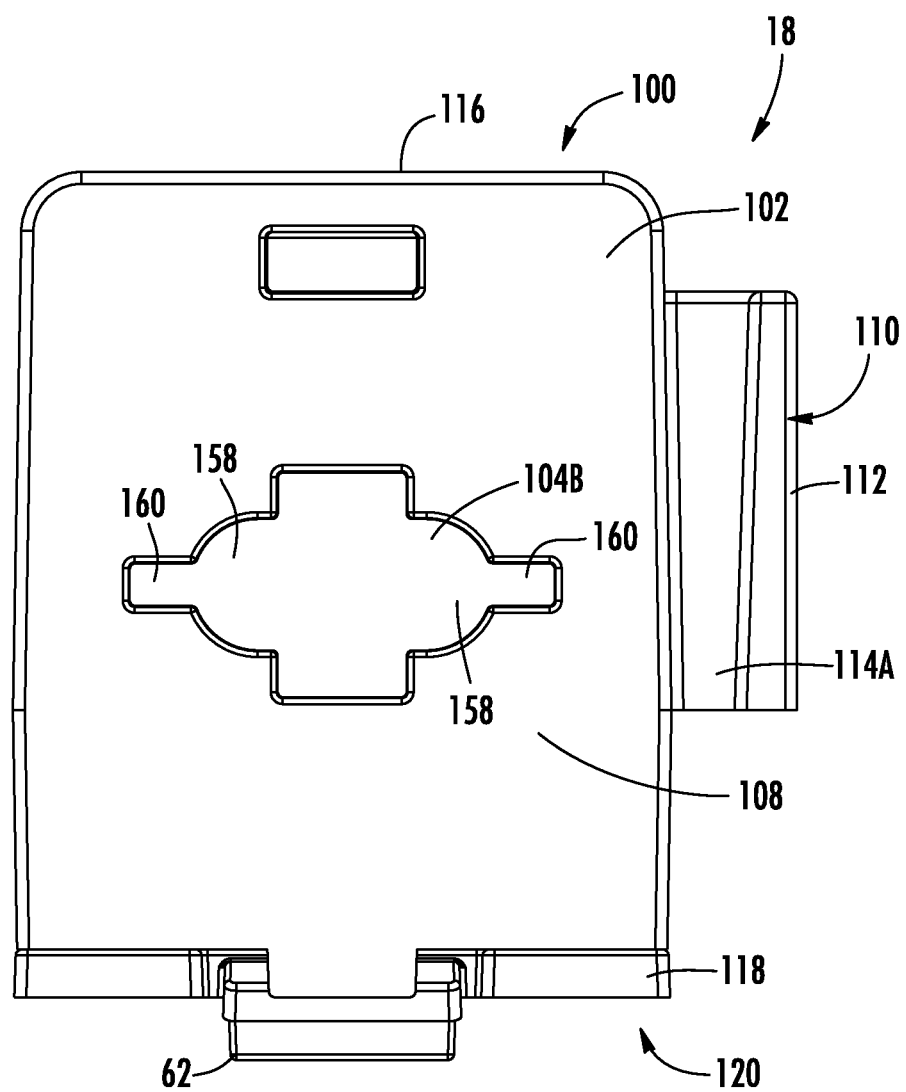
Figure 12E:
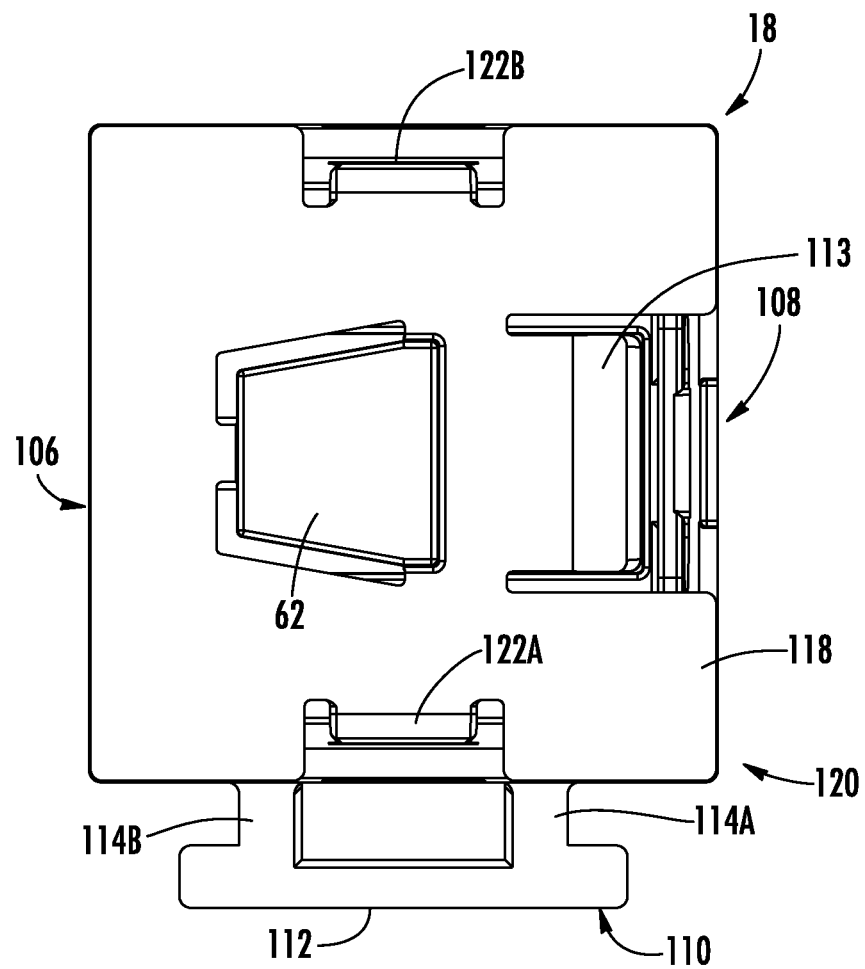
Figure 12F:
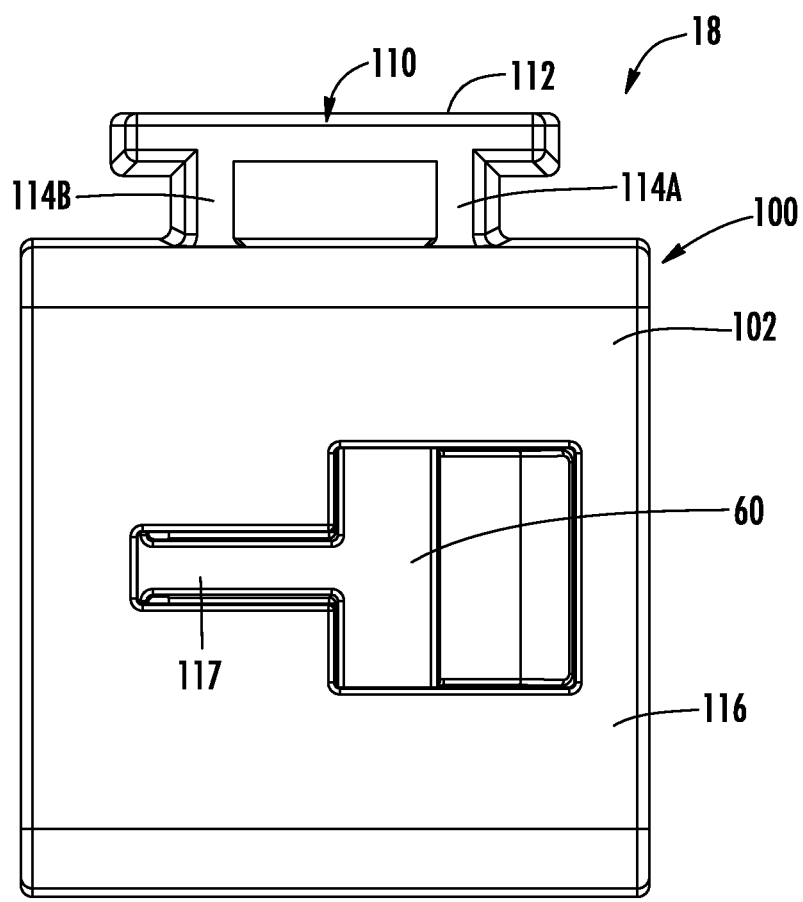

With continuing reference to FIGS. 12A-12F, the receiver 60 previously discussed is disposed in a top side 116 of the support body 102. The receiver 60 contains a keyed portion 117. The receiver 60 is configured to receive the latch 62, previously described and illustrated in FIG. 5A, and illustrated in FIGS. 12C-12F. The latch 62 in this embodiment is disposed in an attachment body 118 of an attachment member 120 configured to receive the support body 102 as illustrated in FIG. 12A, and as assembled in FIG. 12B. To secure the latch 62 to the receiver 60, a locking feature 113 as illustrated in FIGS. 12C and 12E, is first inserted into the receiver 60 and slid underneath the receiver 60. As a result, the latch 62 is inserted into the receiver 60 and slid about the receiver 60 into the keyed portion 117 to be secured to the support body 102. In this scenario, the latch 62 can be disposed in the receiver 60 in the top side 116 of the support body 102 of the front stacker assembly 18 to allow one front stacker assembly 18 to be stacked on top of another front stacker assembly 18 to allow the stackable shelf 10 to be configured to support fiber optic equipment at additional height spaces above a 1-U height space, as desired or needed. This configuration also allows the front stacker assembly 18 to be secured to the mounting surface 20, as previously discussed with regard to FIG. 5A, wherein the latch 62 is disposed in the receiver 59 in the mounting surface 20 to support fiber optic equipment in the first 1-U height space from the mounting surface 20.

With reference to FIGS. 12A and 12B, the attachment body 118 is provided as a separate component configured to be secured to the support body 102. In this regard, latches 122A, 122B are disposed in the attachment body 118, as illustrated in FIG. 12A. The latches 122A, 122B contain extension members 124A, 124B that are configured to be bent inward as the support body 102 is disposed over top the attachment body 118. The energy stored in the extension members 124A, 124B will eventually cause the extension members 124A, 124B to extend outward into openings 126A, 126B to secure the support body 102 to the attachment body 118, as illustrated in FIG. 12B.

Figure 13:
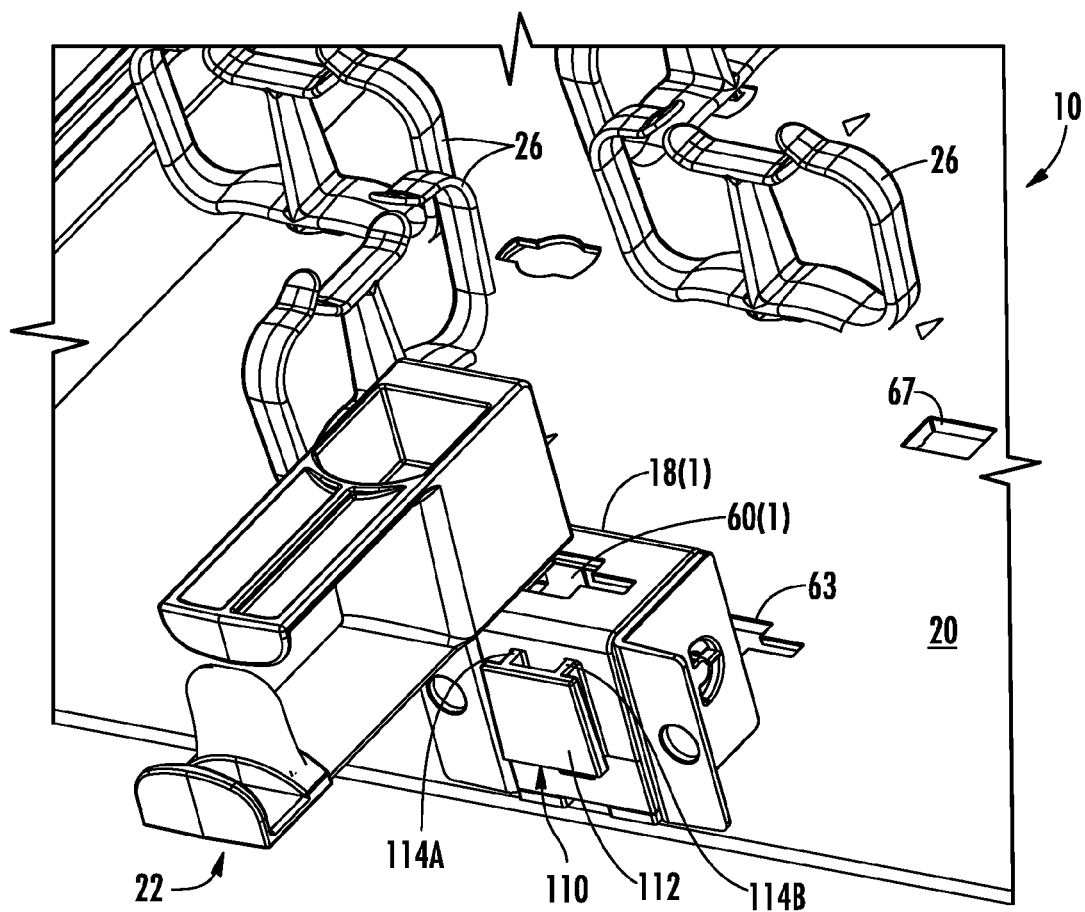
FIG. 13 is a perspective view of an exemplary front routing guide in FIGS. 1A-2D positioned to be secured to the front stacker assembly in FIGS. 12A-12F installed in the stackable shelf of FIG. 4.

FIG. 13 is a perspective view of the exemplary front fiber routing guide 22 in FIGS. 1A-2D positioned to be secured to the front stacker assembly 18 in FIGS. 12A-12F installed in the stackable shelf 10 of FIG. 4. More particularly, the front fiber routing guide 22 is configured to be secured to the fiber routing guide receiver 110 comprised of the platform 112 raised from the surface of the support body 102 by the support members 114A, 114B, as illustrated in FIGS. 12A-12F and described above. Although not illustrated in FIG. 13, the fiber routing guide receiver 110 is also configured to receive and secure the elongated fiber routing guides 34 illustrated in FIGS. 3A and 3B.

Figure 14A:
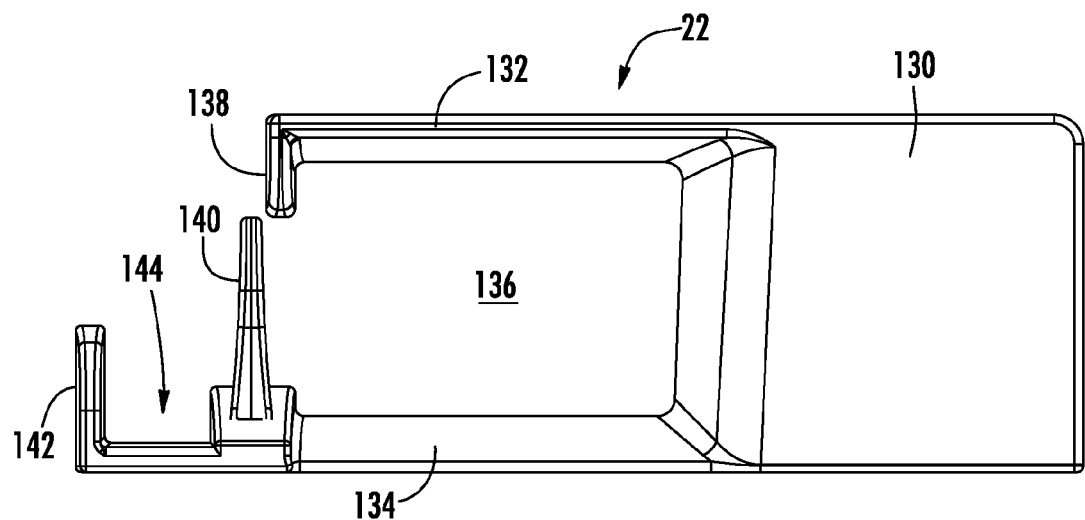
FIGS. 14A and 14B are side and rear views, respectively, of a front fiber routing guide that attaches to the front stacker assembly illustrated in FIG. 13.
Figure 14B:
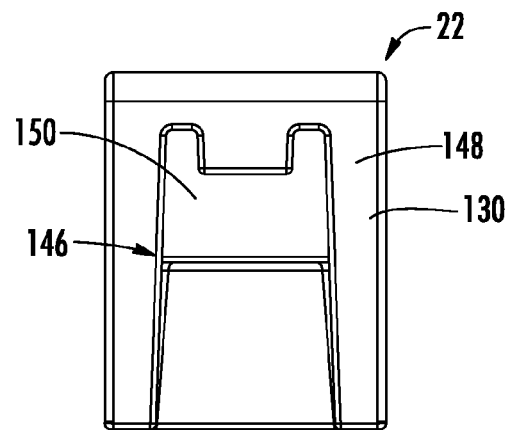

FIGS. 14A and 14B are side and rear views, respectively, of the front fiber routing guide 22 that is configured to be attached to the front stacker assembly 18 illustrated in FIG. 13. As illustrated in FIG. 14A, the front fiber routing guide 22 is comprised of a routing guide body 130. Two (2) extension members 132, 134 extend from the routing guide body 130 such that a retention area 136 is created therebetween for optical fibers to be retained. The extension member 132 contains an end extension 138 and the extension member 134 contains a retainer 140, respectively, to retain optical fibers in the retention area 136. The end extension 138 and the retainer 140, for example a flap, are not closed so that optical fibers can be disposed therebetween into the retention area 136. An additional extension member 142 is also provided to allow the stackable shelf 10 to be pulled out with an additional area 144 to provide for finger access.

To attach the front fiber routing guide 22 to the platform 112 on the front stacker assembly 18 as illustrated in FIG. 13, a receiver 146 is disposed in a rear side 148 of the front fiber routing guide 22, as illustrated in FIG. 14B. The receiver 146 is comprised of a hood 150 that is configured to be slipped over a top portion of the platform 112 of the fiber routing guide receiver 110. The front fiber routing guide 22 can be removed from the front stacker assembly 18 by pulling up on the front fiber routing guide 22 such that the hood 150 is lifted off of the platform 112 of the fiber routing guide receiver 110 to clear the front fiber routing guide 22 from the front stacker assembly 18.

Figure 15A:
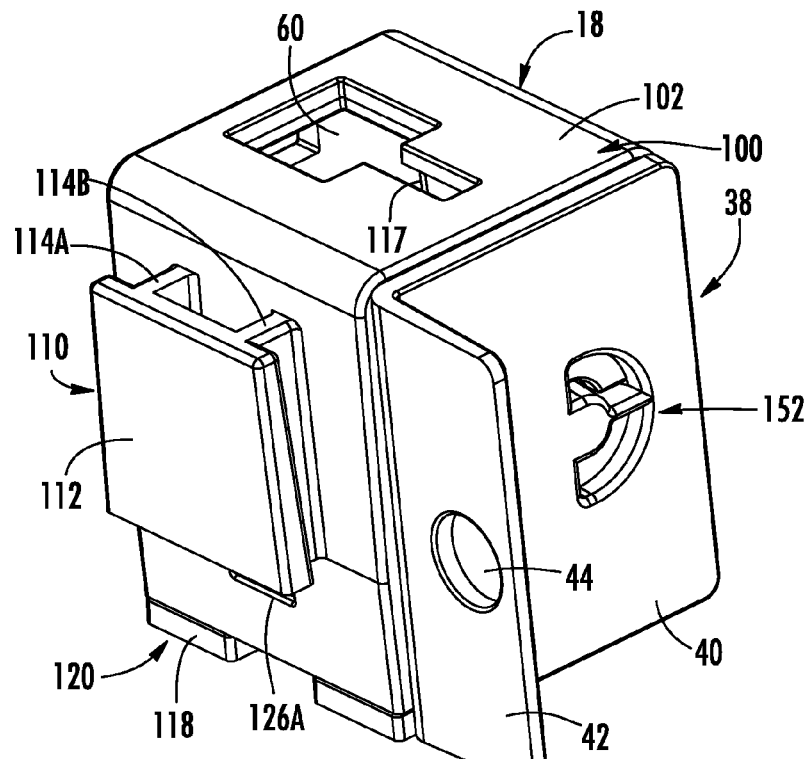
FIGS. 15A and 15B are perspective and side views, respectively, of the front stacker assembly in FIGS. 12A-12F with an exemplary removable panel clip secured thereto to support securing fiber optic panels to the stackable shelf in FIG. 4.
Figure 15B:
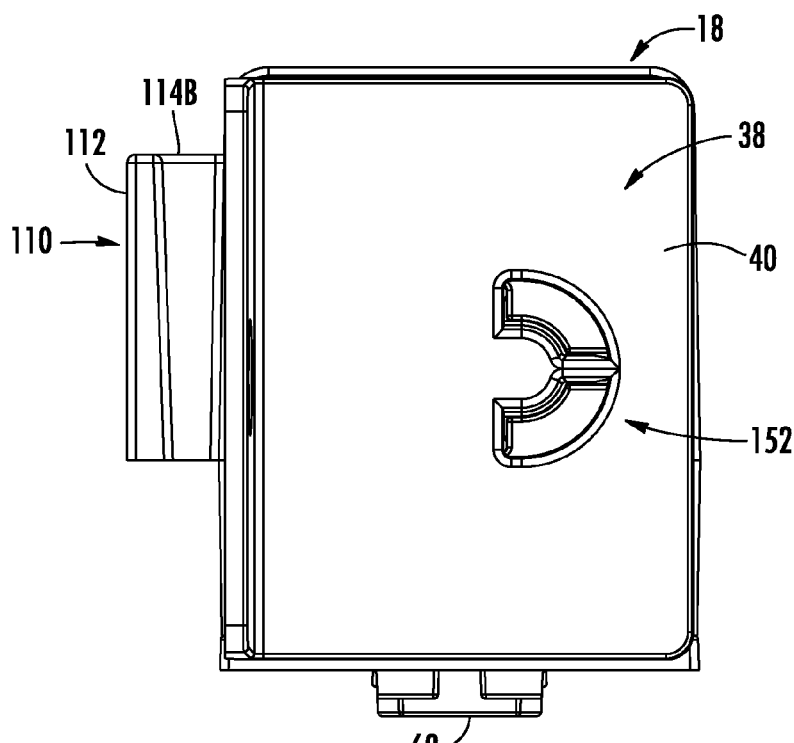
Figure 16A:
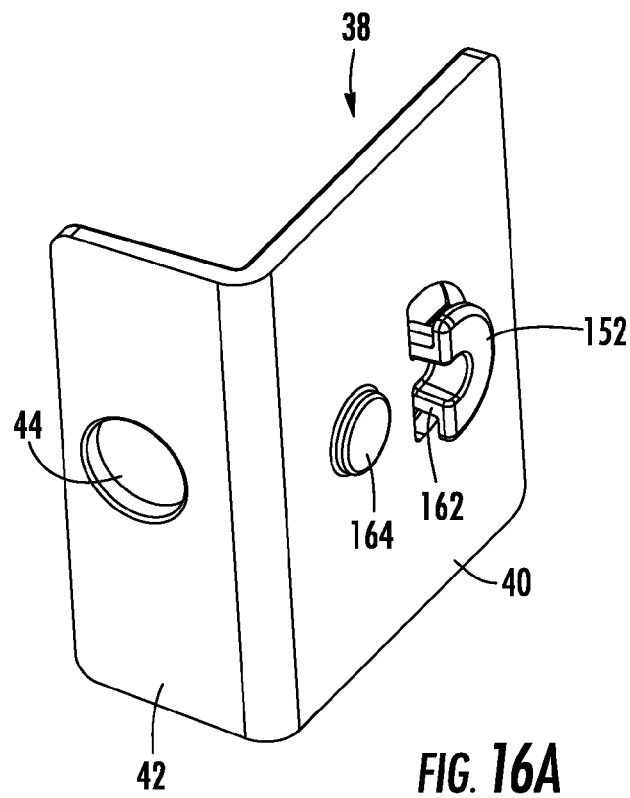
FIGS. 16A-16E are perspective, right side, left side, top, and front views, respectively, of the removable panel clip.
Figure 16B:
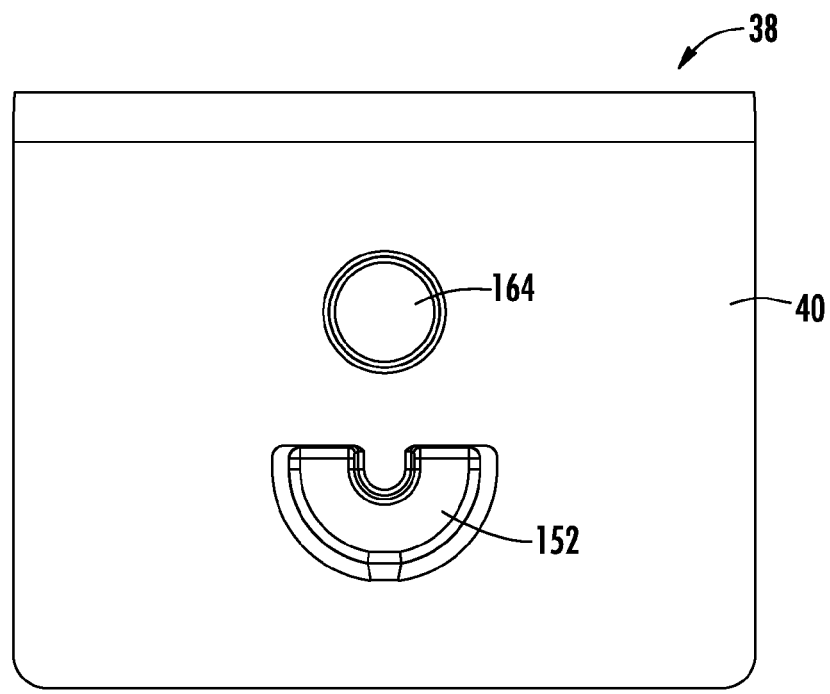
Figure 16C:
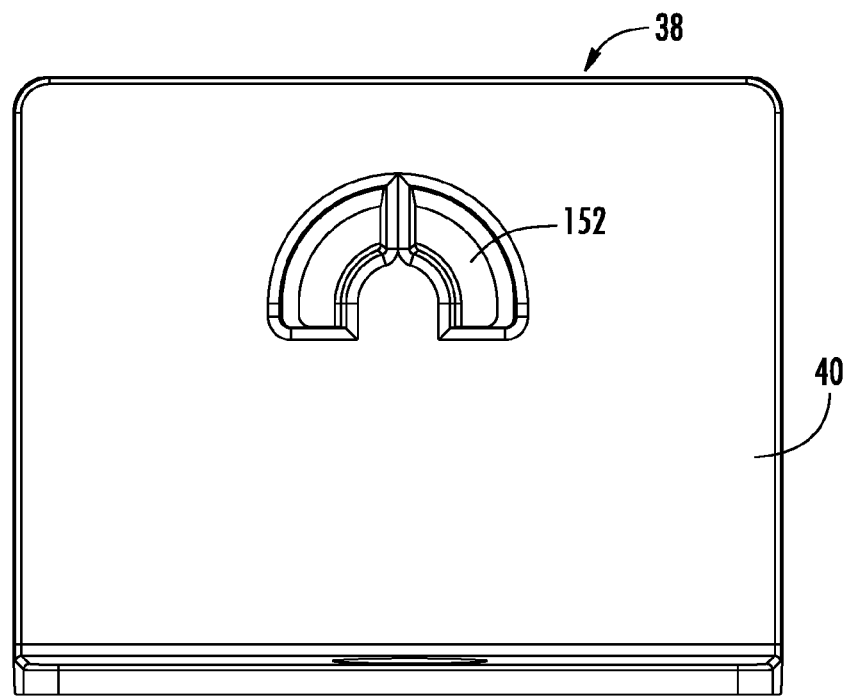
Figure 16D:
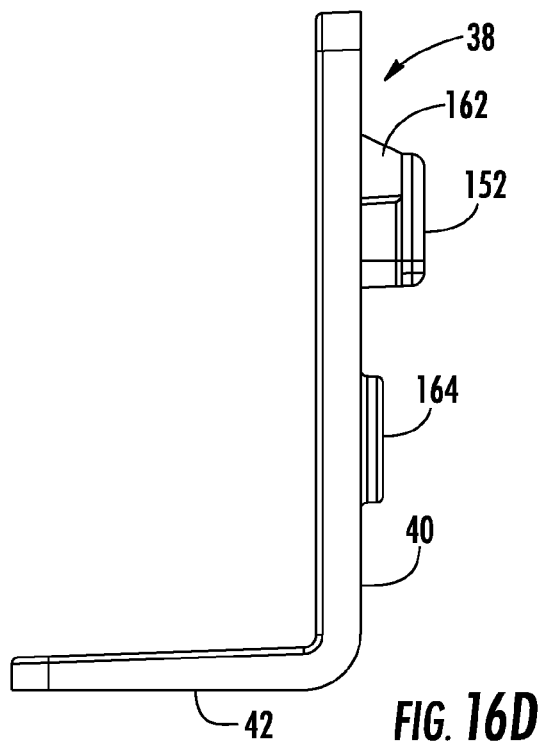
Figure 16E:
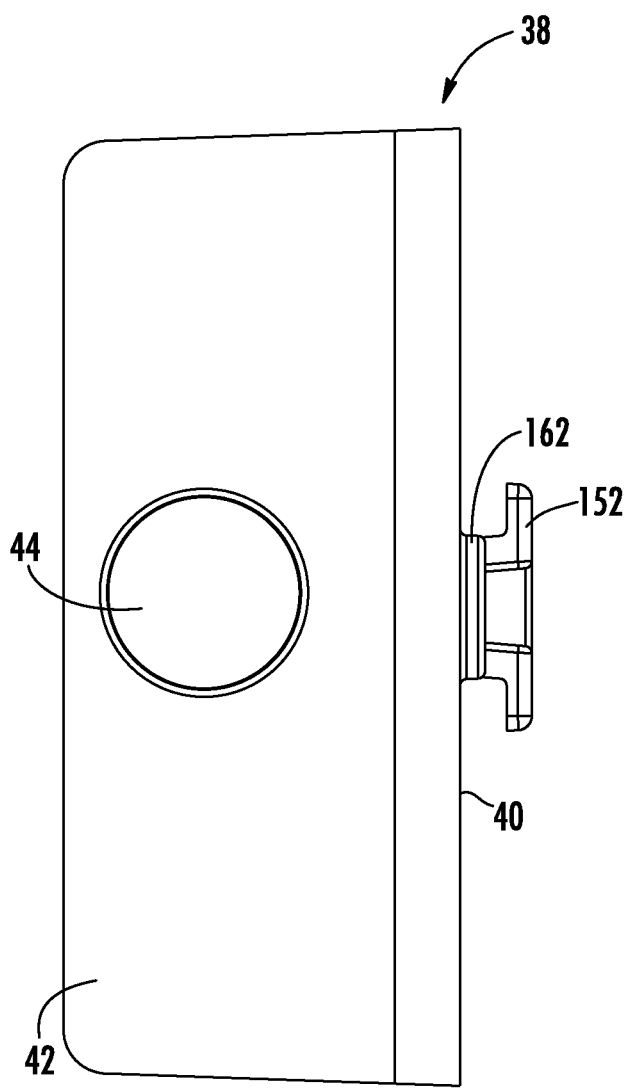

As previously discussed with regard to FIG. 3A, the front stacker assembly 18 is also configured to support the removable panel clip 38 to allow fiber optic panels 16 to be secured to the front stacker assembly 18 and thus supported by the stackable shelf 10. The removable panel clip 38 allows fiber optic panels 16 and fiber optic modules 74 to be supported interchangeably in the stacked shelf 10 in this embodiment. In this regard, FIGS. 15A and 15B are perspective and side views, respectively, of the front stacker assembly 18 in FIGS. 12A-12F with the removable panel clip 38 secured thereto to support securing fiber optic panels 16 to the stackable shelf 10 in FIG. 4.

As illustrated in FIGS. 15A-16E, the removable panel clip 38 includes a flange 152. The flange 152 is configured to be inserted into the receiver 104A or 104B of the front stacker assembly 18 (FIGS. 12A and 12D) to attach the removable panel clip 38 to the front stacker assembly 18. The flange 152 in this embodiment is arcuate-shaped, but other shapes can be provided, including but not limited to semi-circular and circular. The flange 152 is disposed in the first surface 40 of the removable panel clip 38 (see also FIGS. 2A-2C). The receiver 44 disposed in the second surface 42 to the first surface 40 of the removable panel clip 38 is configured to receive the insert 46 of a fiber optic panel 16, as illustrated in FIGS. 2A-2C. The first surface 40 is orthogonal to the second surface 42 in this embodiment. The flange 152 is configured to be inserted in a first area 158 of the receiver 104A or 104B and slid into a second area 160 of the receiver 104A or 104B, as illustrated in FIG. 12D, to attach the removable panel clip 38 to the front stacker assembly 18. A standoff or extender 162 (FIG. 16A) is disposed between the flange 152 and the first surface 40 to extend the flange 152 a distance away from the first surface 40 so the flange 152 can be inserted into the receiver 104A or 104B in the front stacker assembly 18. The flange 152 can then be slid behind the second area 160 of the receiver 104A or 104B, which has an opening size less than the size of the flange 152.

The flange 152 cannot be removed from the receiver 104A or 104B unless and until the flange 152 is slid back to the first area 158 of the receiver 104A or 104B, which has an opening size that will allow the flange 152 to be removed from the receiver 104A or 104B. A protrusion 164 is also disposed in the first surface 40 of the removable panel clip 38 to be disposed into the second area 160 of the receiver 104A or 104B to further secure the removable panel clip to the removable stacker assembly 18.

FIGS. 17A-17F are exploded perspective, assembled perspective, top, side, front, and bottom views, respectively, of the rear stacker assembly 58. The rear stacker assembly 58 illustrated in FIGS. 17A-17F is shown as a removable rear stacker assembly 58 that can be attached to and removed from the mounting surface 20 and/or on top of other rear stacker assemblies 58. However, the design features in the rear stacker assembly 58 illustrated in FIGS. 17A-17F could also be employed in a rear stacker assembly 58 that is not removable and disposed permanently on the mounting surface 20 of the stackable shelf 10, as illustrated in FIG. 4.

Figure 17D:
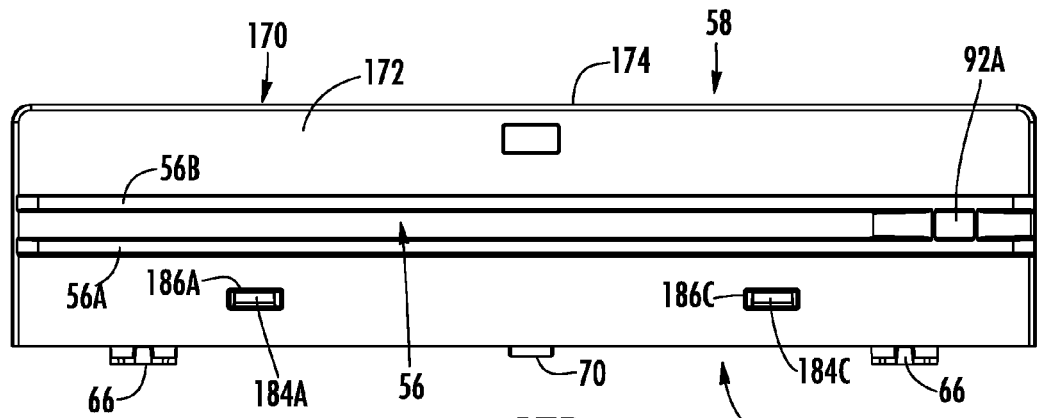
Figure 17E:
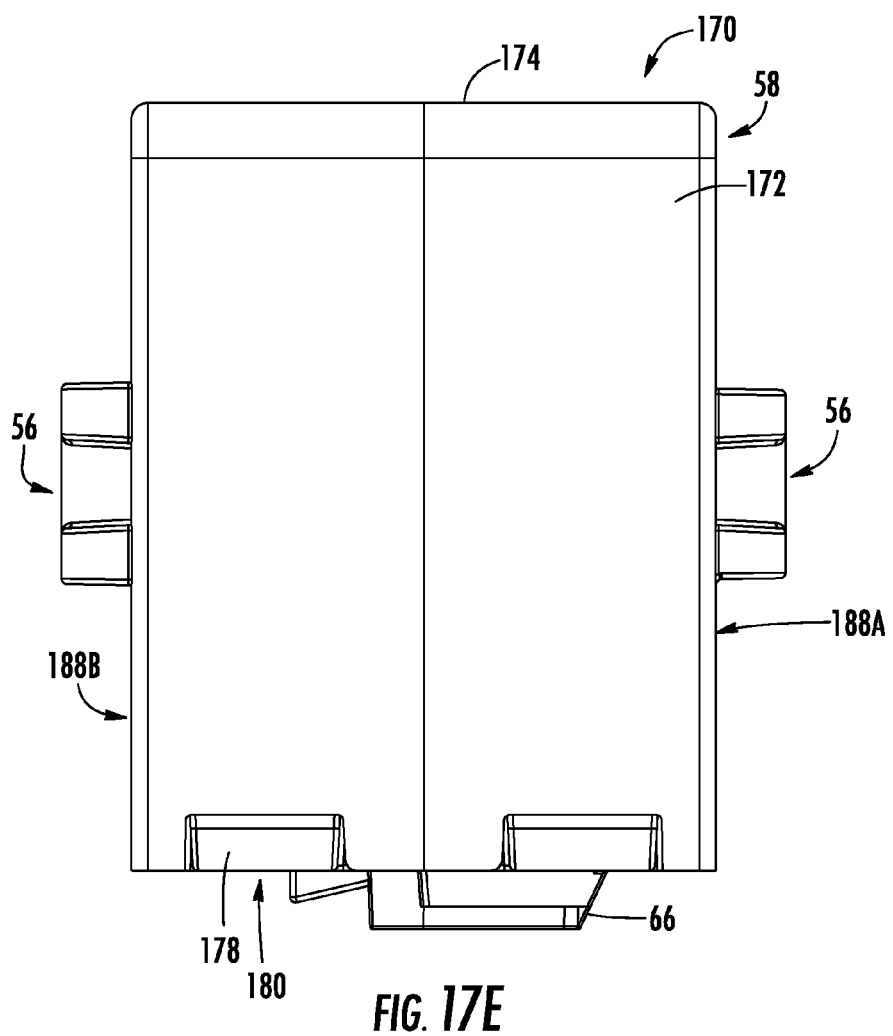
Figure 17F:
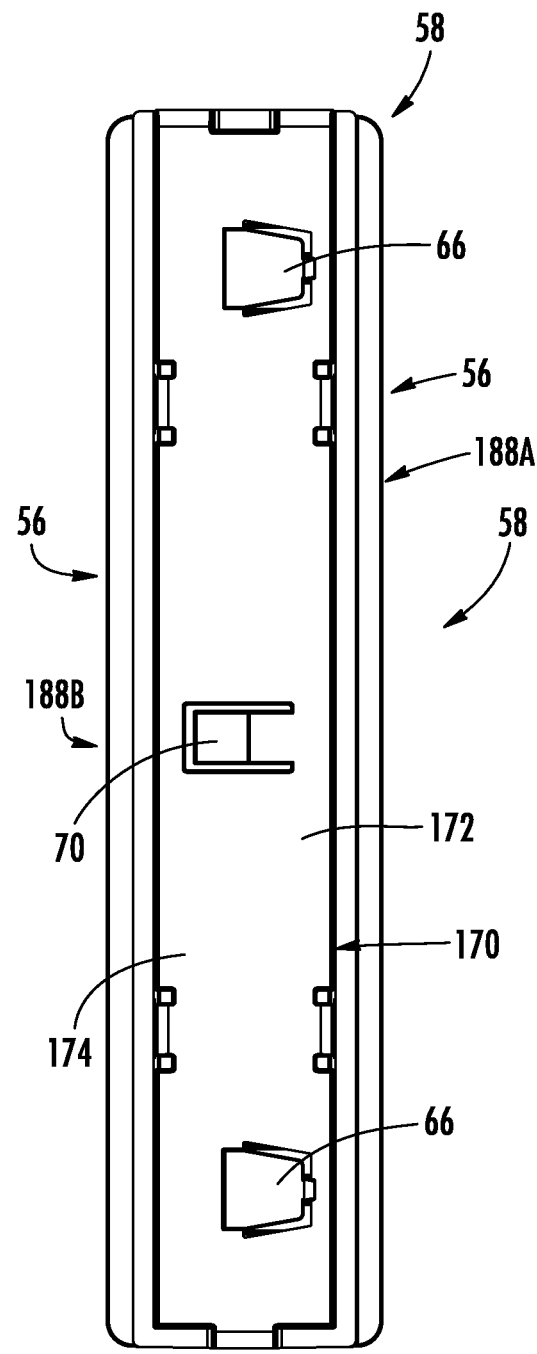
Figure 18A:
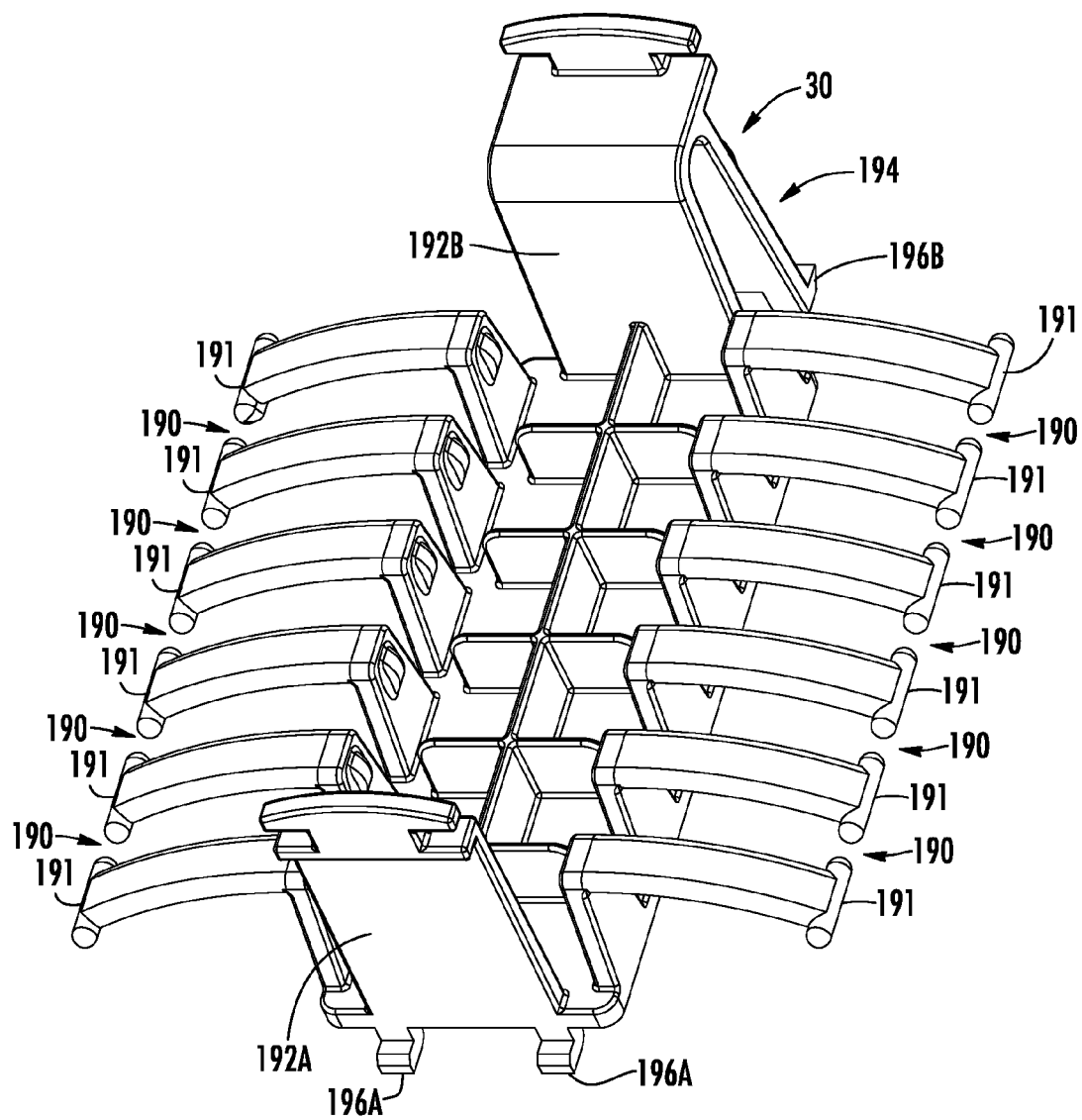
FIGS. 18A-18D are perspective, front, top, and side views, respectively, of the fiber body holder in FIGS. 1A-2D.
Figure 18B:
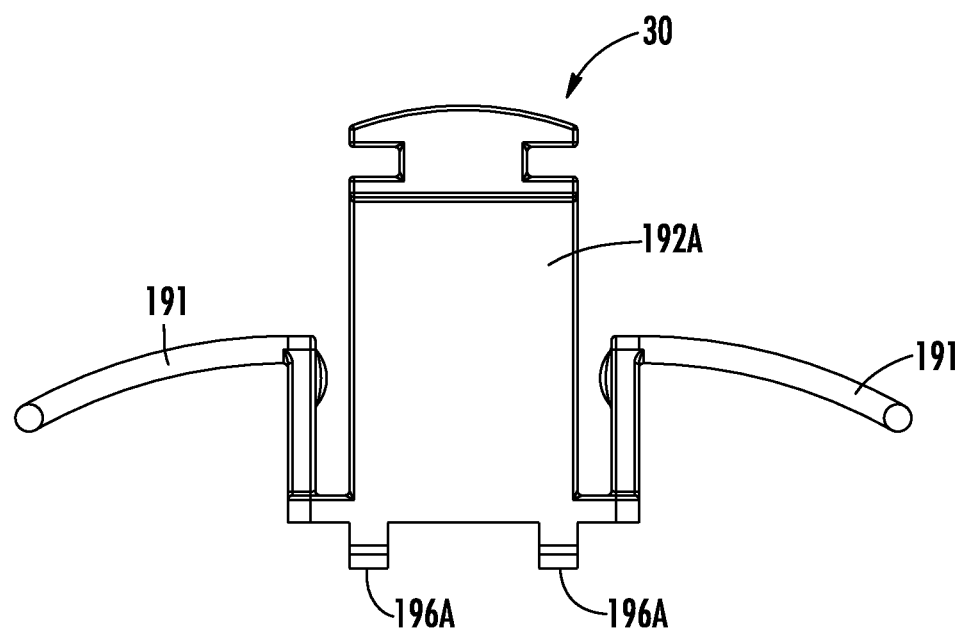
Figure 18C:
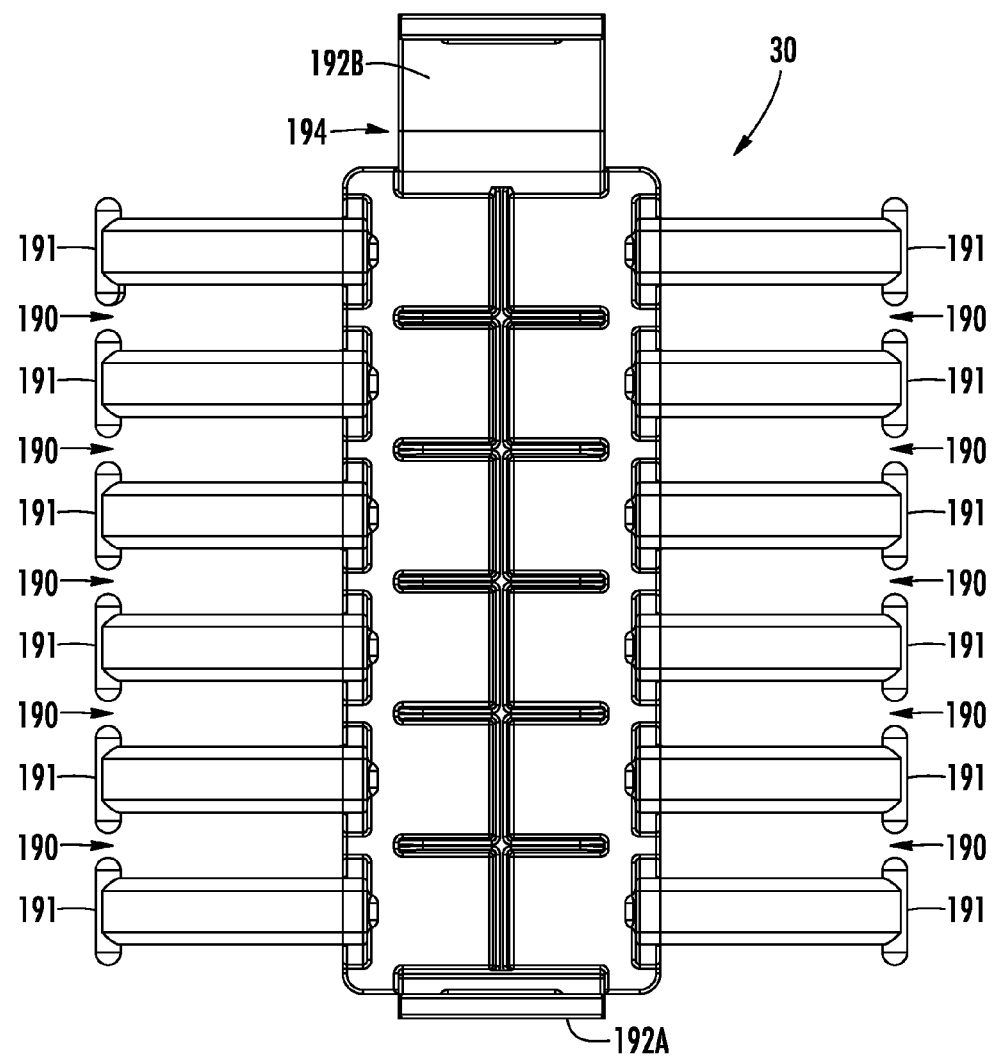
Figure 18D:
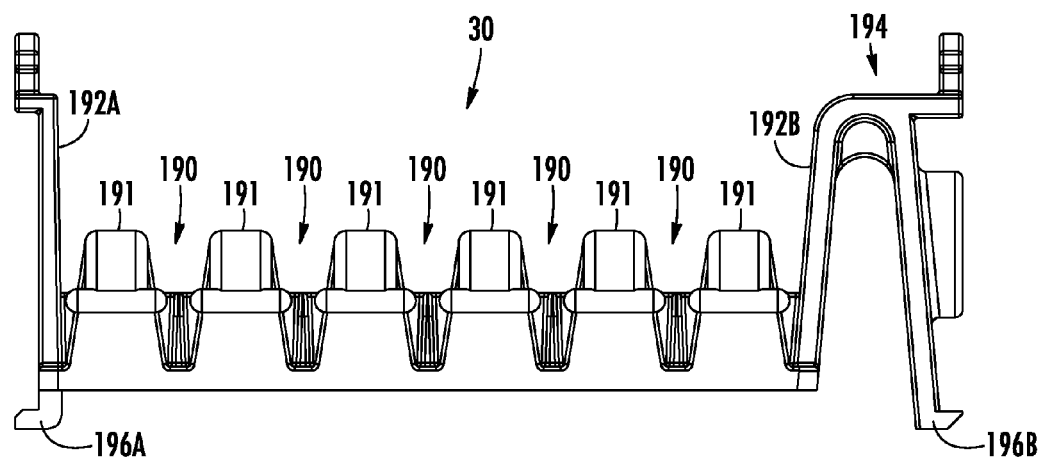
Figure 19A:
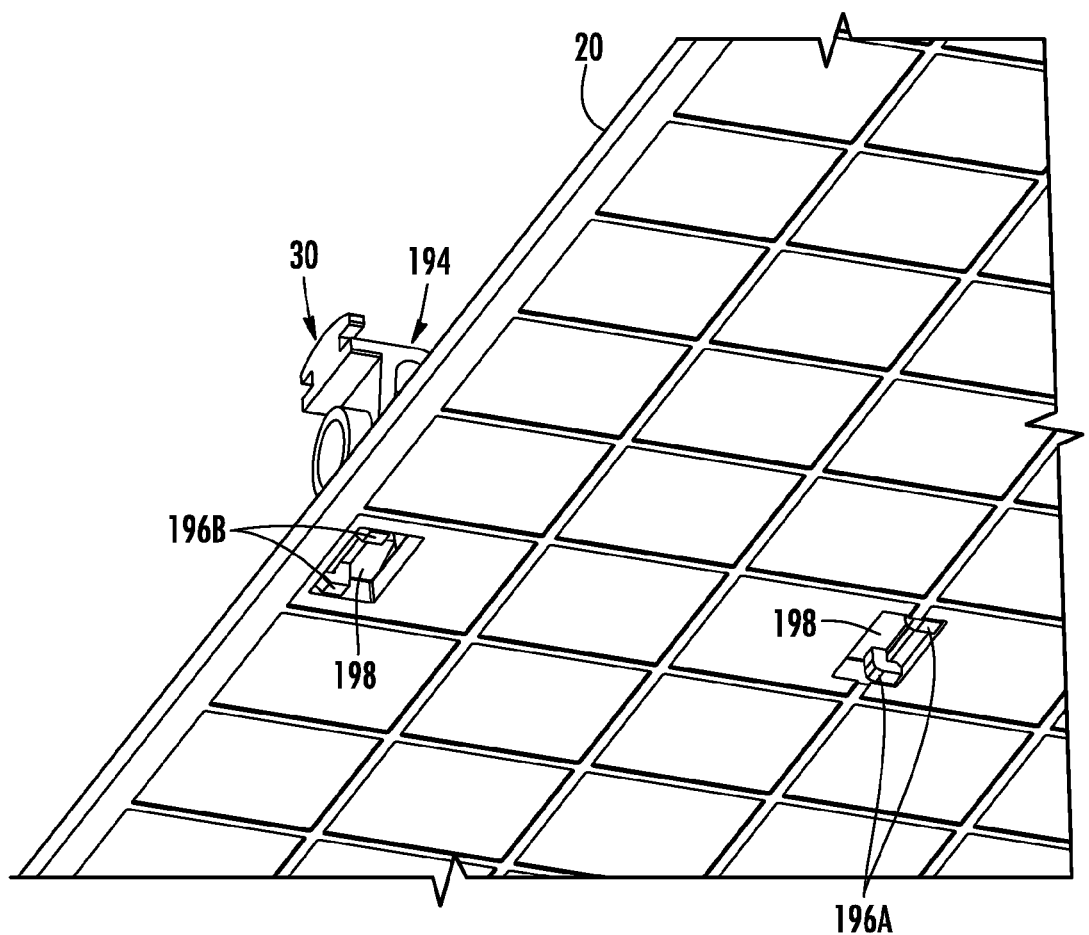
FIG. 19A is a bottom close-up view of the fiber body holder in FIGS. 18A-18D installed and secured to the stackable shelf in FIG. 4.
Figure 19B:
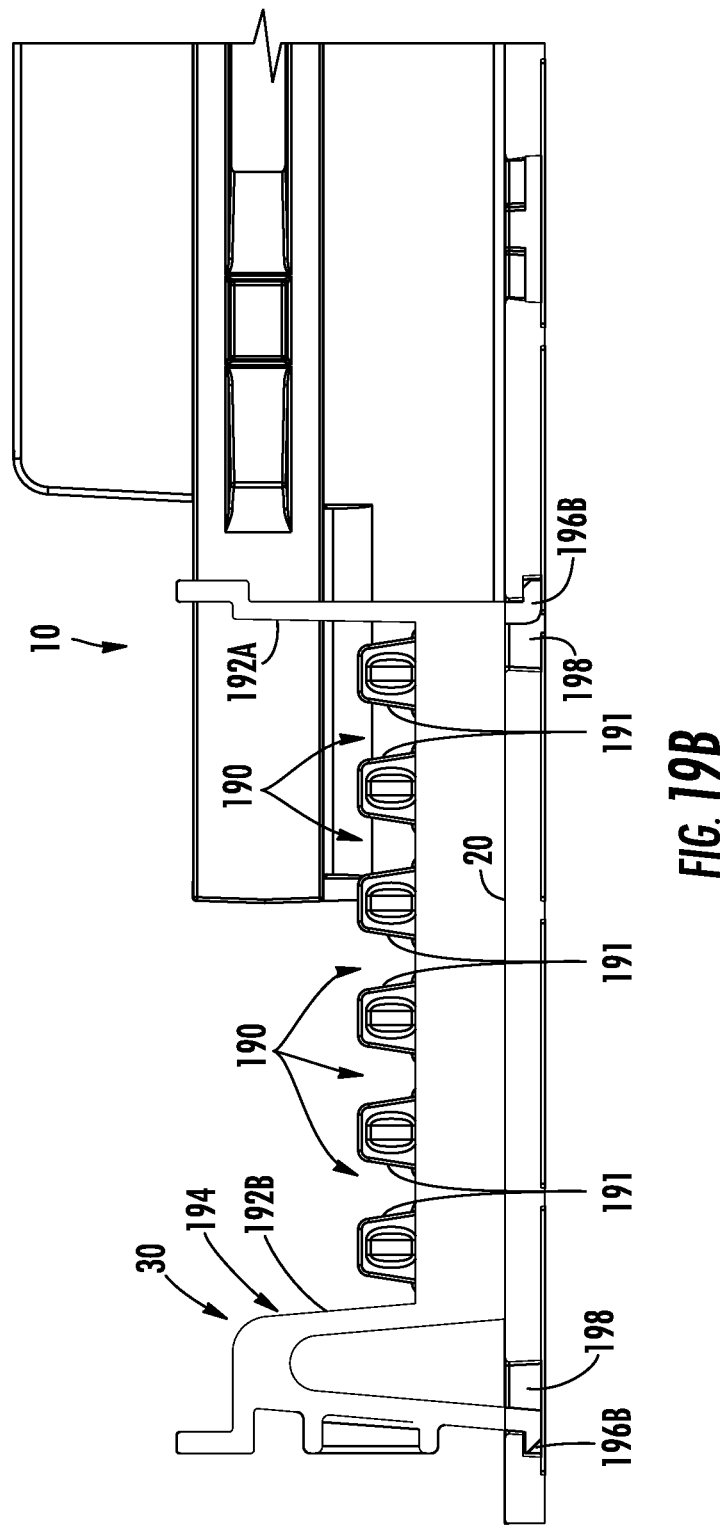
FIG. 19B is a side view of the fiber body holder in FIGS. 18A-18D installed and secured to the stackable shelf in FIG. 4.

As illustrated FIGS. 17A-17F, the rear stacker assembly 58 includes a support member 170. The support member 170 is comprised of a support body 172. The receivers 64, 67 in the form of openings in this embodiment and previously described with regard to FIGS. 5A-5D are disposed in the support body 172. The receivers 64, 67 are disposed in a top side 174 of the support body 172. As illustrated in FIGS. 17A-17C, the receivers 64 contain keyed portions 176. The receivers 64, 67 are configured to receive the latches 66, 70, respectively, previously described and illustrated in FIGS. 5A-5D, and illustrated in FIGS. 17A and 17D-17E. The latches 66, 70 in this embodiment are disposed in an attachment body 178 of an attachment member 180 configured to receive the support body 172 as illustrated in FIG. 17A, and as assembled in FIG. 17B. The latches 66 are inserted into the receivers 64 and slid about the receivers 64 into the keyed portions 176 to be secured to the support body 172. In this scenario, the latches 66 can be disposed in the receivers 64 in the top side 174 of the support body 172 to allow one rear stacker assembly 58 to be stacked on top of another rear stacker assembly 58 to allow the stackable shelf 10 to be configured to support fiber optic equipment at additional height spaces about a 1-U height space, as desired or needed. This configuration also allows the rear stacker assembly 58 to be secured to the mounting surface 20, as previously discussed with regard to FIG. 5C, wherein the latches 66 are disposed in the receivers 63 in the mounting surface 20 to support fiber optic equipment in the first 1-U height space from the mounting surface 20.

With reference to FIGS. 17A and 17B, the attachment body 178 is provided as a separate component configured to be secured to the support body 172. In this regard, latches 182A-182D are disposed in the attachment body 178, as illustrated in FIG. 17A. The latches 182A-182D contain protrusion members 184A-184D that are configured to be bent inward as the support body 172 is disposed over top the attachment body 178. The protrusion members 184A-184D are resilient such that they provide biasing, thus eventually causing the extension members 184A-184D to extend outward into openings 186A-186D to secure the support body 172 to the attachment body 178, as illustrated in FIG. 17B.

As previously discussed with regard to FIGS. 6A-6D, and as illustrated in FIGS. 12A-12F, rails 56 disposed on each side 188A, 188B in the rear stacker assembly 58 are configured to receive the rail guides 82A, 82B disposed in the housing 76 the fiber optic module 74 to support the fiber optic module 74 between two (2) adjacent rear stacker assemblies 58. In this embodiment of the rear stacker assembly 58, the rails 56 are comprised of two sub-rails 56A, 56B, whose combined width is configured to be received inside the rail guides 82A, 82B of the fiber optic module 74. A solid rail could alternatively be employed as the rail 56. Employing the sub-rails 56A, 56B reduces material and weight of the rear stacker assemblies 58.

Figure 20:
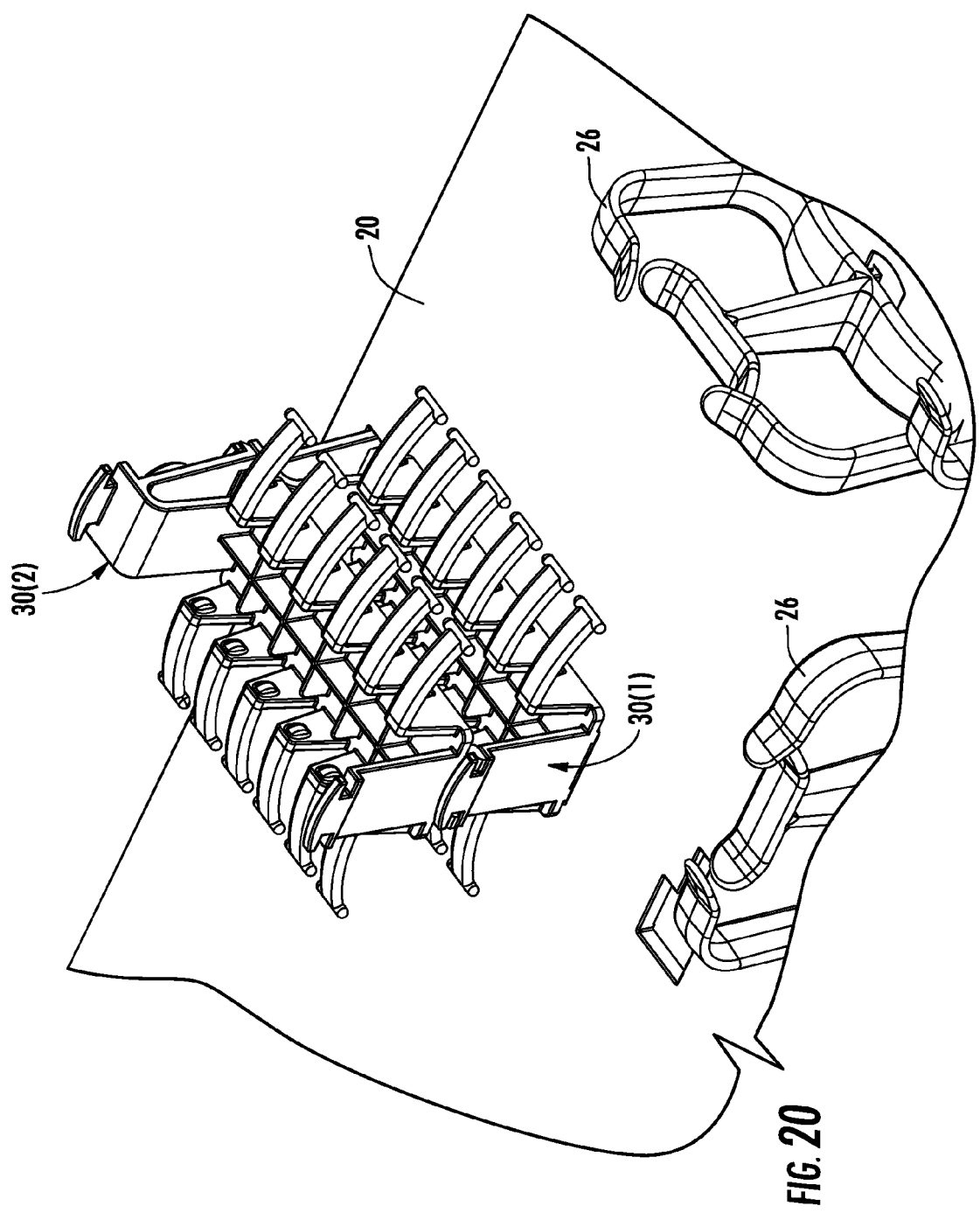
FIG. 20 is a perspective view of a second fiber body holder stacked on top of a first body holder in FIGS. 18A-18D installed and secured to the stackable shelf in FIG. 4.

FIGS. 18A-18D are perspective, front, top, and side views, respectively, of the fiber body holder 30 disposed in the stackable shelf 10 in FIG. 1A-2D. As previously discussed and illustrated in FIG. 2D, the fiber body holder 30 is configured to hold and support the fiber furcation bodies 32 disposed in the stackable shelf 10. The fiber body holder 30 contains a plurality of channels 190 disposed between extension members 191. Each of the plurality of channels 190 is configured to support a fiber body holder 30 disposed therein. End sections 192A, 192B provide for the ability of a technician to grip the fiber body holder 30 and to squeeze a latch 194 so that protrusion members 196A, 196B can be inserted into receivers 198 (FIG. 19A) disposed in the mounting surface 20 to secure the fiber body holder 30 to the mounting surface 20. This is illustrated in the perspective bottom view of the mounting surface 20 in FIG. 19A and the side view of the mounting surface 20 in FIG. 19C to secure the fiber body holder 30 to the mounting surface 20. If additional capacity is needed or desired to support additional fiber bodies 32, an additional fiber body holder 30(2) can be provided and stacked on top of the fiber body holder 30(1) secured to the mounting surface 20 of the stackable shelf 10, as illustrated in FIG. 20.

Figure 21:
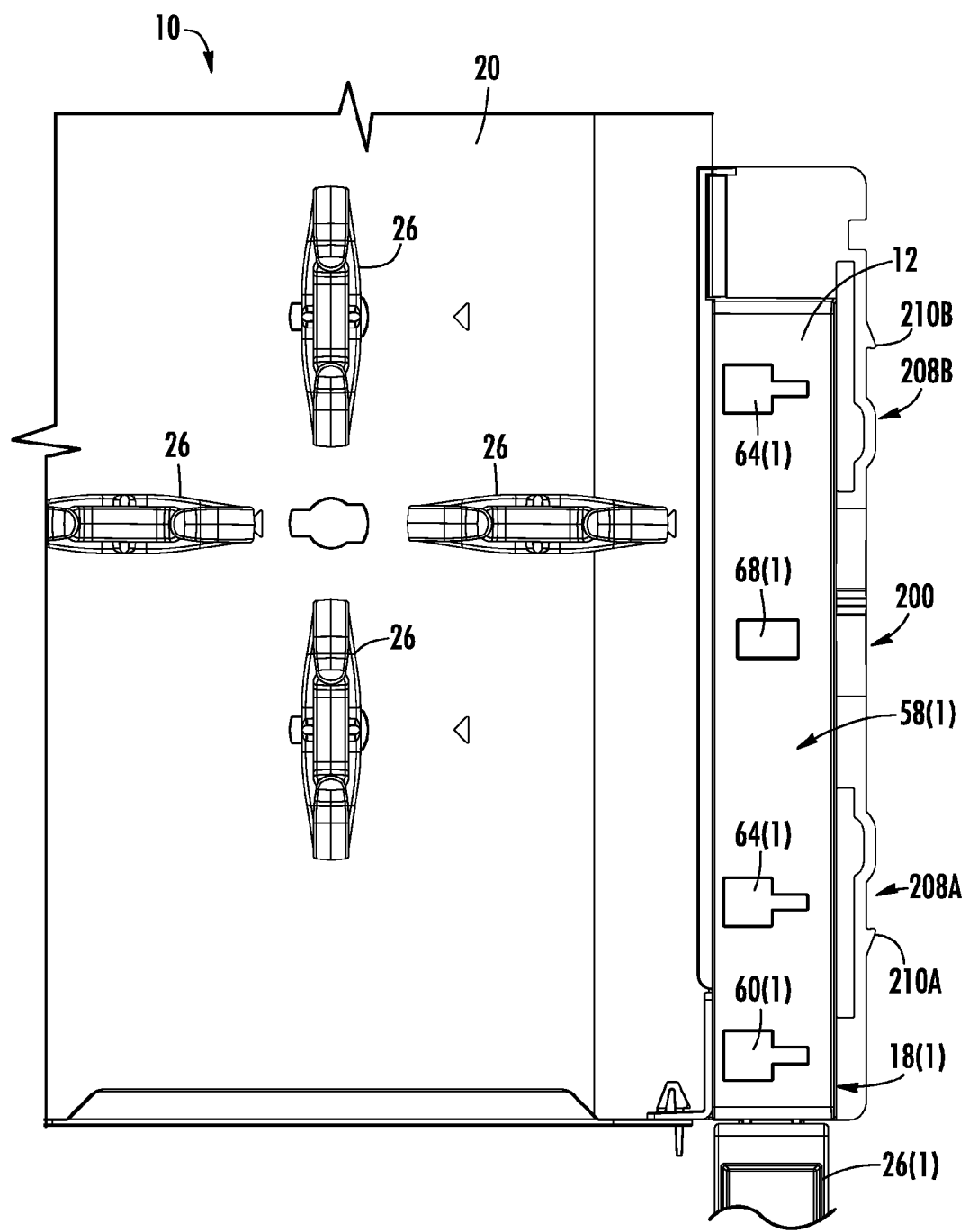
FIG. 21 is a top close-up view of the right side of the stackable shelf illustrating an exemplary rail system configured to allow the stackable shelf to be secured in a fiber optic housing.
Figure 22:
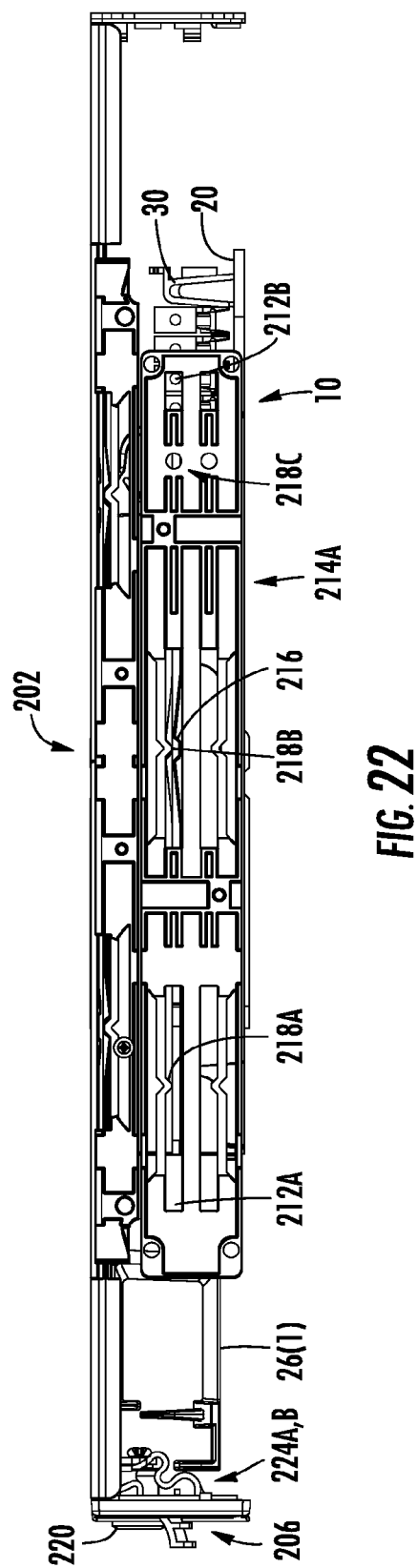
FIG. 22 is a side view of the right side, transparent view of the stackable shelf of FIGS. 1A-2D installed in an exemplary fiber optic housing.
Figure 23:
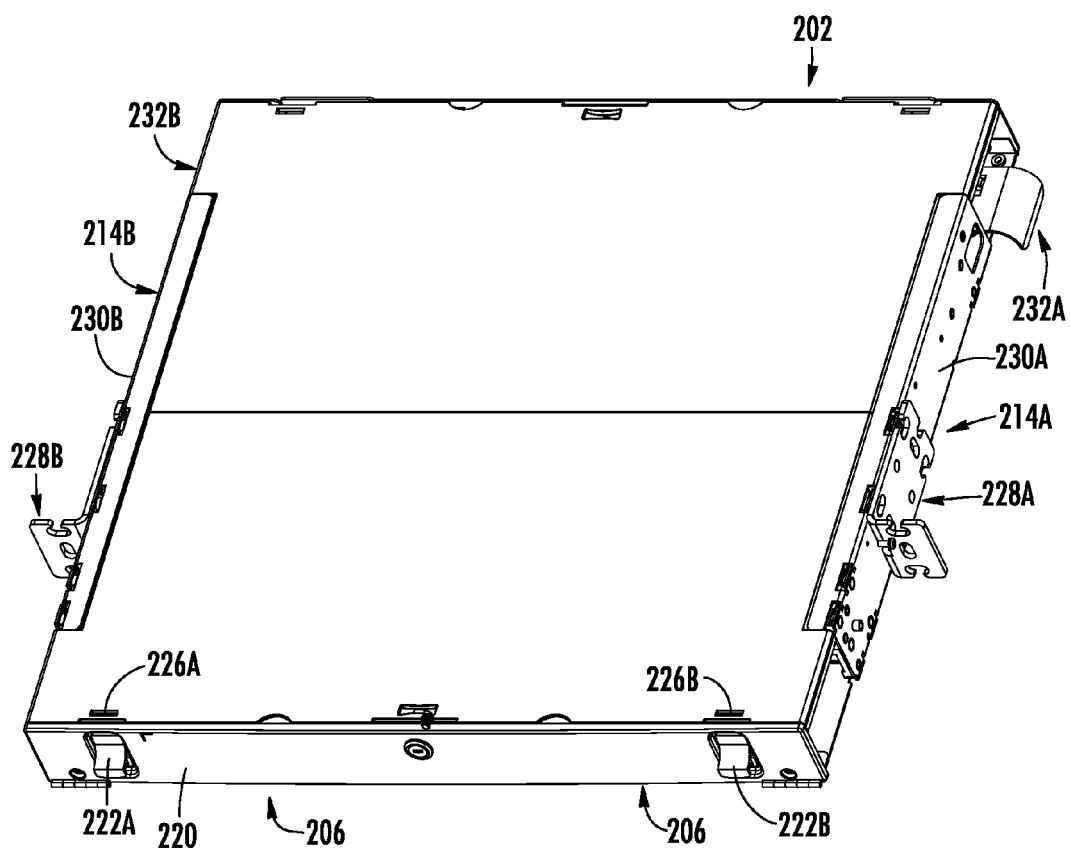
FIG. 23 is a perspective view of the fiber optic housing that includes the stackable shelf in FIG. 22 with mounting brackets installed in a rear position of the fiber optic housing.
Figure 24:
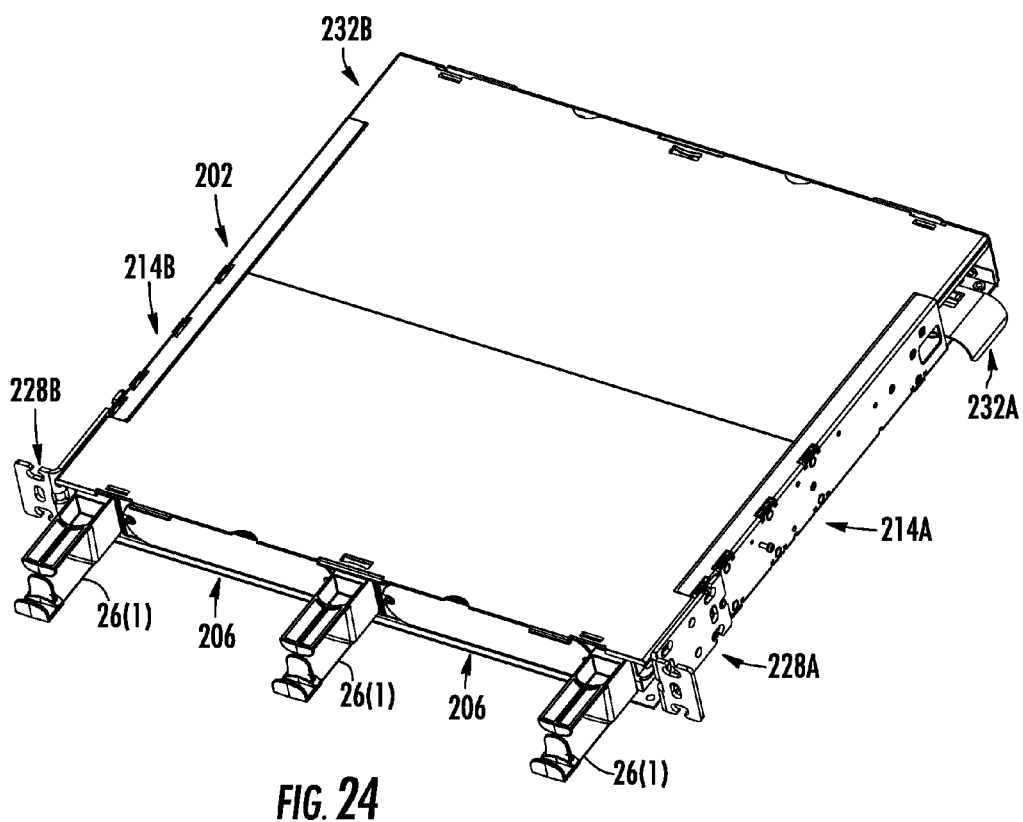
FIG. 24 is a perspective view of the fiber optic housing that includes the stackable shelf in FIG. 22 with mounting brackets installed in a front position on the fiber optic housing.

Once the stackable shelf 10 is configured with the desired fiber optic equipment, the stackable shelf 10 is configured to be inserted into a fiber optic housing. The fiber optic housing containing the stackable shelf 10 can then be mounted in an equipment rack. In this regard, FIG. 21 is a top close-up view of the right side of the stackable shelf 10 illustrating an exemplary rail system 200 configured to allow the stackable shelf 10 to be moveable about and secured within a 1-U fiber optic housing 202, as illustrated in FIGS. 22-24. A rail system like that of the exemplary rail system 200 is also disclosed in U.S. patent application Ser. No. 12/576,806 entitled "Fiber Optic Equipment Guides and Rails Configured With Stopping Position(s), and Related Equipment and Methods," the disclosure of which is relied upon and incorporated herein by reference in its entirety.

FIG. 22 is a side view of the right side, transparent view of the stackable shelf 10 of FIGS. 1A-2D installed inside the fiber optic housing 202. FIG. 23 is a perspective view of the fiber optic housing 202 that includes the stackable shelf 10 in FIG. 22 with mounting brackets 228A, 228B installed in a rear position of the fiber optic housing 202 wherein the front fiber routing guides 22(1) do not extend beyond a front 206 of the fiber optic housing 202. FIG. 24 is a perspective view of the fiber optic housing 202 that includes the stackable shelf 10 in FIG. 22 with mounting brackets 204A, 204B installed in a front position on the fiber optic housing 202, wherein the front fiber routing guides 22(1) extend beyond the front 206 of the fiber optic housing 202.

As illustrated in FIG. 21, the rail system 200 contains two leaf springs 208A, 208B. The leaf springs 208A, 208B contain protrusions 210A, 210B that are configured to engage with stops 212A, 212B inside sides 214A, 214B of the fiber optic housing 202, as illustrated in FIGS. 21 and 22. The stops 212A, 212B prevent the stackable shelf 10 from being removed from the fiber optic housing 202 unless enough force is applied to the stackable shelf 10 to bend the leaf springs 208A, 208B to allow the protrusions 210A, 210B to clear the stops 212A, 212B. As illustrated in FIG. 22, a detent 216 disposed in the rail system 200 of the stackable shelf 10 is configured to receive protrusions 218A-218C. The protrusions 218A-218C provide stopping positions for the stackable shelf 10 to be moved in and out of the fiber optic housing 202 for access and storage without having to fully remove the stackable shelf 10 from the fiber optic housing 202.

As illustrated in FIGS. 22 and 23, the fiber optic housing 202 may be configured with a door 220 that can be closed to secure the stackable shelf 10 inside the fiber optic housing 202. Release latches 222A, 222B are provided in the door 220 to allow the door 220 to be opened when the release latches 222A, 222B are engaged downward to release locks 224A, 224B from openings 226A, 226B. Mounting brackets 228A, 228B are installed on the sides 214A, 214B of the fiber optic housing 202, respectively, to allow the fiber optic housing 202 to be mounted in an equipment rack. The fiber optic housing 202 contains mounting receivers 230A, 230B that allow the mounting brackets 228A, 228B to be positioned behind the front 206 of the fiber optic housing 202, as illustrated in FIG. 23, or at the front 206 of the fiber optic housing 202, as illustrated in FIG. 24. Strain relief brackets 232A, 232B are provided to relieve strain from optic fibers routed to the fiber optic housing 202.

Figure 25:
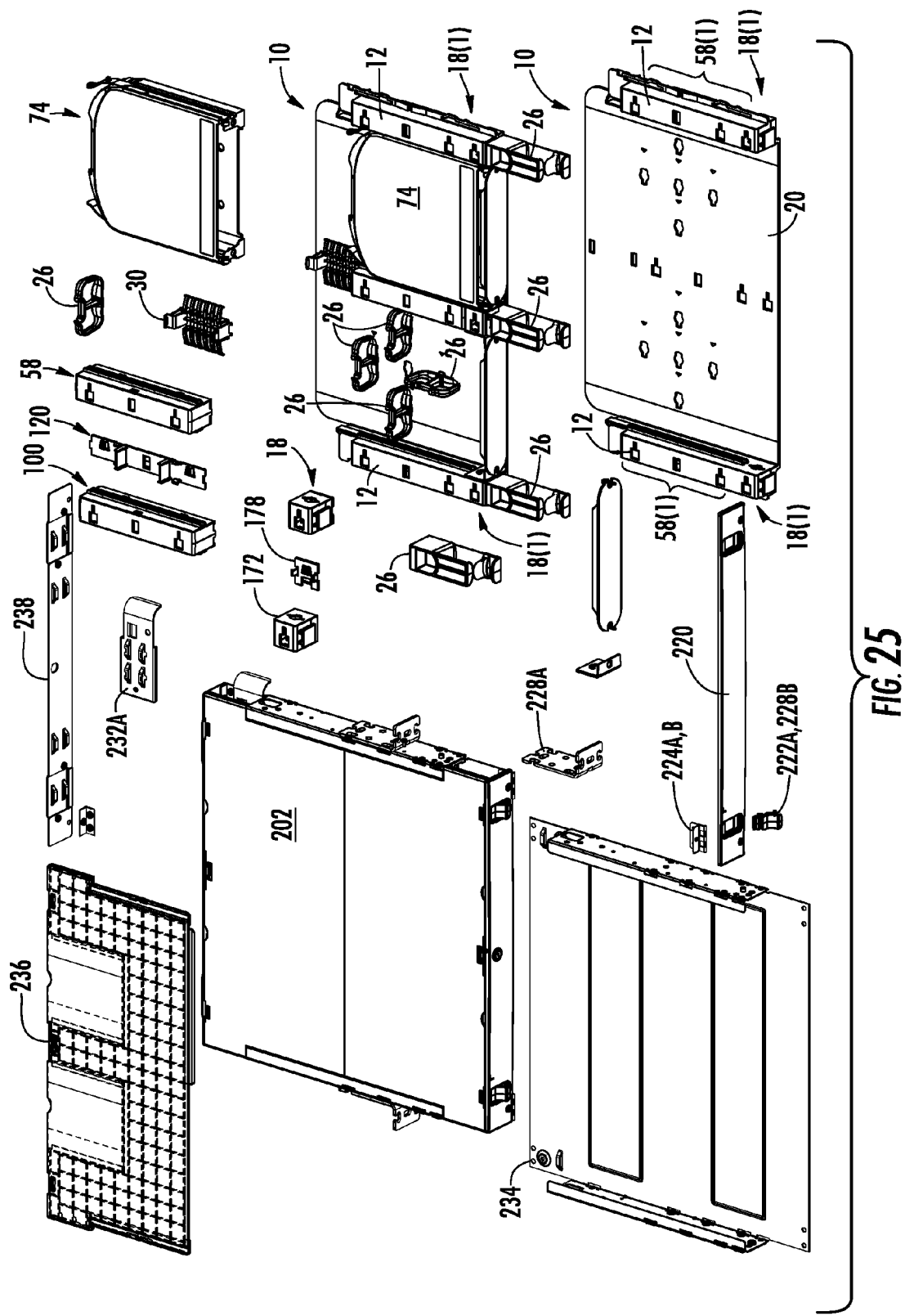
FIG. 25 includes perspective views of exemplary components used to provide a stackable shelf supporting fiber optic equipment in a fiber optic housing according to certain embodiments disclosed herein.

FIG. 25 includes perspective views of exemplary components used to provide a stackable shelf 10 supporting fiber optic equipment in the fiber optic housing 202. Previous elements already described are shown with common element numbers and are not re-described. The fiber optic housing 202 in this embodiment is comprised of a base 234, a cover 236 attached to the base 234, a rear section 238, and the door 220.

Figure 26:
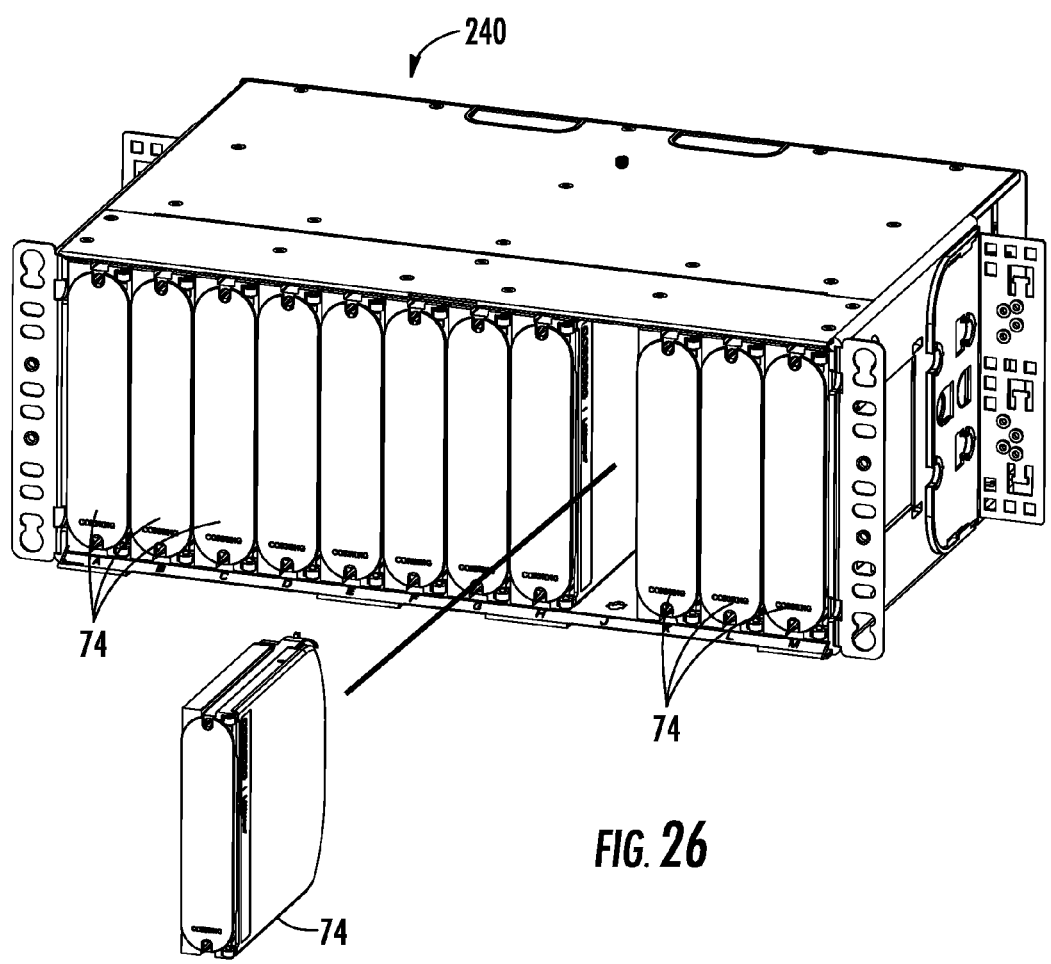
FIG. 26 is a perspective view of an alternative fiber optic housing configured to support fiber optic modules and fiber optic panels in a vertical orientation.
Figure 27A:
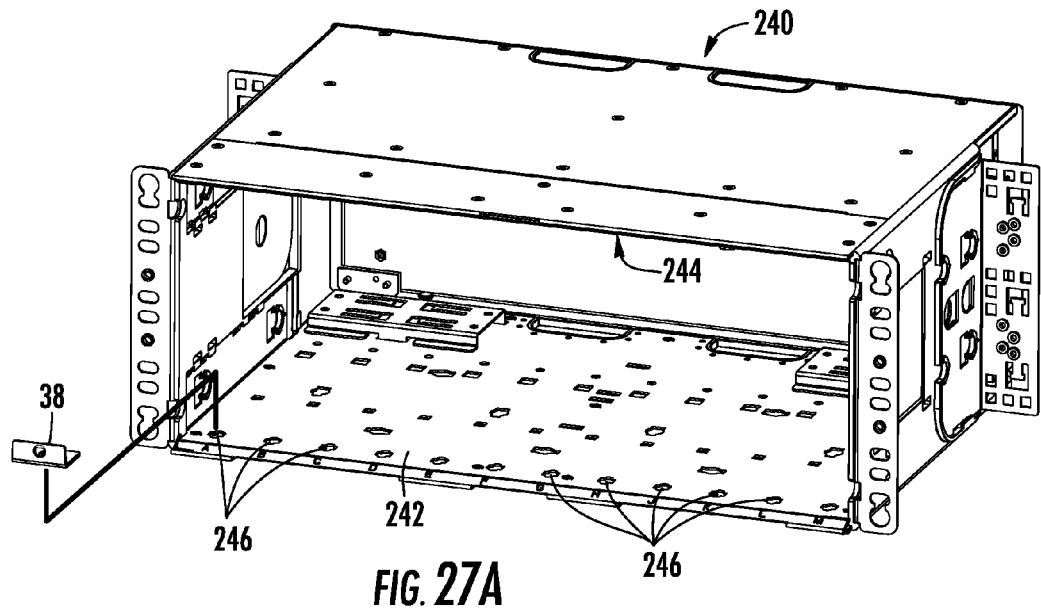
FIGS. 27A-27C are perspective, perspective close-up, and perspective close-up cut section views, respectively, of a removable panel clip installed in the fiber optic housing of FIG. 26 to enable the fiber optic housing to support fiber optic panels and fiber optic modules interchangeably.
Figure 27B:
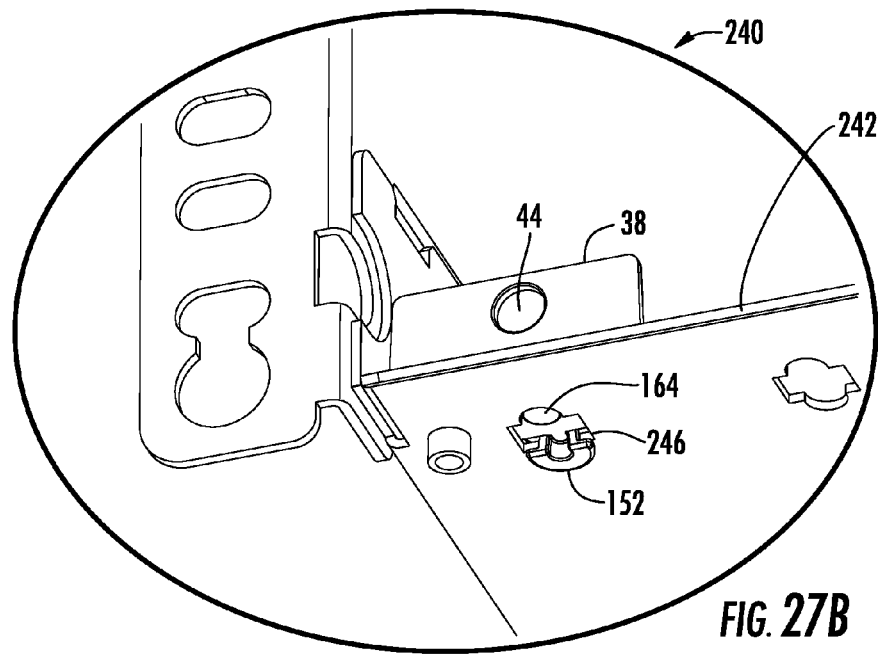
Figure 27C:
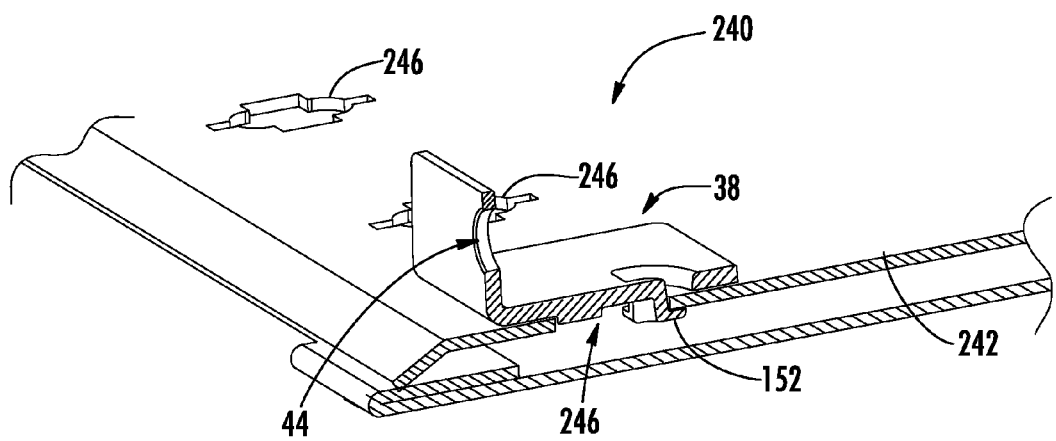

FIG. 26 is a perspective view of an alternative fiber optic housing 240 configured to support the fiber optic modules 74 and fiber optic panels 16 interchangeably by employing the removable panel clip 38. However, the fiber optic housing 240 is configured to support fiber optic equipment in a vertical orientation as opposed to a horizontal orientation as provided in the fiber optic housing 202 in FIGS. 22-24. FIG. 26 illustrates the fiber optic housing 240 supporting the fiber optic modules 74. If it is desired to provide fiber optic panels 16 in the fiber optic housing 240, the removable panel clips 38 can be installed in a base 242 and a top 244 of the fiber optic housing 240, as illustrated in FIGS. 27A-27C. FIGS. 27A-27C are perspective, perspective close-up, and perspective close-up cut section views, respectively, of the removable panel clip 38 installed in the fiber optic housing 240 to enable the fiber optic housing 240 to support fiber optic panels 16 and fiber optic modules 74 interchangeably. The base 242 contains receivers 246 in the form of openings that contain the same form as the receivers 104A, 104B in the front stacker assembly 18 in FIGS. 12A-12F to receive and secure the flange 152 of the removable panel clip 38. The removable panel clip 38 is secured to the receiver 246 in the base 242 in the same manner as the removable panel clip 38 is secured to the receiver 104A, 104B of the front stacker assembly 18 as previously described and illustrated in FIGS. 15A-16E, and thus is not be re-described herein.

Figure 28A:
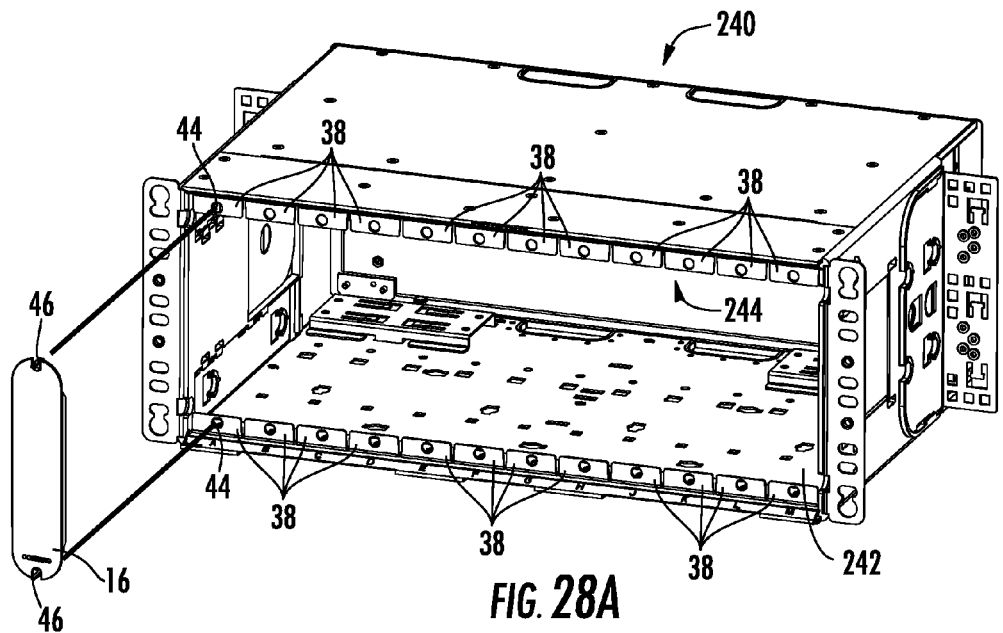
FIG. 28A is a perspective view of the fiber optic housing in FIG. 27A with the removable panel clips in FIGS. 27A-27C installed to support fiber optic panels.
Figure 28B:
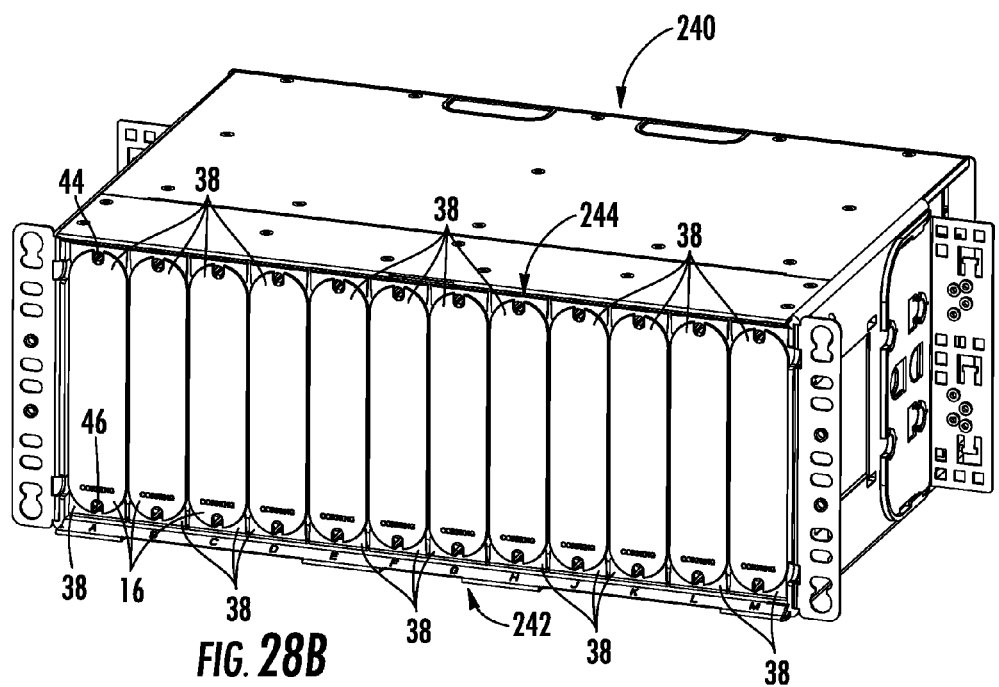
FIG. 28B is a perspective view of the fiber optic housing in FIG. 27A with the removable panel clips in FIGS. 27A-27C installed and supporting fiber optic panels in the fiber optic housing.

FIG. 28A is a perspective view of the fiber optic housing in FIG. 27A with the removable panel clips 38 installed in the base 242 and the top 244 to be able support fiber optic panels 16. FIG. 28B is a perspective view of the fiber optic housing 240 in FIG. 27A with the removable panel clips 30 installed and the inserts 46 of the fiber optic panels 16 inserted into the receivers 44 of the removable panel clips 38 to support the fiber optic panels 16 in the fiber optic housing 240.

Figure 29:
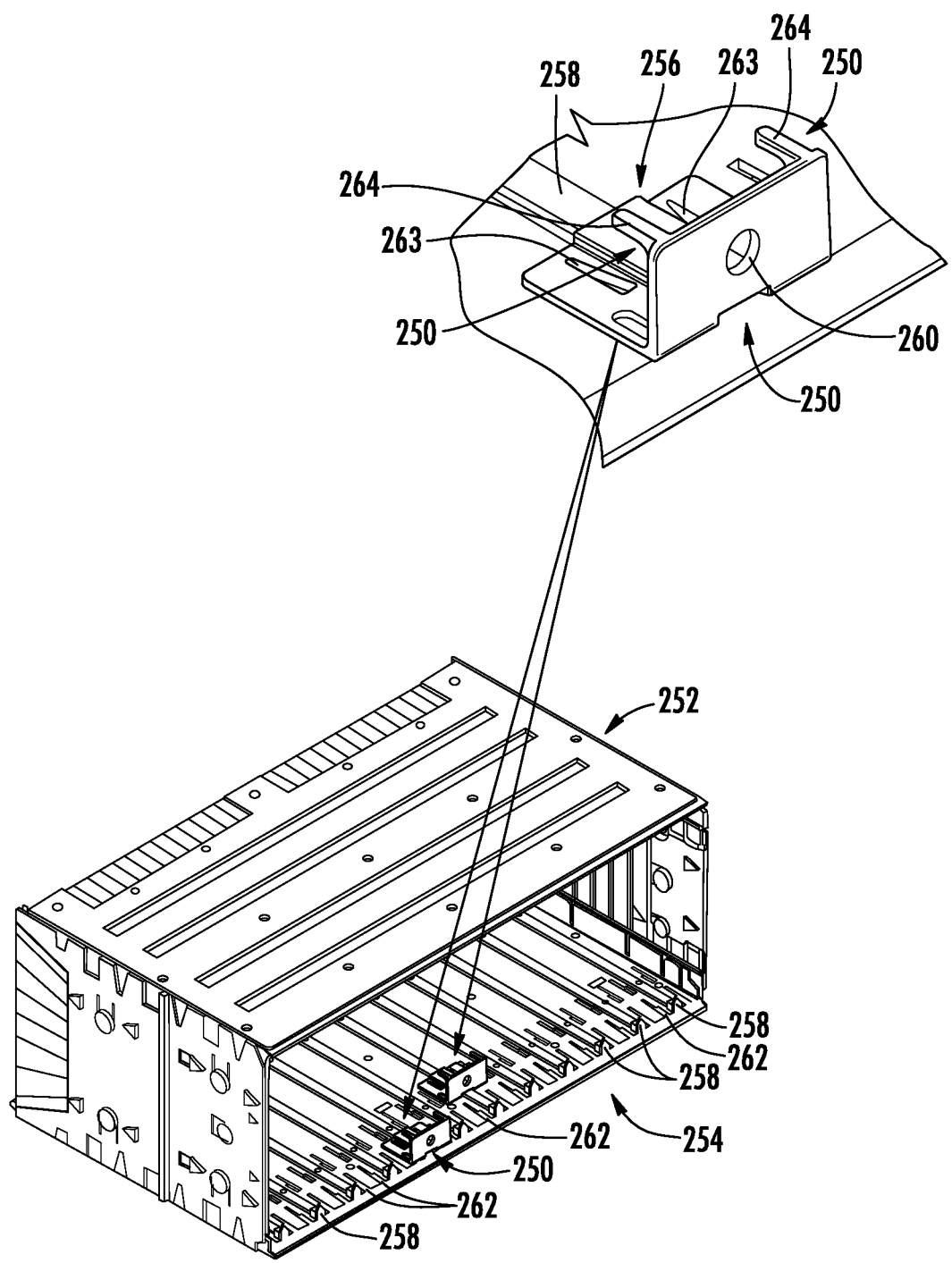
FIG. 29 is a perspective view of an alternative exemplary removable panel clip installed in an alternative fiber optic housing to enable the fiber optic housing to interchangeably support fiber optic panels and fiber optic modules.
Figure 30A:
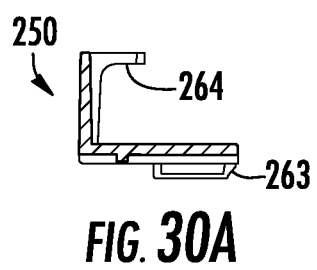
FIGS. 30A-30D are bottom, side, front, and back views, respectively, of the removable panel clip in FIG. 29.
Figure 30B:
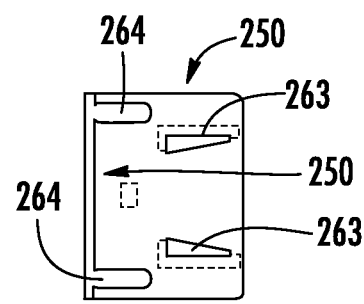
Figure 30C:
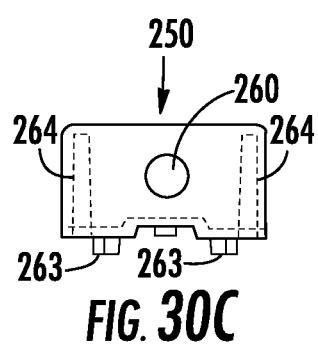
Figure 30D:
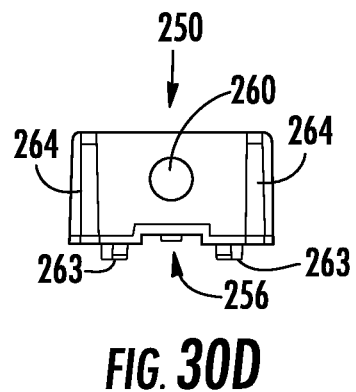

FIG. 29 is a perspective view of another alternative exemplary removable panel clip 250 installed in another alternative fiber optic housing 252 to enable the fiber optic housing 252 to interchangeably support fiber optic panels and fiber optic modules. FIGS. 30A-30D illustrate bottom, side, front, and back side views, respectively, of the removable panel clip 250 in FIG. 29. The removable panel clips 250 are configured to be attached to a rail system 254 disposed in the fiber optic housing 252 to attach the removable panel clips 250 to the fiber optic housing 252 to support fiber optic panels. The rail system 254 is configured to support fiber optic modules in the fiber optic housing 252 when the removable panel clip 250 is not attached to the rail system 254. In this regard, the removable panel clips 250 each comprise an opening 256 configured to receive a rail 258 disposed in the fiber optic housing 252 to attach the removable panel clips 250 to the fiber optic housing 252. Like the removable panel clip 38, the removable panel clip 250 contains a receptacle 260 disposed therein that is configured to receive an insert from a fiber optic panel to secure the fiber optic panel to the removable panel clip 250 and thus the fiber optic housing 252. Protrusions 263 are disposed in the removable panel clip 252, as illustrated in FIG. 29, that are configured to engage with receivers 262 to further secure the removable panel clips 250 to the fiber optic housing 252. A support member 264 is disposed or provided as part of the removable panel clip 250 to provide structural support, as illustrated in FIGS. 30A and 30B.

Figures 1, 31A:
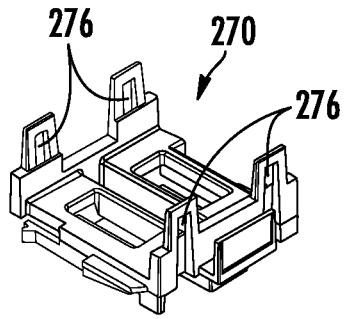
FIGS. 31A-1 and 31A-2 are top perspective views of front stacker assembly components that are configured to be assembled together to form an alternative assembled front stacker assembly that can be installed in a stackable shelf to support fiber optic equipment.
Figures 1, 31B:
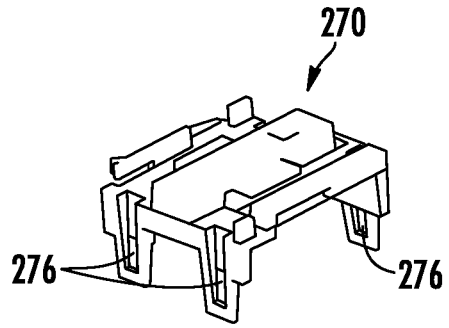
Figures 1, 31C:
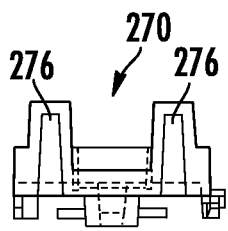
Figures 1, 31D:
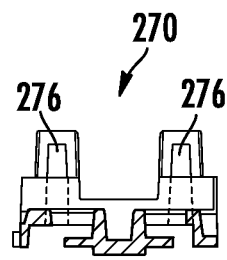
Figures 1, 31E:
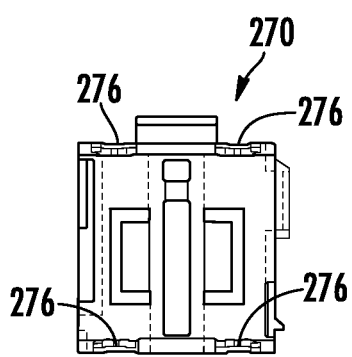
Figures 1, 31F:
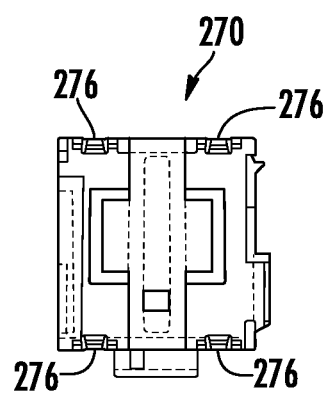
Figures 2, 31A:
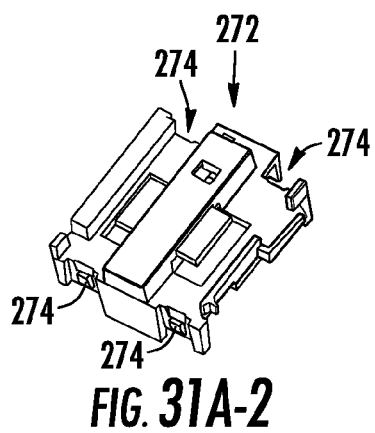
Figures 2, 31B:
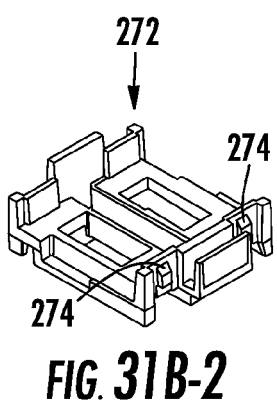
Figures 2, 31C:
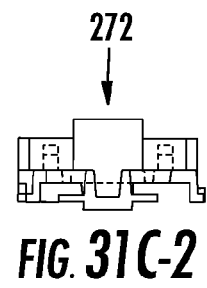
Figures 2, 31D:
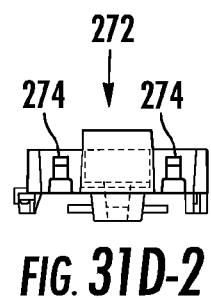
Figures 2, 31E:
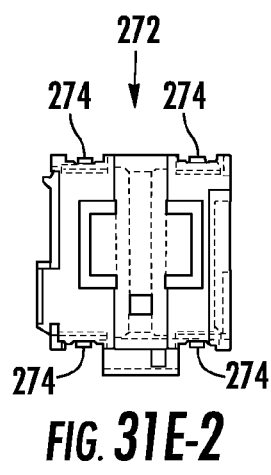
Figures 2, 31F:
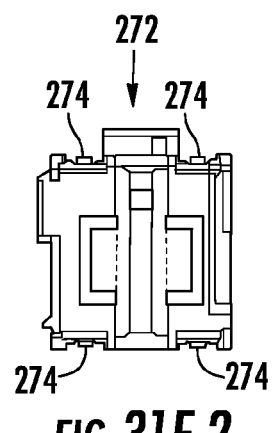

FIGS. 31A-1 and 31A-2 are top perspective views of first and second front stacker assembly components 270, 272, respectively, that are configured to be assembled together to form an alternative assembled front stacker assembly that can be installed in a stackable shelf, including but not limited to the stackable shelf 10, to support fiber optic equipment, including but not limited to fiber optic panels and fiber optic modules. In this regard, the first front stacker assembly component 270 is configured to fit and be secured to the second front stacker assembly component 272 to provide an assembled front stacker assembly. The second front stacker assembly component 272 contains protrusions 274 that are configured to fit inside and be secured to openings 276 in the first front stacker component 270. The assembled front stacker assembly can be secured to a mounting surface of a stackable shelf and fiber optic equipment secured thereto to support fiber optic equipment on a mounting surface.

FIGS. 31B-1 and 31B-2 are bottom perspective views of the front stacker assembly components 270, 272 in FIGS. 31A-1 and 31A-2, respectively, that are configured to be assembled together to form an alternative assembled front stacker assembly that can be installed in a stackable shelf to support fiber optic equipment. FIGS. 31C-1 and 31C-2 are first side views of the front stacker assembly components 270, 272 in FIGS. 31A-1 and 31A-2, respectively, that are configured to be assembled together to form an alternative assembled front stacker assembly that can be installed in a stackable shelf to support fiber optic equipment. FIGS. 31D-1 and 31D-2 are second side views of the front stacker assembly components 270, 272 in FIGS. 31A-1 and 31A-2, respectively, that are configured to be assembled together to form an alternative assembled front stacker assembly that can be installed in a stackable shelf to support fiber optic equipment. FIGS. 31E-1 and 31E-2 are bottom views of the front stacker assembly components 270, 272 in FIGS. 31A-1 and 31A-2, respectively, that are configured to be assembled together to form an alternative assembled front stacker assembly that can be installed in a stackable shelf to support fiber optic equipment. FIGS. 31F-1 and 31F-2 are top views of the front stacker assembly components 270, 272 in FIGS. 31A-1 and 31A-2, respectively, that are configured to be assembled together to form an alternative assembled front stacker assembly that can be installed in a stackable shelf to support fiber optic equipment.

Figures 1, 32A:
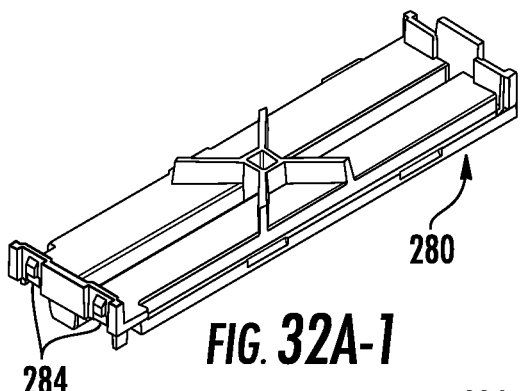

FIGS. 32A-1 and 32A-2 are top perspective views of first and second rear stacker assembly components 280, 282, respectively, that are configured to be assembled together to form an alternative assembled rear stacker assembly that can be installed in a stackable shelf, including but not limited to the stackable shelf 10, to support fiber optic equipment, including but not limited to fiber optic panels, fiber optic modules, and fiber optic cassettes. In this regard, the first rear stacker assembly component 280 is configured to fit and be secured to the second rear stacker assembly component 282 to provide an assembled rear stacker assembly. The first rear stacker component 280 contains protrusions 284 that are configured to fit inside and be secured to openings 286 in the second rear stacker component 282. The assembled rear stacker assembly can be secured to a mounting surface of a stackable shelf and fiber optic equipment secured thereto to support fiber optic equipment on a mounting surface.

Figures 1, 32B:
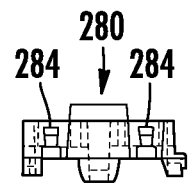
Figures 1, 32C:
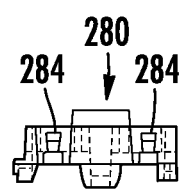
Figures 1, 32D:
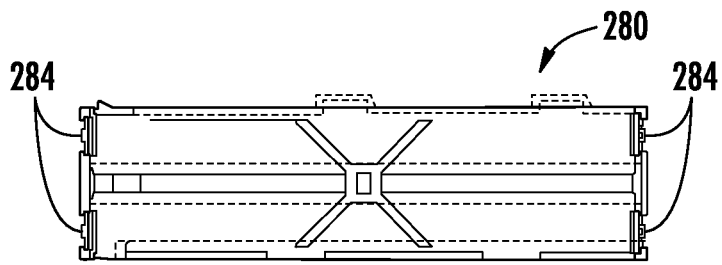
Figures 1, 32E:
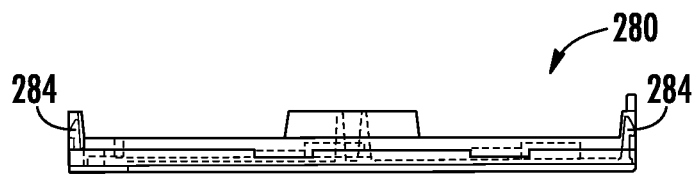
Figures 1, 32F:
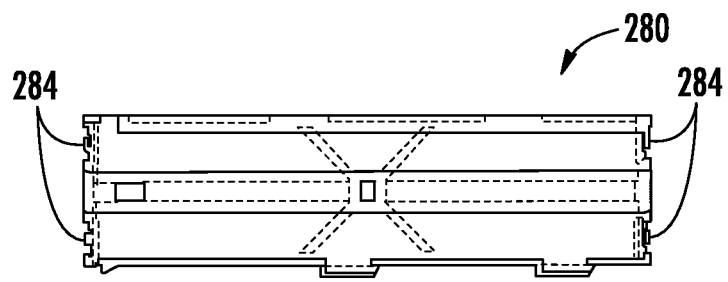
Figures 2, 32A:
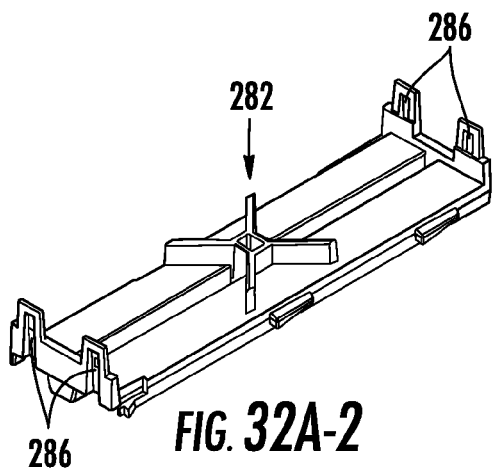
Figures 2, 32B:
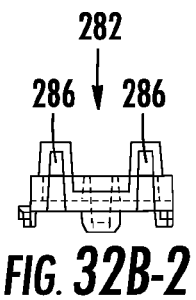
Figures 2, 32C:
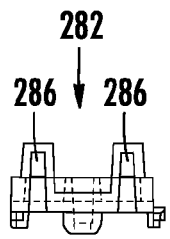
Figures 2, 32D:
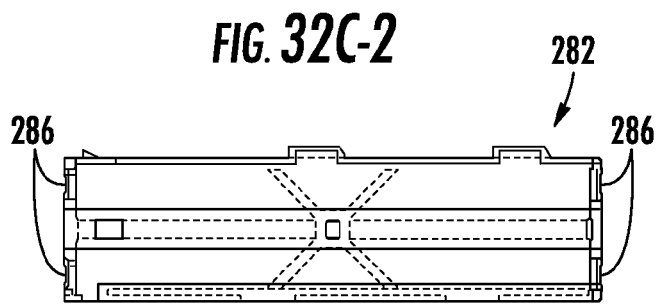
Figures 2, 32E:
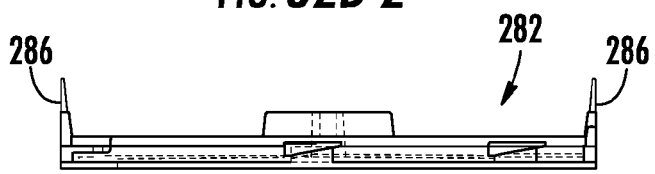
Figures 2, 32F:
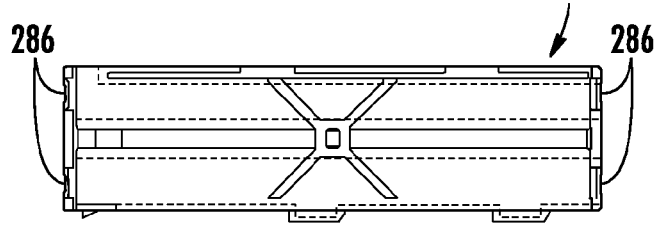

FIGS. 32B-1 and 32B-2 are first side views of the rear stacker assembly components 280, 282 in FIGS. 32A-1 and 32A-2, respectively, that are configured to be assembled together to form an alternative assembled rear stacker assembly that can be installed in a stackable shelf to support fiber optic equipment. FIGS. 32C-1 and 32C-2 are second side views of the rear stacker assembly components 280, 282 in FIGS. 32A-1 and 32A-2, respectively, that are configured to be assembled together to form an alternative assembled rear stacker assembly that can be installed in a stackable shelf to support fiber optic equipment. FIGS. 32D-1 and 32D-2 are top views of the stacker assembly components 280, 282 in FIGS. 32A-1 and 32A-2, respectively, that are configured to be assembled together to form an alternative assembled rear stacker assembly that can be installed in a stackable shelf to support fiber optic equipment. FIGS. 32E-1 and 32E-2 are third side views of the rear stacker assembly components 280, 282 in FIGS. 32A-1 and 32A-2, respectively, that are configured to be assembled together to form an alternative assembled rear stacker assembly that can be installed in a stackable shelf to support fiber optic equipment. FIGS. 32F-1 and 32F-2 are bottom views of the rear stacker assembly components 280, 282 in FIGS. 32A-1 and 32A-2, respectively, that are configured to be assembled together to form an alternative assembled rear stacker assembly that can be installed in a stackable shelf to support fiber optic equipment.

Many modifications and other embodiments of the invention set forth herein will come to mind to one skilled in the art to which the invention pertains having the benefit of the teachings presented in the foregoing descriptions and the associated drawings. As discussed herein, a stacker assembly is any component, member, or assembly that is configurable to support fiber optic equipment at a different desired height or heights (e.g., U spaces) from a surface, including but not limited to the mounting surface 20 provided for the stackable shelves 10, 10' disclosed and discussed herein. As non-limiting examples set forth below, the stackable shelves disclosed herein can includes features which allow components to stack on it. These features could be holes, slots, or other geometries which allow other components to attach to the stackable shelf by snapping or sliding into place. Front stacker assemblies can serve several purposes. One is to provide the front stacker assemblies as one of the potential building blocks that allow for conversion among rack spacings. The stacker assemblies can also contain features to retain fiber optic panels, fiber optic modules, cassettes, or other pieces of equipment. Connectors, splices, splitters, and other components may be held in place by the front stacker assemblies and/or the rear stacker assemblies.

The rear stacker assembly can assist in extending the support structure in the depth of the housing dimension. For instance, if the piece of equipment to be installed in the housing takes up a significant amount of the depth of the housing, it may require support throughout its length. By breaking up the stacking components into a front stacker assembly and a rear stacker assembly, the flexibility to accommodate more potential installation situations and configurations can be increased without dramatically increasing the complexity of the housing. The front routing guide can be provided to attach to both the stackable shelf and the front stacker assembly.

The removable panel clip, front stacker assembly, and rear stacker assembly may be removably attached to the stackable shelves to allow the stackable shelves to accommodate both fiber optic modules, cassettes and fiber optic panels, either together or separately, and whether or not the fiber optic modules, cassettes or fiber optic panels employ plungers or a track-type system as their method of retention in and to the stackable shelf. In this regard, the fiber optic housings in which the stackable shelf movably mounts can be compatible for either or both fiber optic modules, cassettes and/or fiber optic panels. Further, the fiber optic modules, cassettes and fiber optic panels may be interchangeable on the stackable shelf and, therefore, within the fiber optic housing. The stackable shelves, the removable panel clips, the front stacker assemblies, and the rear stacker assemblies may be constructed to snap together to easily facilitate initial configuration or subsequent reconfiguration of the stackable shelves.

The removable panel clips can serve as an adapter piece which allows plunger-style panels to be used where a track-type method of retention is used. The removable panel clips can contains protrusions on the exterior that snap into a raised portion of the stackable shelf and slide over the track feature. The front stacker assembly pieces and rear stacker assembly pieces can be composed of two (2) wedge-shaped pieces which snap together and in turn contain features which allow them to attach to the mounting surface of the stackable shelf. The front stacker assemblies may be shorter than the rear stacker assemblies. The stacker assemblies may allow a track-type module to be used in a housing that accommodates plunger-style panels. The removable panel clips can be used alone or in combination with the front stacker assembly and/or rear stacker assembly depending on the desired configuration. The material of construction may be metal or non-metal as examples. The removable panel clips could also be reversed one hundred eighty (180) degrees from the orientations discussed and illustrated above to allow the fiber optic panel position disposed therein to move independently, allowing the use of attenuators and/or other fiber optic devices, if desired.

The routing guides may be configured to rotatably attach to a mounting surface, such as, for example, a stackable shelf using an attachment feature. The attachment feature may have a pattern of specifically shaped holes in the surface of the stackable shelf that allows the routing guide to lock in place at various angles. The pattern of holes on the stackable shelf, or other mounting surface, can include an access hole and a plurality of locator holes. The base of the routing guide can be inserted into the access hole. The routing guide can lock into place by turning the routing guide counterclockwise as an example. A sloped profile of the base in combination with a "tooth" protruding from the base of the routing guide can be configured to snap into one of several locator holes allowing the routing guide to releasably lock into place at that angular position.

The placement of the access hole and locator holes in the mounting surface may resemble a "paw print" shape. The access hole can be shaped such that the routing guide can only be inserted in one particular orientation. The locator holes can be spaced such that after the routing guide has been inserted, it can be rotated counterclockwise allowing the protrusion or "tooth" on the routing guide base to interact with the holes to effectively lock it into an angled position. The holes can be situated on the centerline of the path of the tooth of the routing guide as it is rotated to provide multiple locking positions as desired. In this manner, the protrusion is movably positionable into different ones of the locator holes.

The base of the routing guides can have a spherical protrusion that engages the locator holes in the mounting surface. The spherical shape allows the guide to releasably lock in position, but also allows for movement and adjustability in either direction if additional force is applied. The profile of the base is sloped so that constant tension is maintained between the underside of the mounting surface and the base. The routing guide may be provided as segments. In this regard, the routing guide may have diagonal posts on the interior of the upper portion. These posts provide different segments in the upper portion allowing for the segregation or separation of fiber types or bundles. For instance, if the user intends to store slack for both buffer tubes and 250 micrometers (μm) fiber, one type can be stored in the interior of the posts while the other can be stored underneath the posts inside the routing guide.

The routing guide may be constructed of metal or non-metal material as examples. Additionally, the shape of the routing guide could be a different shape than what is shown. Moreover, the footprint of the hole arrangement of the attachment feature could also vary. In addition, the features could be reversed—the hole could be on the routing guide and the tooth protrusion could be on the mounting surface.

Further, as used herein, it is intended that terms "fiber optic cables" and/or "optical fibers" include all types of single mode and multi-mode light waveguides, including one or more optical fibers that may be bare, upcoated, colored, buffered, tight-buffered, loose-tube, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Therefore, it is to be understood that the embodiments are not to be limited to the specific embodiments disclosed and that modifications and other embodiments are intended to be included within the scope of the appended claims. It is intended that the embodiments cover the modifications and variations of this invention provided they come within the scope of the appended claims and their equivalents. Although specific terms are employed herein, they are used in a generic and descriptive sense only and not for purposes of limitation.

What is claimed is:

1. A fiber optic apparatus, comprising:
a fiber optic housing; and
one or more removable panel clips disposed in the fiber optic housing;
wherein each of the one or more removable panel clips includes at least one receptacle configured to receive an insert of a fiber optic panel to support the fiber optic panel in the fiber optic housing; and
wherein an opening in the one or more removable panel clips is configured to receive a rail system disposed in the fiber optic housing to attach the one more removable panel clips to the fiber optic housing.

2. The fiber optic apparatus of claim 1, wherein the fiber optic housing is also configured to support one or more fiber optic modules and one or more fiber optic panels interchangeably.

3. The fiber optic apparatus of claim 2, wherein the fiber optic housing is configured to support the one or more fiber optic modules without employing the one or more removable panel clips.

4. The fiber optic apparatus of claim 1, wherein each of the one or more removable panel clips is disposed in the fiber optic housing to support fiber optic panels in a horizontal orientation.

5. The fiber optic apparatus of claim 1, wherein each of the one or more removable panel clips is disposed in the fiber optic housing to support fiber optic panels in a vertical orientation.

6. The fiber optic apparatus of claim 1, wherein each of the one or more removable panel clips comprises a flange configured to be inserted into an opening disposed in the fiber optic housing to attach the one more removable panel clips to the fiber optic housing.

7. The fiber optic apparatus of claim 6, wherein the flange is configured to be inserted in a first area of the opening and slid into a second area of the opening to attach the one or more removable panel clips to the fiber optic housing.

8. The fiber optic apparatus of claim 6, further comprising a protrusion disposed in each of the one or more removable panel clips configured to be inserted into the opening.

9. The fiber optic apparatus of claim 6, wherein the flange is arcuate-shaped.

10. The fiber optic apparatus of claim 6, wherein the flange is disposed in a first side of the one or more removable panel clips, and the receptacle is disposed in a second side adjacent to the first side of the one or more removable panel clips.

11. The fiber optic apparatus of claim 10, wherein the first side is orthogonal to the second side.

12. The fiber optic apparatus of claim 10, further comprising at least one extender disposed between the flange and the first side to dispose the flange a distance away from the first side.

13. The fiber optic apparatus of claim 1, wherein the rail system is configured to support a fiber optic module in the fiber optic housing when a removable panel clip is not attached to the rail system.

14. The fiber optic apparatus of claim 1, wherein the opening is disposed in a first side of the one or more removable panel clips, and the receptacle is disposed in a second side adjacent to the first side of the one or more removable panel clips.

15. The fiber optic apparatus of claim 14, wherein the first side is orthogonal to the second side.

16. The fiber optic apparatus of claim 1, further comprising a protrusion disposed in each of the one or more removable panel clips configured to be inserted into an opening in the fiber optic housing to secure the one or more removable panel clips to the fiber optic housing.

17. The fiber optic apparatus of claim 1, wherein each of the one or more removable panel clips is attached in a base of the fiber optic housing.

18. The fiber optic apparatus of claim 17, wherein each of the one or more removable panel clips is disposed in an opening in the base.

19. The fiber optic apparatus of claim 17, wherein the rail system is disposed in the base, and each of the one or more removable panel clips is attached to the rail system.

20. The fiber optic apparatus of claim 19, wherein the rail system comprises a rail guide that receives an opening disposed in a removable panel clip among the one or more removable panel clips to secure the removable panel clip to the fiber optic housing.

21. A method of supporting fiber optic panels in a fiber optic housing configured to support fiber optic modules, the method comprising:
attaching a removable panel clip that includes at least one receptacle in the fiber optic housing, wherein said attaching comprises inserting an opening disposed in the removable panel clip over a rail guide of a rail system disposed in the fiber optic housing;

inserting a fiber optic panel in the fiber optic housing such that at least one insert of the fiber optic panel is aligned with the at least one receptacle; and inserting the at least one insert into the at least one receptacle to support the fiber optic panel in the fiber optic housing.

22. The method of claim 21, further comprising:

removing the fiber optic panel from a position in the fiber optic housing by removing the at least one insert of the fiber optic panel from the at least one receptacle of the removable panel clip;

removing the removable panel clip from the fiber optic housing; and installing a fiber optic module in the position in the fiber optic housing.

23. The method of claim 21, further comprising attaching the removable panel clip in the fiber optic housing such that the removable panel clip is disposed in the fiber optic housing to support the fiber optic panels in a horizontal orientation.

24. The method of claim 21, further comprising attaching the removable panel clip in the fiber optic housing such that the removable panel clip is disposed in the fiber optic housing to support the fiber optic panels in a horizontal orientation.

25. The method of claim 21, wherein attaching the removable panel clip in the fiber optic housing comprises inserting a flange disposed in the removable panel clip into an opening disposed in the fiber optic housing.

26. The method of claim 25, wherein attaching the removable panel clip in the fiber optic housing further comprises inserting the flange into a first area of the opening disposed in the fiber optic housing and thereafter sliding the flange into a second area of the opening disposed in the fiber optic housing.

27. The method of claim 25, further comprising inserting a protrusion disposed in the removable panel clip into the opening disposed in the fiber optic housing.

28. The method of claim 21, wherein attaching the removable panel clip in the fiber optic housing comprises attaching the removable panel clip to a base of the fiber optic housing.

29. The method of claim 28, wherein attaching the removable panel clip in the fiber optic housing further comprises inserting a portion of the removable panel clip into an opening in the base.

30. A fiber optic shelf configured to be supported in a fiber optic housing, comprising:

a mounting surface; and one or more removable panel clips attached to the mounting surface;

wherein each of the one or more removable panel clips includes at least one receptacle configured to receive an insert of a fiber optic panel to support the fiber optic panel to the mounting surface;

wherein an opening in the one or more removable panel clips is configured to receive a rail system disposed in the fiber optic housing to attach the one or more removable panel clips to the fiber optic housing.

31. The fiber optic shelf of claim 30, wherein the mounting surface is also configurable to support one or more fiber optic modules and one or more fiber optic panels interchangeably.

32. The fiber optic shelf of claim 31, wherein the mounting surface is configured to support the one or more fiber optic modules without employing the one or more removable panel clips.

33. The fiber optic shelf of claim 30, wherein each of the one or more removable panel clips is disposed in the mounting surface to support fiber optic panels in a horizontal orientation.

34. The fiber optic shelf of claim 30, wherein each of the one or more removable panel clips is attached to a removable stacker assembly disposed in the mounting surface.

35. The fiber optic shelf of claim 34, further comprising a plurality of removable stacker assemblies stacked in relation to each other, and wherein the one or more removable panel clips are comprised of a plurality of removable panel clips, each one of which is attached to a removable stacker assembly among the plurality of removable stacker assemblies.

36. The fiber optic shelf of claim 34, further comprising at least one opening disposed in the removable stacker assembly configured to receive a flange disposed in a removable panel clip among the one or more removable panel clips to attach the removable panel clip to the removable stacker assembly.

37. The fiber optic shelf of claim 36, wherein the at least one opening is comprised of a first opening disposed on a first side of the removable stacker assembly and a second opening disposed on a second side of the removable stacker assembly opposite of the first side, each of the first opening and the second opening configured to receive the flange disposed in a removable panel clip among the one or more removable panel clips to attach the removable panel clip to the removable stacker assembly.

38. The fiber optic shelf of claim 36, wherein the flange is configured to be inserted in a first area of the at least one opening and slid into a second area of the at least one opening to attach the removable panel clip to the removable stacker assembly.

39. The fiber optic shelf of claim 36, further comprising a protrusion disposed in the removable panel clip configured to be inserted into the at least one opening.

40. The fiber optic shelf of claim 39, wherein the flange is disposed in a first side of the removable panel clip, and the receptacle is disposed in adjacent second side adjacent to the first side of the removable panel clip.

41. A method of supporting fiber optic panels in a shelf comprising a rail system configured to support fiber optic modules, comprising:

attaching a removable panel clip that includes at least one receptacle to a mounting surface of the shelf configured to support the fiber optic modules, wherein said attaching comprises receiving the rail system in an opening disposed in the removable panel clip;

installing a fiber optic panel on the mounting surface such that at least one insert of the fiber optic panel is aligned with the at least one receptacle; and inserting the at least one insert into the at least one receptacle to support the fiber optic panel on the mounting surface.

42. The method of claim 41, further comprising inserting the mounting surface supporting at least one fiber optic panel in a fiber optic housing.

43. The method of claim 41, further comprising:

removing the fiber optic panel from a position on the mounting surface by removing the at least one insert of the fiber optic panel from the at least one receptacle of the removable panel clip;

removing the removable panel clip from the mounting surface; and installing a fiber optic module in the position on the mounting surface.

44. The method of claim 41, wherein installing the fiber optic panel on the mounting surface comprises inserting the fiber optic panel in the mounting surface in a horizontal position such that the at least one insert of the fiber optic panel is aligned with the at least one receptacle.

45. The method of claim 41, wherein attaching the removable panel clip further comprises attaching the removable panel clip to a removable stacker assembly disposed in the mounting surface.

46. The method claim 45, further comprising stacking a plurality of removable stacker assemblies on the mounting surface and attaching each of a plurality of the removable panel clips to one of the plurality of removable stacker assemblies.

47. The method of claim 45, wherein attaching the removable panel clip further comprises inserting a flange disposed in the removable panel clip into an opening disposed in the removable stacker assembly.

48. The method of claim 47, wherein attaching the removable panel clip further comprises sliding the flange from a first area in the opening disposed in the removable stacker assembly into a second area of the opening disposed in the removable stacker assembly.

49. The method of claim 47, wherein attaching the removable panel clip further comprises inserting a protrusion disposed in the removable panel clip into the opening disposed in the removable stacker assembly.

* * * * *